(12) United States Patent
Imai et al.

(10) Patent No.: US 7,643,046 B2
(45) Date of Patent: Jan. 5, 2010

(54) LASER BEAM SCANNING DEVICE, IMAGE FORMING APPARATUS, AND LASER BEAM DETECTING METHOD BY THE LASER BEAM SCANNING DEVICE

(75) Inventors: Shigeaki Imai, Kanagawa (JP); Mitsuo Suzuki, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 358 days.

(21) Appl. No.: 11/612,750

(22) Filed: Dec. 19, 2006

(65) Prior Publication Data
US 2007/0236557 A1    Oct. 11, 2007

(30) Foreign Application Priority Data

| Dec. 21, 2005 | (JP) | ............................. 2005-367434 |
| Feb. 23, 2006 | (JP) | ............................. 2006-046337 |
| Sep. 19, 2006 | (JP) | ............................. 2006-253373 |

(51) Int. Cl.
*B41J 2/435* (2006.01)
*B41J 2/47* (2006.01)

(52) U.S. Cl. ..................................... 347/234; 347/248

(58) Field of Classification Search ................ 347/236, 347/237, 241, 246, 247, 229, 230, 234, 235, 347/244, 248–250, 256, 258; 359/204, 239, 359/566; 358/2; 250/234
See application file for complete search history.

(56) References Cited

U.S. PATENT DOCUMENTS

| 4,139,257 | A | * | 2/1979 | Matsumoto ................. 359/239 |
| 5,343,038 | A | * | 8/1994 | Nishiwaki et al. ........... 250/234 |
| 5,353,048 | A | * | 10/1994 | Kanai .......................... 347/246 |
| 6,690,844 | B2 | * | 2/2004 | Deliwala ........................ 385/2 |
| 6,768,588 | B2 | * | 7/2004 | Urey ............................ 359/566 |
| 6,919,978 | B2 | * | 7/2005 | Kudo .......................... 359/204 |
| 7,045,733 | B2 | | 5/2006 | Bresciani et al. |
| 2005/0094234 | A1 | | 5/2005 | Miyatake et al. |
| 2007/0064087 | A1 | * | 3/2007 | Matsumae et al. .......... 347/241 |

FOREIGN PATENT DOCUMENTS

JP          10-235928          9/1998

(Continued)

OTHER PUBLICATIONS

U.S. Appl. No. 11/961,337, filed Dec. 20, 2007, Imai.

(Continued)

*Primary Examiner*—Hai C Pham
(74) *Attorney, Agent, or Firm*—Oblon, Spivak, McClelland, Maier & Neustadt, L.L.P.

(57) ABSTRACT

A laser beam scanning device is disclosed. The laser beam scanning device includes a diffraction optical element which forms a pattern of a diffraction image including two images extending in a direction corresponding to the sub scanning direction and one image extending in a direction inclined by θ (0<θ<90°) from the direction corresponding to the sub scanning direction by inputting a laser beam which is led to a surface of a photoconductor drum, and a light receiving element which receives the pattern of the diffraction image.

20 Claims, 47 Drawing Sheets

FOREIGN PATENT DOCUMENTS

| | | |
|---|---|---|
| JP | 11084287 A  *  | 3/1999 |
| JP | 3191232 | 5/2001 |
| JP | 2003-241130 | 8/2003 |
| JP | 2004-109700 | 4/2004 |
| JP | 2005-37575 | 2/2005 |
| JP | 2005-62597 | 3/2005 |

OTHER PUBLICATIONS

U.S. Appl. No. 11/508,881, filed Aug. 24, 2006, Imai, et al.
U.S. Appl. No. 12/028,446, filed Feb. 8, 2008, Nakamura, et al.
U.S. Appl. No. 11/802,914, filed May 25, 2007, Suzuki, et al.
U.S. Appl. No. 12/174,899, filed Jul. 17, 2008, Saisho, et al.
U.S. Appl. No. 12/207,739, filed Sep. 10, 2008, Imai.

* cited by examiner (a)   (b)

(a)   (b)

(a)  (b)

LASER BEAM SCANNING DEVICE, IMAGE FORMING APPARATUS, AND LASER BEAM DETECTING METHOD BY THE LASER BEAM SCANNING DEVICE

BACKGROUND OF THE INVENTION

1. Field of the Invention

The present invention generally relates to a laser beam scanning device which scans a surface to be scanned by a laser beam emitted from a light source, an image forming apparatus using the laser beam scanning device, and a laser beam detecting method by the laser beam scanning device.

2. Description of the Related Art

Recently, in an image forming apparatus of an electrophotographic system which is applied to a laser printer, a laser plotter, a laser facsimile apparatus, a digital copying apparatus, and so on, a color image is formed, and a high quality is required for the color image. In order to achieve the high quality of the color image, out of color registration must be decreased. The out of color registration can be decreased by applying several adjusting processes to the apparatus when the image forming apparatus is delivered from a factory to a customer. However, the out of color registration may be increased with the passage of time after delivering the apparatus.

There are two kinds of out of color registration, that is, out of color registration in the main scanning direction and in the sub main scanning direction.

The out of color registration in the sub scanning direction with the passage of time may be caused by a positional shift of an optical element such as a lens and a mirror and deformation of a housing in which a light source and the optical elements are disposed. When a positional shift of a light spot formed on the surface of a photoconductor drum in the sub scanning direction is detected, the out of color registration in the sub scanning direction can be corrected by a suitable method.

In Patent Document 1, the out of color registration in the sub scanning direction is corrected by using a liquid crystal deflection element. That is, a laser beam is deflected in the sub scanning direction by using the liquid crystal deflection element. In Patent Document 2, the out of color registration in the sub scanning direction is corrected by using a wedge-shaped prism. That is, a laser beam is deflected in the sub scanning direction by rotating the wedge-shaped prism around the optical axis.

In Patent Documents 3 and 4, a positional shift of an optical spot in the sub scanning direction is detected by using a photodiode having non-parallel sides. That is, the positional shift of the optical spot in the sub scanning direction is detected by using a time interval between two signals output from the two sides of the photodiode.

In addition, as a color image forming apparatus, there is a tandem type color image forming apparatus. In the tandem type color image forming apparatus, plural image carriers such as photoconductor drums are disposed, and a laser beam scanning device scans the surface of each image carrier by using a corresponding laser beam. The laser beam is output from a semiconductor laser which is driven by the corresponding color image information signal.

Each laser beam is condensed on the surface of the corresponding image carrier which is uniformly charged, via a deflection scanning unit formed of, for example, a polygon mirror, and an optical component such as a condenser lens, and the laser beam scans the surface of the image carrier in the main scanning direction due to the deflection scanning unit. Together with the scanning of the laser beam in the main scanning direction, each image carrier is rotated around its axle, and an electrostatic latent image corresponding to an image signal is formed on the surface of each image carrier by laser beams having a predetermined interval in the sub scanning direction. The electrostatic latent image on the surface of each image carrier is developed by corresponding color toner, and a full color image is formed by superposing color toner images on a recording medium (paper).

In the laser beam scanning device which is used in the tandem type color image forming apparatus, laser beams scanning on the surfaces of the image carriers have different routes among different colors. When the condenser lens is deformed by heat indicated by an environmental temperature rise and a temperature rise inside the tandem type color image forming apparatus, the position of the scanning laser beam is likely to be changed. Especially, when a resin condenser lens is used, since the thermal expansion coefficient of the resin condenser lens is large, the positional change of the scanning laser beam becomes large due to the temperature change.

In the tandem type color image forming apparatus, when an image writing start position by scanning of each laser beam is shifted, since a color image is formed by superposing different color images, image quality is degraded by the out of color registration of transferred different colors. In order to avoid the above problem, a light receiving element is disposed so that each laser beam can be individually detected at the deflection scanning start position, and a time from an output of a detection signal to a writing start is adjusted in each laser beam. With this, the image writing start positions of plural laser beams conform to each other. The image writing start positions are adjusted in the main scanning direction.

The out of color registration also occurs in the sub scanning direction orthogonal to the main scanning direction. The out of color registration in the sub scanning direction occurs due to various reasons such as an optical axis shift of the laser beam by a temperature change and eccentricity of an image carrier, for example, a photoconductor drum.

In order to avoid the above problem, by using an out of color registration detecting pattern formed on a transfer body, a scanning positional shift is periodically detected at the start-up time of the apparatus or at the time between jobs, and the scanning positional shift is corrected. However, when printing is continuously executed, the scanning positional shift is increased by heat from a fixing unit and a polygon mirror motor; therefore, when the number of printing cycles of one job is large, the out of color registration is gradually increased.

In Patent Document 5, a laser beam scanning device and an image forming apparatus using the laser beam scanning device are disclosed. The image forming apparatus provides a polygon mirror, a light receiving element, a controlling unit, and an optical system. The polygon mirror deflects and scans plural laser beams emitted from plural semiconductor lasers by deflecting and reflecting. The light receiving element receives the laser beams deflected and scanned by the polygon mirror by inputting from one side orthogonal to the scanning direction and outputs the received laser beams from the other side inclining to the scanning direction. The controlling unit makes the semiconductor laser emit laser beams corresponding to image information based on a signal output from the light receiving element receiving the laser beams. The optical system leads the laser beams emitted from the semiconductor laser and reflected from the polygon mirror to plural photoconductor drums.

In the laser beam scanning device and the image forming apparatus using the laser beam scanning device, when a laser beam is shifted in the sub scanning direction, timing is not changed at which timing the light receiving element detects the laser beam in the input side of the scanning direction of the light receiving element; however, timing is changed at which timing the light receiving element detects the laser beam in the output side of the scanning direction of the light receiving element. Therefore, the shifting amount of the scanning laser beam in the sub scanning direction can be calculated based on the timing shift therebetween. When a correcting unit for correcting the calculated shifting amount is used, the shifting amount can be corrected.

In Patent Document 6, an image forming apparatus which can detect a pitch shift between plural laser beams in the sub scanning direction is disclosed. In the image forming apparatus, in order to detect laser beam positions, plural sensors composed of light receiving elements whose scanning start point sides in a laser beam detecting region are not parallel to each other are disposed. A time interval between laser beams which pass through the scanning start points of the plural sensors is calculated by individually turning on the plural laser beams, and the difference between the time intervals is converted into the sub scanning direction pitch between the laser beams.

However, in Patent Documents 5 and 6, when a positional shift amount of laser beams is detected by using a special-shaped light receiving element; the size of the light receiving element becomes large and the shape thereof becomes complex. Consequently, the layout of the apparatus becomes complex and the apparatus becomes large and these result in a cost increase.

[Patent Document 1] Japanese Laid-Open Patent Application No. 2003-241130

[Patent Document 2] Japanese Laid-Open Patent Application No. 2004-109700

[Patent Document 3] Japanese Laid-Open Patent Application No. 2005-37575

[Patent Document 4] Japanese Laid-Open Patent Application No. 2005-62597

[Patent Document 5] Japanese Laid-Open Patent Application No. 10-235928

[Patent Document 6] Japanese Laid-Open Patent Application No. 7-72399

However, in Patent Documents 3 and 4, when the special photodiodes are used, the cost is increased. Generally, the size of the special photodiode is larger than that of a general-purpose photodiode and the photodiodes are generally disposed outside an image forming region. That is, a region where a light deflector can scan must be large; as a result, the scanning optical system becomes large. When the scanning optical system becomes large, the optical path length becomes long. Consequently, it becomes difficult to manufacture the apparatus due to an increase of a sensitivity error and a large thickness of a scanning lens. That is, it is difficult to miniaturize the apparatus.

In addition, in order to detect a scanning positional shift by a laser beam, an exclusive special photo IC is disposed in the laser beam scanning device. The exclusive special photo IC includes a light receiving element and a comparator circuit; this causes high cost. When a general-purpose low-cost photo IC is used which IC has a simple-shaped light receiving surface, the scanning angle of a light deflector is narrow and the scanning positional shift of the laser beam can be detected outside the image forming region in the scanning range. Therefore, when the exclusive special photo IC is used, optical characteristics (fθ characteristics) of the scanning laser beams in the detecting region become largely different from those in the image forming region; consequently, detecting accuracy becomes low.

In addition, when the general-purpose low-cost photo IC is used, detection accuracy is degraded caused by various factors relating to a change of the light receiving amount. The change of the light receiving amount is caused by an output change of a light source caused by, for example, a temperature change, deterioration of reflectance and transmittance of an optical element with the passage of time, and a change of the rotational speed of the light deflector corresponding to a pixel density change at the time of image forming.

SUMMARY OF THE INVENTION

In a preferred embodiment of the present invention, there is provided a laser beam scanning device which can detect a position of a light spot formed on the surface to be scanned in the sub scanning direction at high accuracy without high cost without a large size, an image forming apparatus using the laser beam scanning device in which out of color registration is corrected, and a laser beam detecting method by the laser beam scanning device.

Features and advantages of the present invention are set forth in the description that follows, and in part will become apparent from the description and the accompanying drawings, or may be learned by practice of the invention according to the teachings provided in the description. Features and advantages of the present invention will be realized and attained by a laser beam scanning device, an image forming apparatus, and a laser beam detecting method by the laser beam scanning device particularly pointed out in the specification in such full, clear, concise, and exact terms as to enable a person having ordinary skill in the art to practice the invention.

To achieve one or more of these and other advantages, according to one aspect of the present invention, there is provided a laser beam scanning device which scans a surface to be scanned by using a laser beam. The laser beam scanning device includes a light source which emits the laser beam, a laser beam deflecting unit which deflects the laser beam emitted from the light source, a scanning optical system which condenses the laser beam deflected by the laser beam deflecting unit onto the surface to be scanned, a diffraction optical element which forms a pattern of a diffraction image by dividing the laser beam deflected by the laser beam deflecting unit into plural laser beams, and a light detector which detects the pattern of the diffraction image. In addition, the pattern of the diffraction image includes plural images whose intervals between the plural images are different in a first direction corresponding to the main scanning direction at a position in a second direction corresponding to the sub scanning direction at least at a part of the plural images.

According to another aspect of the present invention, there is provided an image forming apparatus. The image forming apparatus includes at least one laser beam scanning device which scans a surface to be scanned by using a laser beam, and a transferring device which transfers an image formed on the surface to be scanned by the laser beam scanning device to a recording medium. In addition, the laser beam scanning device includes a light source which emits the laser beam, a laser beam deflecting unit which deflects the laser beam emitted from the light source, a scanning optical system which condenses the laser beam deflected by the laser beam deflecting unit onto the surface to be scanned, a diffraction optical element which forms a pattern of a diffraction image by dividing the laser beam deflected by the laser beam deflecting unit into plural laser beams, and a light detector which detects the pattern of the diffraction image. Further, the pattern of the diffraction image includes plural images where intervals between the plural images are different in a first direction corresponding to the main scanning direction at a position in a second direction corresponding to the sub scanning direction at least at a part of the plural images, and the laser beam deflecting unit is formed of polygon mirrors stacked in the second direction in which each polygon mirror has four surfaces or six surfaces.

According to another aspect of the present invention, there is provided a laser beam detecting method in a laser beam scanning device which scans a surface to be scanned by using a laser beam. The method includes the steps of emitting the laser beam from a light source, deflecting the laser beam emitted from the light source, condensing the deflected laser beam onto the surface to be scanned, forming a pattern of a diffraction image by dividing the deflected laser beam into plural laser beams, and detecting the pattern of the diffraction image. In addition, the pattern of the diffraction image includes plural images where intervals between the plural images are different in a first direction corresponding to the main scanning direction at a position in a second direction corresponding to the sub scanning direction at least at a part of the plural images.

Effect of the Invention

According to an embodiment of the present invention, in a laser beam scanning device, a laser beam output from a light source is deflected by a laser beam deflecting unit and the deflected laser beam is condensed on a surface to be scanned by a scanning optical system. The laser beam which is led to the surface to be scanned is input to a diffraction optical element and the diffraction optical element forms a pattern of a diffraction image. The pattern of the diffraction image includes plural images where intervals therebetween are different in a first direction corresponding to the main scanning direction at a position in a second direction corresponding to the sub scanning direction at least at a part of the plural images. Then, a light detector detects the pattern of the diffraction image. The detected result by the light detector includes position information of the input laser beam in the second direction. Consequently, the laser beam scanning device can accurately detect the position of a light spot to be formed on the surface to be scanned without high cost and without a large size.

According to an embodiment of the present invention, when it is defined that the width in a diffraction angle distribution in the first direction is θmax, an interval between pixels of the diffraction optical element is "p", a using wavelength is λ, and λ>"p", the interval "p" is determined by satisfying the following inequality: $\arcsin(\lambda/p) > \theta max$. Therefore, a diffraction image by a high-order laser beam does not overlap a diffraction image by a first-order laser beam. Consequently, the laser beam scanning device can accurately detect the position of a light spot to be formed on the surface to be scanned.

According to an embodiment of the present invention, since the size of the laser beam scanning device is small, when the laser beam scanning device is installed in an image forming apparatus, the image forming apparatus can be designed without any restriction of the layout.

According to an embodiment of the present invention, since a general-purpose photodiode or a general-purpose photo IC can be used as the light detector, the laser beam scanning device can be formed with low cost.

BRIEF DESCRIPTION OF THE DRAWINGS

Features and advantages of the present invention will become more apparent from the following detailed description when read in conjunction with the accompanying drawings, in which.

DESCRIPTION OF THE PREFERRED EMBODIMENT

Figure 1:
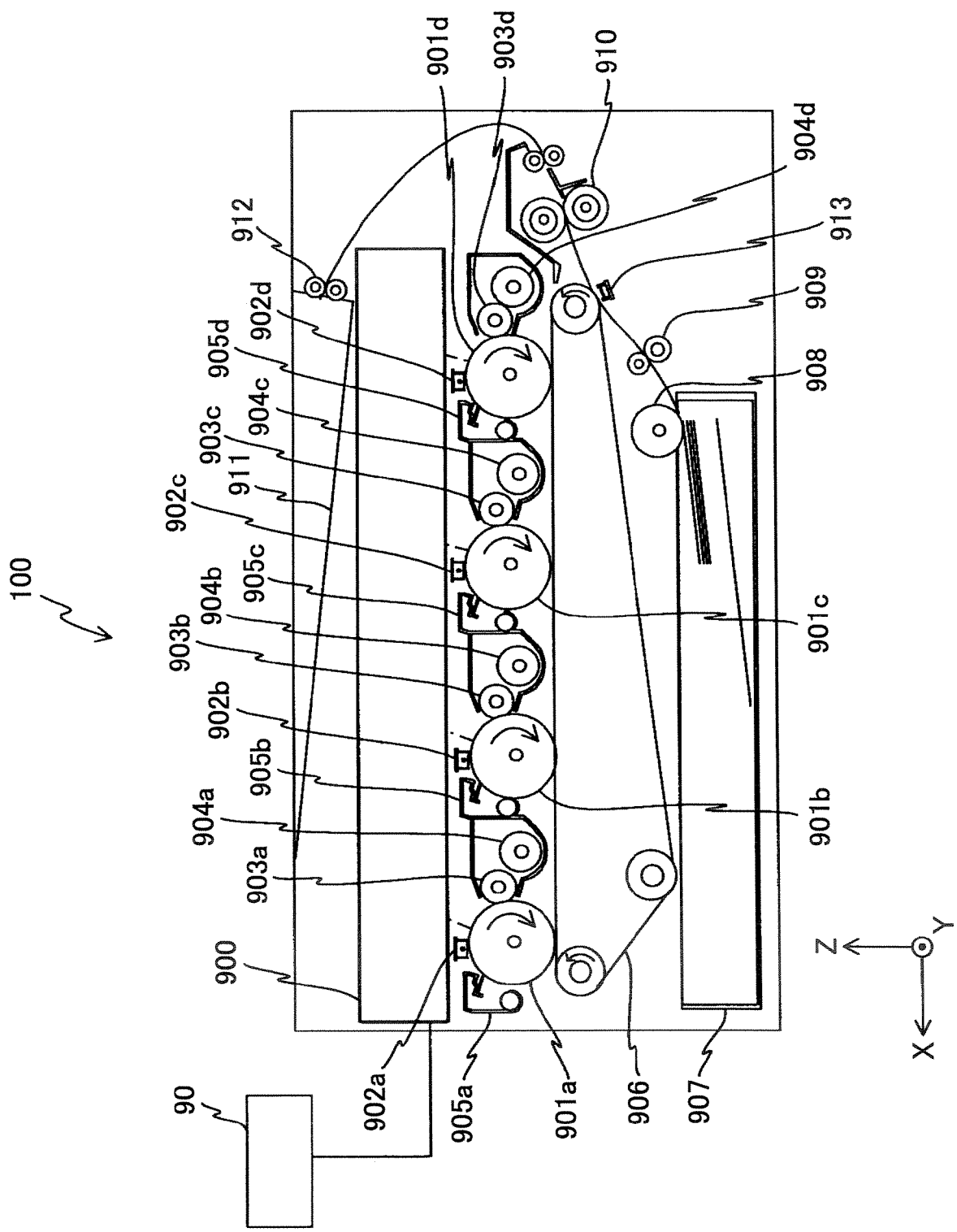
FIG. 1 is a schematic diagram showing an image forming apparatus according to a first embodiment of the present invention.

Best Mode of Carrying Out the Invention

A best mode of carrying out the present invention is described with reference to the accompanying drawings.

First Embodiment

First, referring to the drawings, a first embodiment of the present invention is described.

FIG. 1 is a schematic diagram showing an image forming apparatus according to the first embodiment of the present invention. In FIG. 1, as the image forming apparatus, a full color image forming apparatus 100 is used.

The full color image forming apparatus 100 forms a color image by superposing four color images of yellow, magenta, cyan, and black. The full color image forming apparatus 100 includes a laser beam scanning device 900, four photoconductor drums 901a, 901b, 901c, and 901d, four drum chargers 902a, 902b, 902c, and 902d, four developing rollers 903a, 903b, 903c, and 903d, four toner cartridges 904a, 904b, 904c, and 904d, four cleaning units 905a, 905b, 905c, and 905d, a transfer belt 906, a paper feeding tray 907, a paper feeding roller 908, a pair of registration rollers 909, a transfer charger 913, fixing rollers 910, a paper outputting tray 911, and paper outputting rollers 912.

The photoconductor drum 901a, the drum charger 902a, the developing roller 903a, the toner cartridge 904a, and the cleaning unit 905a are used as a group and form a black image forming station.

The photoconductor drum 901b, the drum charger 902b, the developing roller 903b, the toner cartridge 904b, and the cleaning unit 905b are used as a group and form a cyan image forming station.

The photoconductor drum 901c, the drum charger 902c, the developing roller 903c, the toner cartridge 904c, and the cleaning unit 905c are used as a group and form a magenta image forming station.

The photoconductor drum 901d, the drum charger 902d, the developing roller 903d, the toner cartridge 904d, and the cleaning unit 905d are used as a group and form a yellow image forming station.

That is, the full color image forming apparatus 100 provides four image forming stations.

In the following, when a suffix is not attached to a reference number of an element, the reference number represents the set of elements. For example, the photoconductor drum 901 represents the photoconductor drums 901a, 901b, 901c, and 901d.

The photoconductor drums 901a, 901b, 901c, and 901d are disposed along the moving direction (X axis direction) of the transfer belt 906 with the same interval between the two photoconductor drums 901. A photoconductor layer is formed on the surface of each photoconductor drum 901. In FIG. 1, the photoconductor drum 901 is rotated clockwise (arrow direction).

The drum charger 902 uniformly charges the surface of the photoconductor drum 901.

The laser beam scanning device 900 irradiates laser beams modulated by each color on the corresponding charged surfaces of the photoconductor drums 901 based on color image information (yellow, magenta, cyan, and black image information) from an external apparatus 90, for example, a personal computer. On the surface of the photoconductor drum 901, electric charges on a part where the laser beams are irradiated disappear and a latent image corresponding to the color image information is formed. The formed latent image is moved to face the developing roller 903 by the rotation of the photoconductor drum 901.

The long length direction (Y axis direction in FIG. 1) of the photoconductor drum 901 is called the main scanning direction and the rotating direction of the photoconductor drum 901 is called the sub scanning direction. In scanning in the main scanning direction, the direction from a scanning start position to a scanning end position is called the scanning direction. In addition, of a scanning region in the scanning direction of the photoconductor drum 901, a region where the latent image is formed is called an image forming region.

Black toner particles are stored in the toner cartridge 904a and are supplied to the developing roller 903a. Cyan toner particles are stored in the toner cartridge 904b and are supplied to the developing roller 903b. Magenta toner particles are stored in the toner cartridge 904c and are supplied to the developing roller 903C. Yellow toner particles are stored in the toner cartridge 904d and are supplied to the developing roller 903d.

On the surface of the developing roller 903, toner particles supplied from the toner cartridge 904 are thinly adhered uniformly by being charged corresponding to the rotation of the developing roller 903. On the surface of the developing roller 903, a voltage is applied so that an electric field is generated in a charged part and an electric field reverse to the charged part is generated in a non-charged part of the photoconductor drum 901. The charged part is where the laser beams are not irradiated and the non-charged part is where the laser beams are irradiated. The toner particles adhered to the developing roller 903 are adhered to only the laser beam irradiated part on the surface of the photoconductor drum 901. That is, the developing roller 903 makes the image information appear by adhering the toner to the latent image formed on the surface of the photoconductor drum 901. An image to which the toner is adhered (hereinafter referred to as a toner image) moves to the transfer belt 906 corresponding to the rotation of the photoconductor drum 901.

The toner images of yellow, magenta, cyan, and black are sequentially transferred to the transfer belt 906 at corresponding suitable timings, and a full color image is formed by superposing the toner images.

Recording media (papers or sheets) are stored in the paper feeding tray 907 to which paper the color image is transferred. The paper feeding roller 908 is disposed near the paper feeding tray 907 and takes out each paper from the paper feeding tray 907 and carries the paper to the pair of registration rollers 909. The pair of registration rollers 909 carries the paper to the transfer belt 906 by conforming to the recording start timing in the sub scanning direction. The transfer charger 913 transfers the full color image formed on the transfer belt 906 to the paper. The paper on which the full color image is transferred is carried to the fixing rollers 910.

Heat and pressure are applied to the paper by the fixing rollers 910; with this, the toner on the paper is fixed. The paper on which the full color image is fixed is put on the paper outputting tray 911 by being carried by the paper outputting rollers 912.

The cleaning unit 905 removes toner particles remaining on the surface of the photoconductor drum 901, and the removed toner particles are reused. The surface of the photoconductor drum 901, from which the remaining toner particles are removed, is returned to the position of the drum charger 902.

[Laser Beam Scanning Device]

Next, the laser beam scanning device 900 is described in detail.

Figure 2:
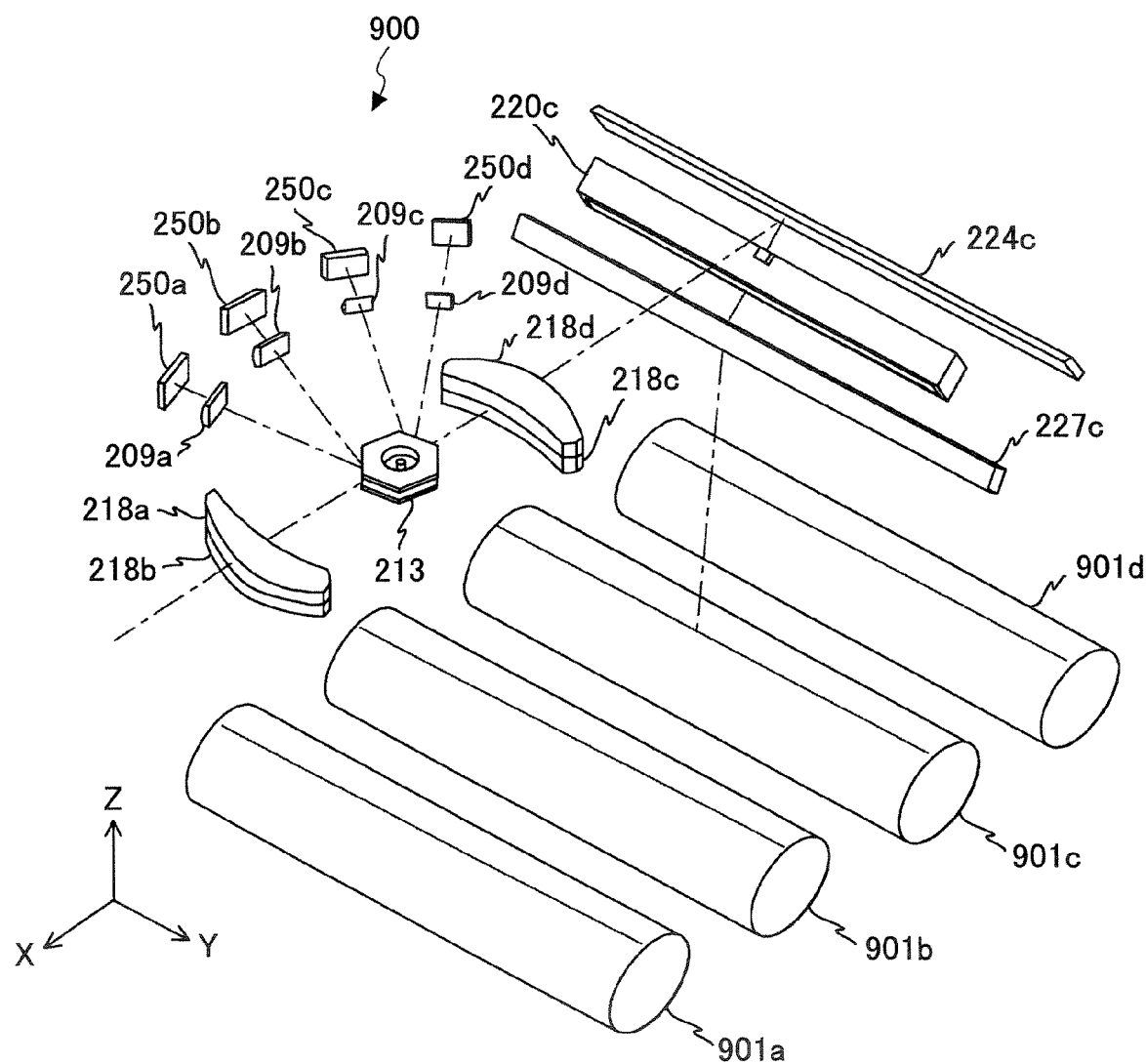
FIG. 2 is a perspective view of a part of a laser beam scanning device and photoconductor drums shown in FIG. 1.
Figure 3:
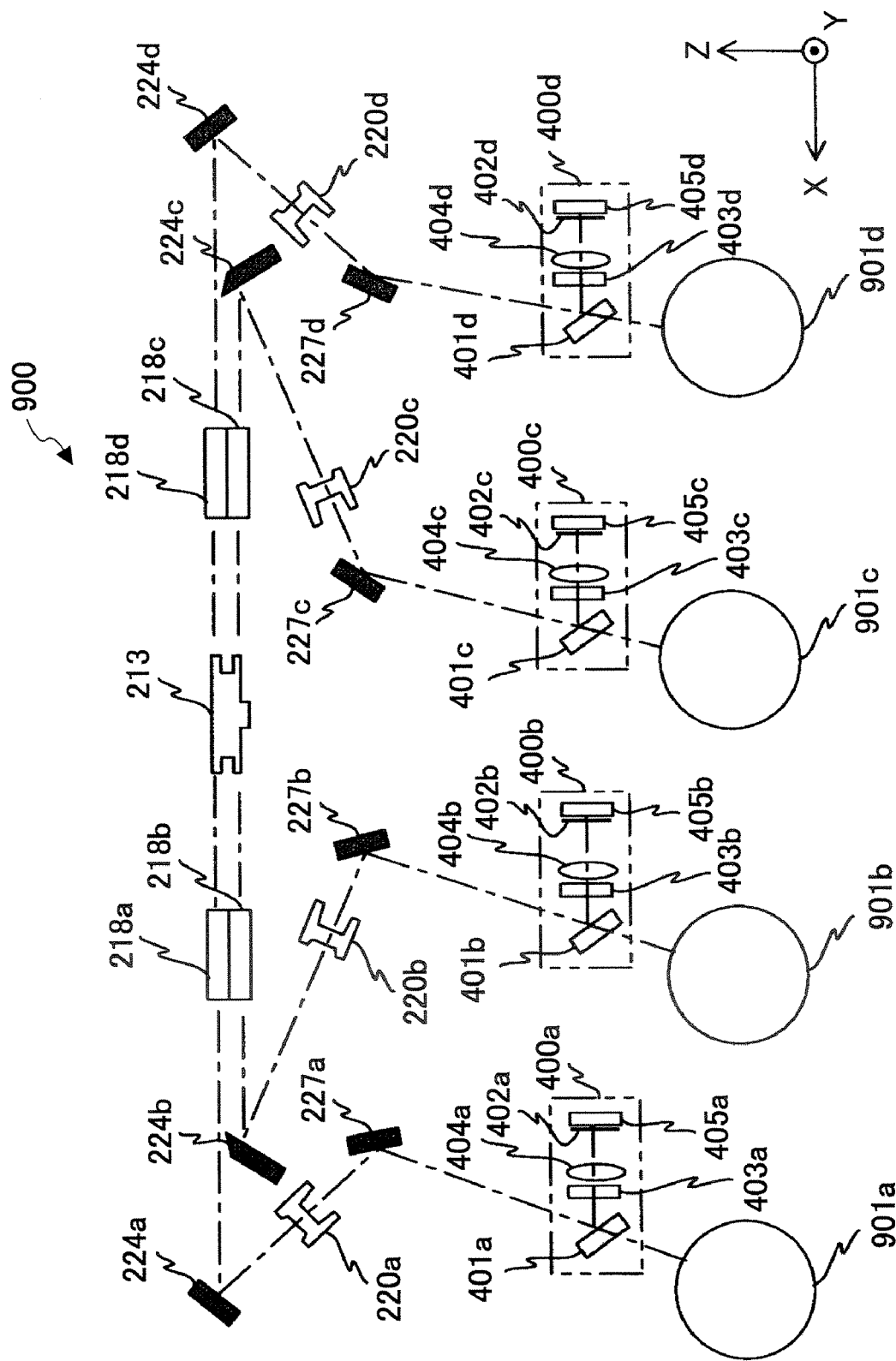
FIG. 3 is a schematic diagram showing the laser beam scanning device and photoconductor drums.
Figure 4:
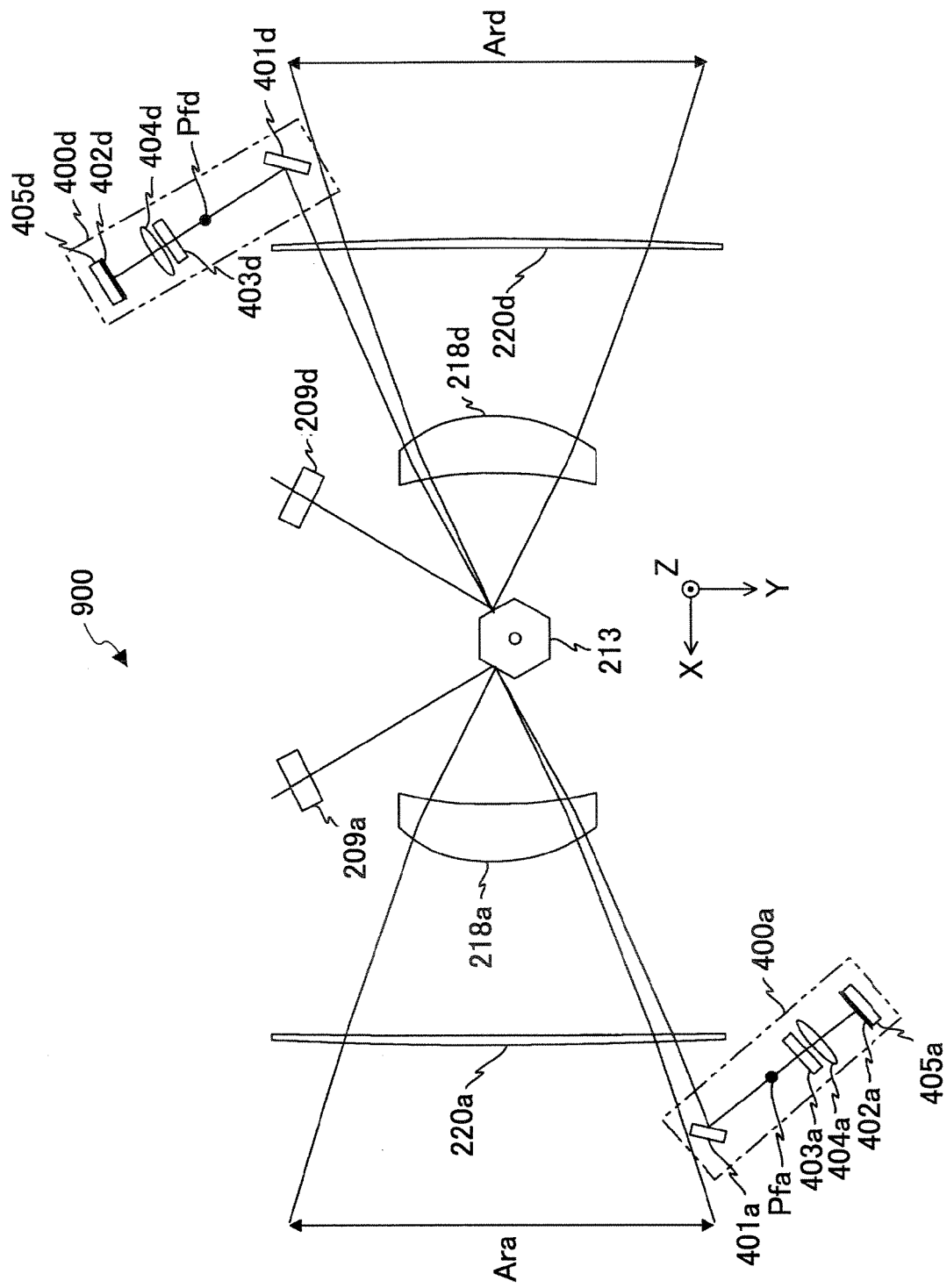
FIG. 4 is a schematic diagram showing a part of an optical system of the laser beam scanning device.

FIG. 2 is a perspective view of a part of the laser beam scanning device 900 and the photoconductor drums 901. FIG. 3 is a schematic diagram showing the laser beam scanning device 900 and photoconductor drums 901. FIG. 4 is a schematic diagram showing a part of an optical system of the laser beam scanning device 900.

Figure 17:
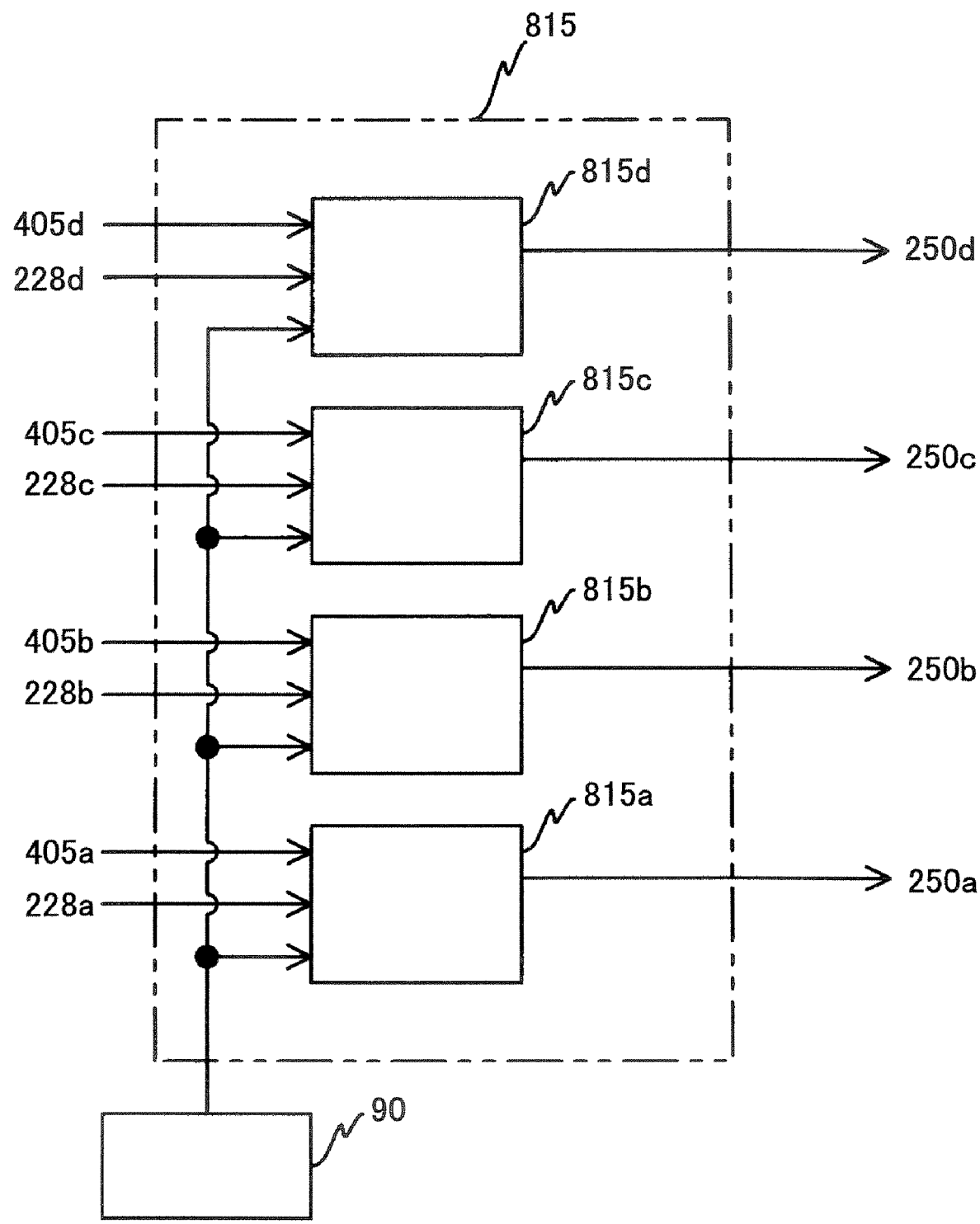
FIG. 17 is a diagram showing a processing circuit in the laser beam scanning device.

As shown in FIGS. 2 through 4, the laser beam scanning device 900 includes four light source units 250a, 250b, 250c, and 250d, four coupling lenses 207a, 207b, 207c, and 207d (not shown), four apertures 208a, 208b, 208c, and 208d (not shown), four cylindrical lenses 209a, 209b, 209c, and 209d, a polygon mirror 213, four fθ lenses 218a, 218b, 218c, and 218d, eight optical path folding mirrors 224a, 224b, 224c, 224d, 227a, 227b, 227c, and 227d, four toroidal lenses 220a, 220b, 220c, and 220d, four synchronization sensors 228a, 228b, 228c, and 228d (not shown), four sub scanning position detecting system 400a, 400b, 400c, and 400d, and a processing circuit 815 (refer to FIG. 17).

As described above, in FIGS. 2 through 4, the coupling lens 207, the aperture 208, and the synchronization sensor 228 are not shown; however, each of those is described with the corresponding reference number.

The light source unit 250a emits a laser beam modulated corresponding to the black image information (in some cases, hereinafter referred to as a black beam). The light source unit 250b emits a laser beam modulated corresponding to the cyan image information (in some cases, hereinafter referred to as a cyan beam). The light source unit 250c emits a laser beam modulated corresponding to the magenta image information (in some cases, hereinafter referred to as a magenta beam). The light source unit 250d emits a laser beam modulated corresponding to the yellow image information (in some cases, hereinafter referred to as a yellow beam).

The coupling lens 207a, the aperture 208a, the cylindrical lens 209a, the fθ lens 218a, the optical path folding mirror 224a, the toroidal lens 220a, the optical path folding mirror 227a, the synchronization sensor 228a, and the sub scanning position detecting system 400a correspond to the black beam.

The coupling lens 207b, the aperture 208b, the cylindrical lens 209b, the fθ lens 218b, the optical path folding mirror 224b, the toroidal lens 220b, the optical path folding mirror 227b, the synchronization sensor 228b, and the sub scanning position detecting system 400b correspond to the cyan beam.

The coupling lens 207c, the aperture 208c, the cylindrical lens 209c, the fθ lens 218c, the optical path folding mirror 224c, the toroidal lens 220c, the optical path folding mirror 227c, the synchronization sensor 228c, and the sub scanning position detecting system 400c correspond to the magenta beam.

The coupling lens 207d, the aperture 208d, the cylindrical lens 209d, the fθ lens 218d, the optical path folding mirror 224d, the toroidal lens 220d, the optical path folding mirror 227d, the synchronization sensor 228d, and the sub scanning position detecting system 400d correspond to the yellow beam.

The laser beams emitted from the light source unit 250 are formed as nearly parallel beams by the coupling lens 207 and the nearly parallel beams are shaped as beams by the aperture 208. The shaped beams are converged by the cylindrical lens 209 only in the direction corresponding to the sub scanning direction. The converged beams form a long line image at the deflection surface position of the polygon mirror 213 in the direction corresponding to the main scanning direction. The deflecting point in the polygon mirror 213 and the condensing point on the surface of the photoconductor drum 901 are conjugated in the sub scanning direction.

The polygon mirror 213 is formed of a two-step structure and each step has a six-surface mirror. The laser beams from the cylindrical lenses 209a and 209d are deflected at the first step six-surface mirror, and the laser beams from the cylindrical lenses 209b and 209c are deflected at the second step six-surface mirror. That is, all the laser beams are deflected by the single polygon mirror 213.

The fθ lens 218 has a non-arc-shaped surface so that a light spot moves at a constant velocity in the main scanning direction on the surface of the photoconductor drum 901 corresponding to the rotation of the polygon mirror 213. The fθ lenses 218a and 218b are disposed at one side (+X side in FIG. 2) of the polygon mirror 213 and the fθ lenses 218c and 218d are disposed at the other side (−X side in FIG. 2) of the polygon mirror 213. The fθ lenses 218a and 218b are stacked in the direction corresponding to the sub scanning direction (Z axis direction in FIG. 2) and also the fθ lenses 218c and 218d are stacked in the direction corresponding to the sub scanning direction. An optical surface tangle error of the deflection surface of the polygon mirror 213 is corrected by the cylindrical lens 209, the fθ lens 218, and the toroidal lens 220.

The black beam from the fθ lens 218a forms a light spot on the photoconductor drum 901a via the optical path folding mirror 224a, the toroidal lens 220a, and the optical path folding mirror 227a. That is, a scanning optical system A for the photoconductor drum 901a is composed of the fθ lens 218a, the optical path folding mirror 224a, the toroidal lens 220a, and the optical path folding mirror 227a.

The cyan beam from the fθ lens 218b forms a light spot on the photoconductor drum 901b via the optical path folding mirror 224b, the toroidal lens 220b, and the optical path folding mirror 227b. That is, a scanning optical system B for the photoconductor drum 901b is composed of the fθ lens 218b, the optical path folding mirror 224b, the toroidal lens 220b, and the optical path folding mirror 227b.

The magenta beam from the fθ lens 218c forms a light spot on the photoconductor drum 901c via the optical path folding mirror 224c, the toroidal lens 220c, and the optical path folding mirror 227c. That is, a scanning optical system C for the photoconductor drum 901c is composed of the fθ lens 218c, the optical path folding mirror 224c, the toroidal lens 220c, and the optical path folding mirror 227c.

The yellow beam from the fθ lens 218d forms a light spot on the photoconductor drum 901d via the optical path folding mirror 224d, the toroidal lens 220d, and the optical path folding mirror 227d. That is, a scanning optical system D for the photoconductor drum 901d is composed of the fθ lens 218d, the optical path folding mirror 224d, the toroidal lens 220d, and the optical path folding mirror 227d.

The optical path folding mirrors 224 and 227 are disposed so that each optical path from the polygon mirror 213 to the photoconductor drum 901 is the same length and the input position and angle of the laser beam to each photoconductor drum 901 become the same.

In addition, the laser beam scanning device 900 can scan the four photoconductor drums 901a through 901d at the same time.

The synchronization sensor 228 (not shown) detects a scanning start on the photoconductor drum 901 in the main scanning direction. The synchronization sensor 228 is disposed at a position equivalent to an image surface on the photoconductor drum 901, and the laser beam deflected by the polygon mirror 213 is input to the synchronization sensor 228 before starting scanning in the main scanning direction. The synchronization sensor 228 outputs a signal corresponding to the received amount of the laser beam.

[Sub Scanning Position Detecting System]

The sub scanning position detecting system 400a detects the position of the light spot formed on the photoconductor drum 901a in the sub scanning direction. As shown in FIGS. 3 and 4, the sub scanning position detecting system 400a includes a reflection mirror 401a, an aperture 402a, a diffraction optical element 403a, a lens 404a, and a light receiving element (light detector) 405a. The light receiving element 405a is disposed at a position further along the optical path than a light condensing position Pfa (refer to FIG. 4) of the laser beam by the scanning optical system A.

The reflection mirror 401a is disposed between the optical path folding mirror 227a and the photoconductor drum 901a on an optical path of the laser beam which scans a region outside an image forming region Ara (refer to FIG. 4) on the photoconductor drum 901a at the time of scanning in the main scanning direction. The diffraction optical element 403a forms a pattern of a diffraction image to which element the laser beam reflected from the reflection mirror 401a is input. The lens 404a condenses the laser beam from the diffraction optical element 403a so that the light condensing position Pfa of the laser beam by the scanning optical system A and the light receiving position on the light receiving element 405a are conjugated. The aperture 402a controls the width in the direction corresponding to the sub scanning direction in the light receiving region of the light receiving element 405a so that the light receiving element 405a detects only a part of the diffraction image (far field pattern) formed by the diffraction optical element 403a and the lens 404a. The laser beam that has passed through the aperture 402a (a part of the diffraction laser beam) is received at the receiving surface of the light receiving element 405a. That is, the width in the direction corresponding to the sub scanning direction of the laser beam input to the light receiving element 405a is controlled by the aperture 402a.

The sub scanning position detecting system 400b detects the position of the light spot formed on the photoconductor drum 901b in the sub scanning direction. As shown in FIG. 3, the sub scanning position detecting system 400b includes a reflection mirror 401b, an aperture 402b, a diffraction optical element 403b, a lens 404b, and a light receiving element 405b. The light receiving element 405b is disposed at a position further along the optical path than a light condensing position of the laser beam by the scanning optical system B.

The reflection mirror 401b is disposed between the optical path folding mirror 227b and the photoconductor drum 901b on an optical path of the laser beam which scans a region outside an image forming region on the photoconductor drum 901b at the time of scanning in the main scanning direction. The diffraction optical element 403b forms a pattern of a diffraction image to which element the laser beam reflected from the reflection mirror 401b is input. The lens 404b condenses the laser beam from the diffraction optical element 403b so that the light condensing position of the laser beam by the scanning optical system B and the light receiving position on the light receiving element 405b are conjugated. The aperture 402b controls the width in the direction corresponding to the sub scanning direction in the light receiving region of the light receiving element 405b so that the light receiving element 405b detects only a part of the diffraction image (far field pattern) formed by the diffraction optical element 403b and the lens 404b. The laser beam that has passed through the aperture 402b (a part of the diffraction laser beam) is received at the receiving surface of the light receiving element 405b. That is, the width in the direction corresponding to the sub scanning direction of the laser beam input to the light receiving element 405b is controlled by the aperture 402b.

The sub scanning position detecting system 400c detects the position of the light spot formed on the photoconductor drum 901c in the sub scanning direction. As shown in FIG. 3, the sub scanning position detecting system 400c includes a reflection mirror 401c, an aperture 402c, a diffraction optical element 403c, a lens 404c, and a light receiving element 405c. The light receiving element 405c is disposed at a position further along the optical path than a light condensing position of the laser beam by the scanning optical system C.

The reflection mirror 401c is disposed between the optical path folding mirror 227c and the photoconductor drum 901c on an optical path of the laser beam which scans a region outside an image forming region on the photoconductor drum 901c at the time of scanning in the main scanning direction. The diffraction optical element 403c forms a pattern of a diffraction image to which element the laser beam reflected from the reflection mirror 401c is input. The lens 404c condenses the laser beam from the diffraction optical element 403c so that the light condensing position of the laser beam by the scanning optical system C and the light receiving position on the light receiving element 405c are conjugated. The aperture 402c controls the width in the direction corresponding to the sub scanning direction in the light receiving region of the light receiving element 405c so that the light receiving element 405c detects only a part of the diffraction image (far field pattern) formed by the diffraction optical element 403c and the lens 404c. The laser beam that has passed through the aperture 402c (a part of the diffraction laser beam) is received at the receiving surface of the light receiving element 405c. That is, the width in the direction corresponding to the sub scanning direction of the laser beam input to the light receiving element 405c is controlled by the aperture 402c.

The sub scanning position detecting system 400d detects the position of the light spot formed on the photoconductor drum 901d in the sub scanning direction. As shown in FIGS. 3 and 4, the sub scanning position detecting system 400d includes a reflection mirror 401d, an aperture 402d, a diffraction optical element 403d, a lens 404d, and a light receiving element 405d. The light receiving element 405d is disposed at a position further along the optical path than a light condensing position Pfd (refer to FIG. 4) of the laser beam by the scanning optical system D.

The reflection mirror 401d is disposed between the optical path folding mirror 227d and the photoconductor drum 901d on an optical path of the laser beam which scans a region outside an image forming region Ard (refer to FIG. 4) on the photoconductor drum 901d at the time of scanning in the main scanning direction. The diffraction optical element 403d forms a pattern of a diffraction image to which element the laser beam reflected from the reflection mirror 401d is input. The lens 404d condenses the laser beam from the diffraction optical element 403d so that the light condensing position of the laser beam by the scanning optical system D and the light receiving position on the light receiving element 405d are conjugated. The aperture 402d controls the width in the direction corresponding to the sub scanning direction in the light receiving region of the light receiving element 405d so that the light receiving element 405d detects only a part of the diffraction image (far field pattern) formed by the diffraction optical element 403d and the lens 404d. The laser beam that has passed through the aperture 402d (a part of the diffraction laser beam) is received at the receiving surface of the light receiving element 405d. That is, the width in the direction corresponding to the sub scanning direction of the laser beam input to the light receiving element 405d is controlled by the aperture 402d.

The diffraction optical element 403 has concave sections and convex sections arrayed two-dimensionally so as to form a diffraction image (far field pattern) by spatially modulating the phase of an input laser beam.

Figure 6:
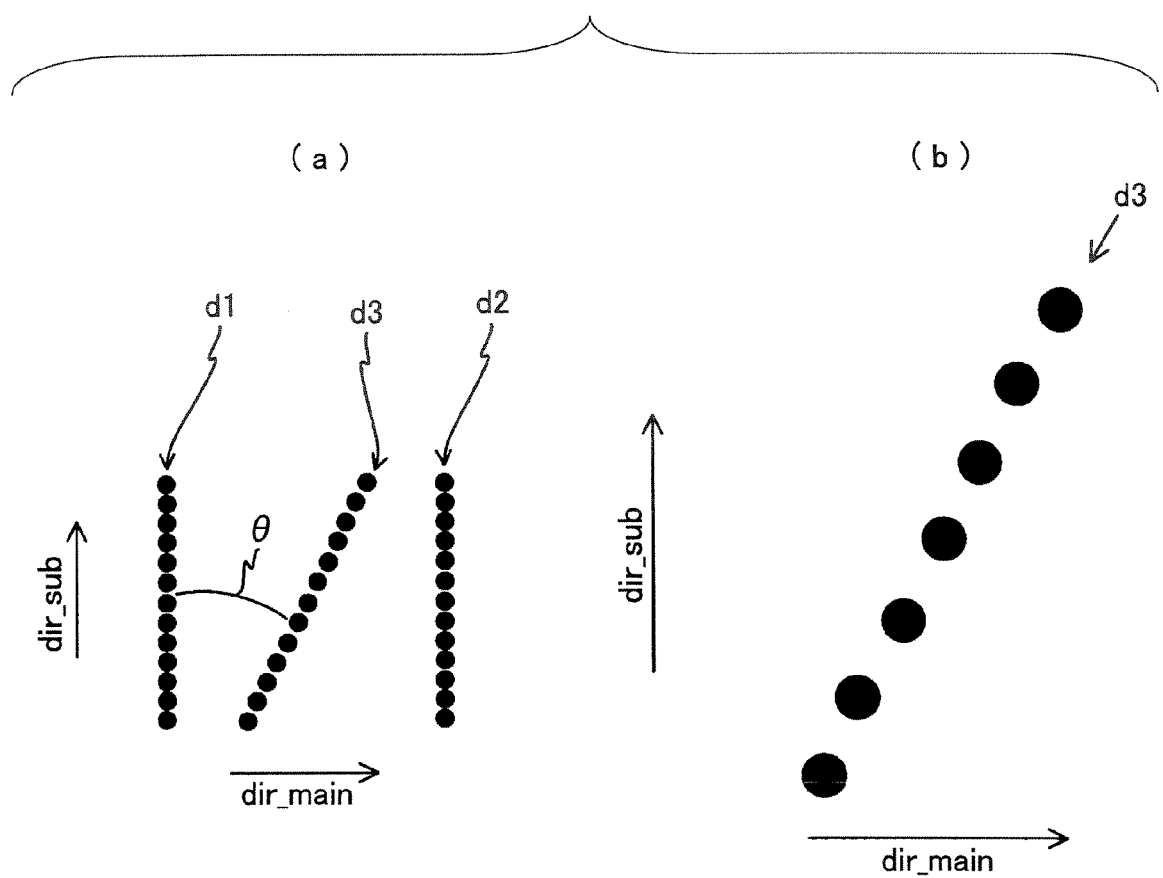
FIG. 6 is a diagram showing a pattern of a diffraction image formed by the diffraction optical element.

FIG. 6 is a diagram showing a pattern of a diffraction image formed by the diffraction optical element 403. For example, the diffraction optical element 403 is set to form the pattern of the diffraction image shown in FIG. 6(a). The pattern of the diffraction image shown in FIG. 6(a) is formed by two dot string images d1 and d2 extending in the direction "dir_sub" corresponding to the sub scanning direction and a dot string image d3 inclining from the direction "dir_sub" by θ (0<θ<90°) and being disposed between the dot string images d1 and d2. That is, the dot string image d3 extends in a direction different from the direction "dir_main" corresponding to the main scanning direction and the direction "dir_sub" corresponding to the sub scanning direction. In FIG. 6(b), the center part of the dot string image d3 is enlarged. In FIG. 6, black shows a high light intensity part and white shows a low light intensity part. Actually, the light intensity of dots is not the same among the dots; however, in FIG. 6, the same intensity is used. The light intensity among dots is described below and in FIG. 9.

Next, the sub scanning position detecting system 400 is described by using a simulation result by a computer. The sub scanning position detecting system 400 detects the position of the light spot formed on the photoconductor drum 901 in the sub scanning direction.

Figure 5:
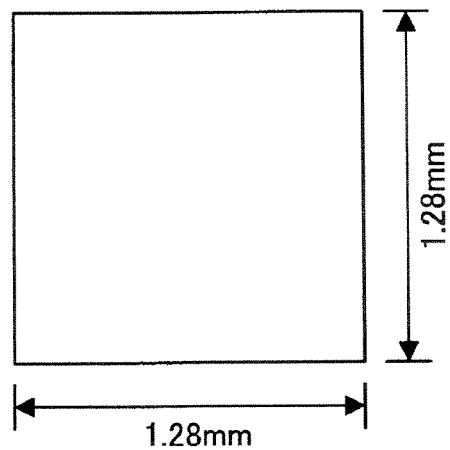
FIG. 5 is a diagram showing a phase modulation region of a diffraction optical element.
Figure 7:
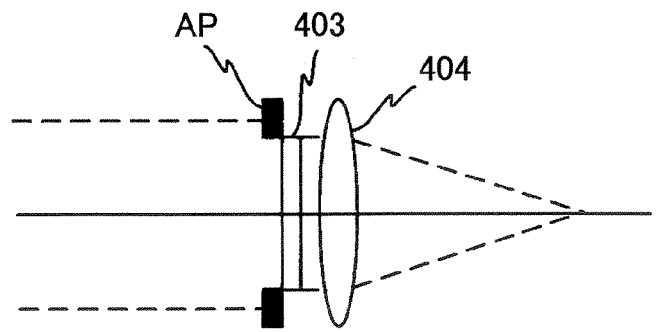
FIG. 7 is a diagram showing a part of a sub scanning position detecting system.

In the diffraction optical element 403, the diffraction region is divided into 256×256 pixels. The size of one pixel is a square of 5 μm×5 μm. Therefore, the phase modulation region of the diffraction optical element 403 is 1.28 mm×1.28 mm. FIG. 5 is a diagram showing the phase modulation region of the diffraction optical element 403. In addition, the number of the phase levels when the phase of an input laser beam is spatially modulated is 256 tones in 0 to 2Π. FIG. 7 is a diagram showing a part of the sub scanning position detecting system 400. As shown in FIG. 7, for example, an aperture AP is disposed right before the diffraction optical element 403 so that a laser beam is input to only the diffraction region, and an ideal lens 404 having a focal length of 100 mm is disposed right after (distance=0) the diffraction optical element 403. In this, when a sufficiently large size diffraction optical element is used for the size of the laser beam, the aperture AP is not needed.

Figure 8:
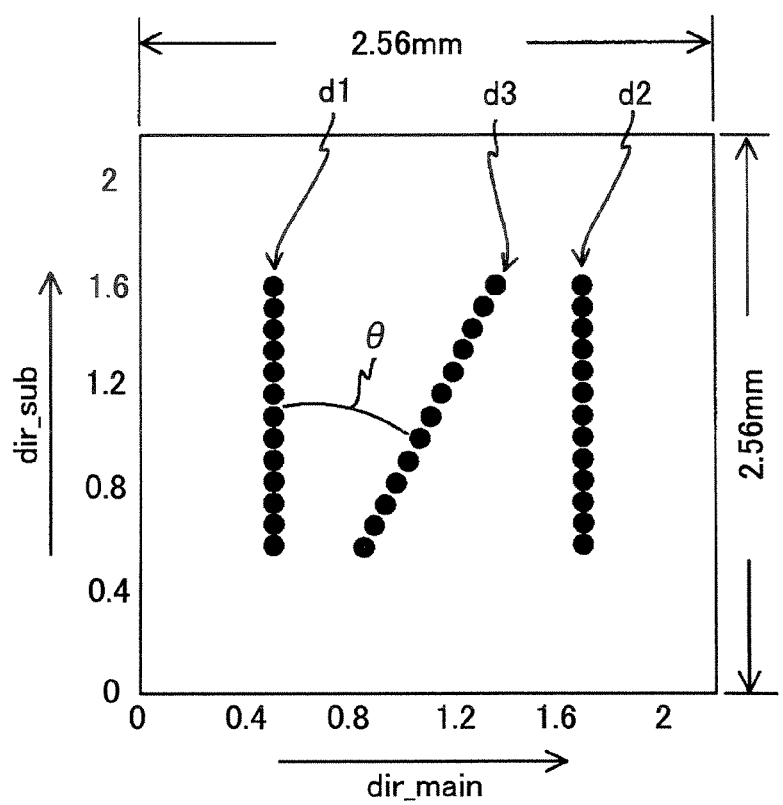
FIG. 8 is a diagram showing the pattern of the diffraction image in a calculation region and an origin by computer simulation.

In addition, at the focal position of the ideal lens 404, it is determined that the interval between dots is 100 μm in the direction "dir_sub" and the interval between dots in the dot string image d3 is 50 μm in the direction "dir_main". Further, it is determined that the beam diameter (1/e2) of each dot is approximately 70 μm. FIG. 8 is a diagram showing the pattern of the diffraction image in a calculation region and an origin by the computer simulation. As shown in FIG. 8, a square region of 2.56 mm×2.56 mm including the pattern of the diffraction image in the center is defined as the calculation region and the left lowest end of the square region is defined as the origin (0, 0) on the calculation.

Figure 9:
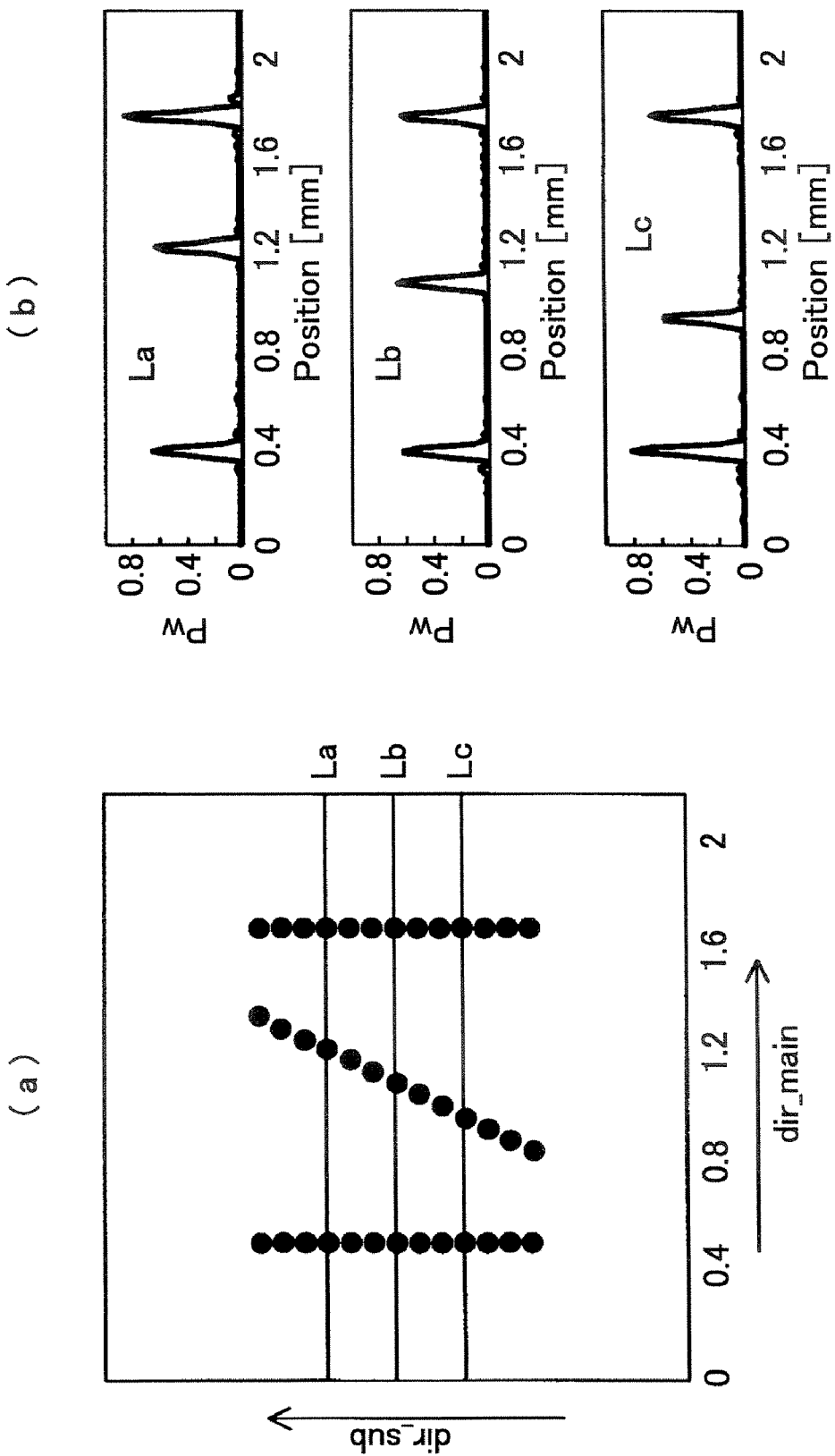
FIG. 9 is a diagram showing light intensity of the pattern of the diffraction image shown in FIG. 8.

FIG. 9 is a diagram showing light intensity of the pattern of the diffraction image shown in FIG. 8. In FIG. 9(b), calculated results of light intensity Pw on three lines La, Lb, and Lc are shown in the pattern of the diffraction image formed by the diffraction optical element 403. As shown in FIG. 9(a), the positions of the three lines La, Lb, and Lc are different from each other in the direction "dir_sub" and the three lines La, Lb, and Lc are extended in the direction "dir_main". The interval between the lines is 300 μm and the light intensity Pw is 1 at the maximum. As shown in FIG. 9(b), the light intensity Pw is high at the dot potions.

Figure 10:
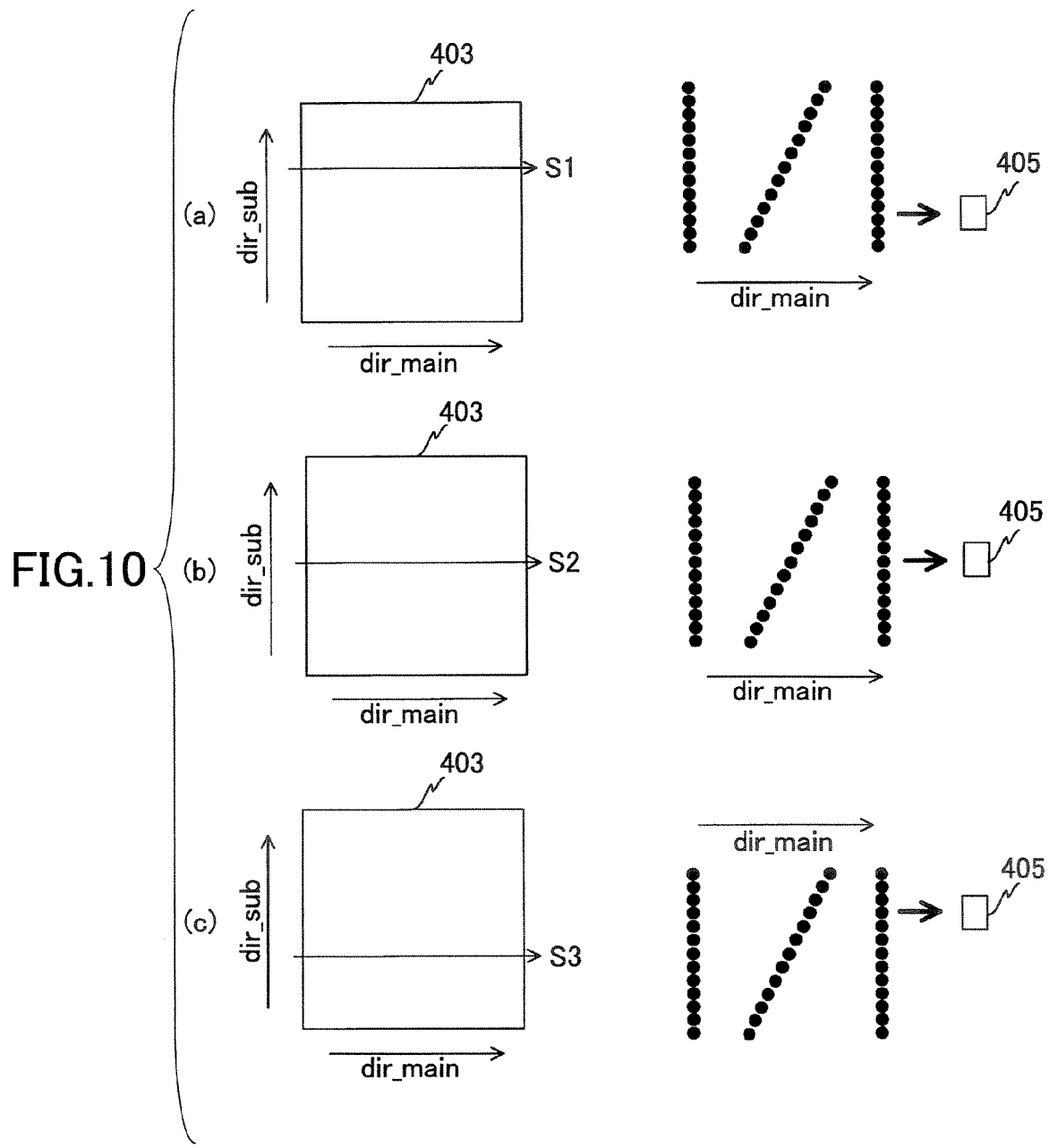
FIG. 10 is a diagram showing a relationship between a position in the direction "dir_sub" of the laser beam which scans on the diffraction optical element and a position of the formed diffraction image.

When a laser beam scans on the diffraction optical element 403 having the above characteristics in the direction "dir_main", the pattern of the diffraction image formed by the diffraction optical element 403 moves in the direction "dir_main". However, as shown in FIG. 10, when the positions of the scanning lines in the direction "dir_sub" are different from each other, the positions of the diffraction images in the direction "dir_sub" are different from each other. FIG. 10 is a diagram showing a relationship between a position in the direction "dir_sub" of the laser beam which scans on the diffraction optical element 403 and a position of the formed diffraction image. For example, as shown in FIG. 10(a), when the position of a scanning line S1 is at an upper position in the direction "dir_sub", the position of the diffraction image is formed at an upper position. As shown in FIG. 10(b), when the position of a scanning line S2 is at the center position in the direction "dir_sub", the position of the diffraction image is formed at the center position. In addition, as shown in FIG. 10(c), when the position of a scanning line S3 is at a lower position in the direction "dir_sub", the position of the diffraction image is formed at a lower position.

Figure 11:
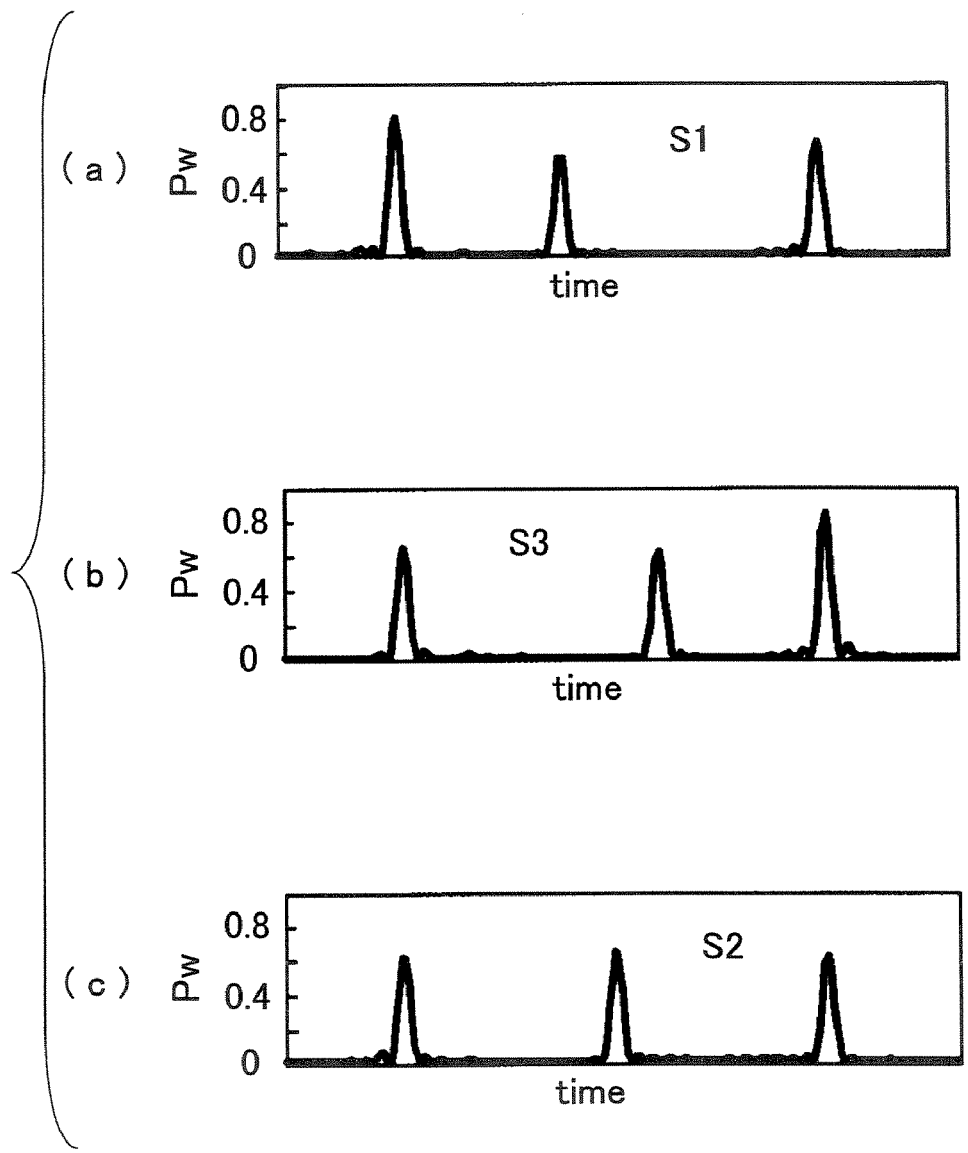
FIG. 11 is a diagram showing the light intensity of the patterns of the diffraction images shown in FIG. 10.

FIG. 11 is a diagram showing the light intensity of the patterns of the diffraction images shown in FIG. 10. As shown in FIG. 11(a) through FIG. 11(c), signals of the dot string image d3 whose detection timings are different from those of the dot string images d1 and d2 are output from the light receiving element 405. That is, the light receiving element 405 outputs signals which change based on the time interval corresponding to the input position of the laser beam to the diffraction optical element 403 in the direction "dir_sub". Therefore, the input position of the laser beam to the diffraction optical element 403 in the direction "dir_sub" can be calculated from the signal output from the light receiving element 405. In the present embodiment, for example, it is defined that the center position of the pattern of the diffraction image formed of the dot string images d1, d2, and d3 in the direction "dir_sub" is "the position of the pattern of the diffraction image in the direction "dir_sub"".

However, since the dots in the pattern of the diffraction image are actually discretely arrayed, the relationship between the position of the diffraction image in the direction "dir_sub" and the detection timing of the dot string image d3 is not always linear. When the relationship between the position of the pattern of the diffraction image in the direction "dir_sub" and the detection timing of the dot string image d3 is not linear, the calculation to obtain the input position of the laser beam in the direction "dir_sub" from the signal output from the light receiving element 405 becomes complex. In addition, when a small part exists in the change of the detection timing of the dot string image d3 for the position change of the pattern of the diffraction image in the direction "dir_sub", an error in the detection becomes large.

Therefore, in order to obtain influence of the size (ds) of the light receiving element 405 in the direction "dir_sub" on a relationship between the position of the pattern of the diffraction image in the direction "dir_sub" and the detection timing of the dot string image d3, a computer simulation is executed. That is, by the computer simulation, a relationship between the position Dpd of the light receiving element 405 and the detection position Dd3 of the dot string image d3 is obtained while the diffraction image is fixed and the position Dpd of the light receiving element 405 is changed in the direction "dir_sub". In the computer simulation, the above positions are calculated from the origin (0, 0).

Figure 12:
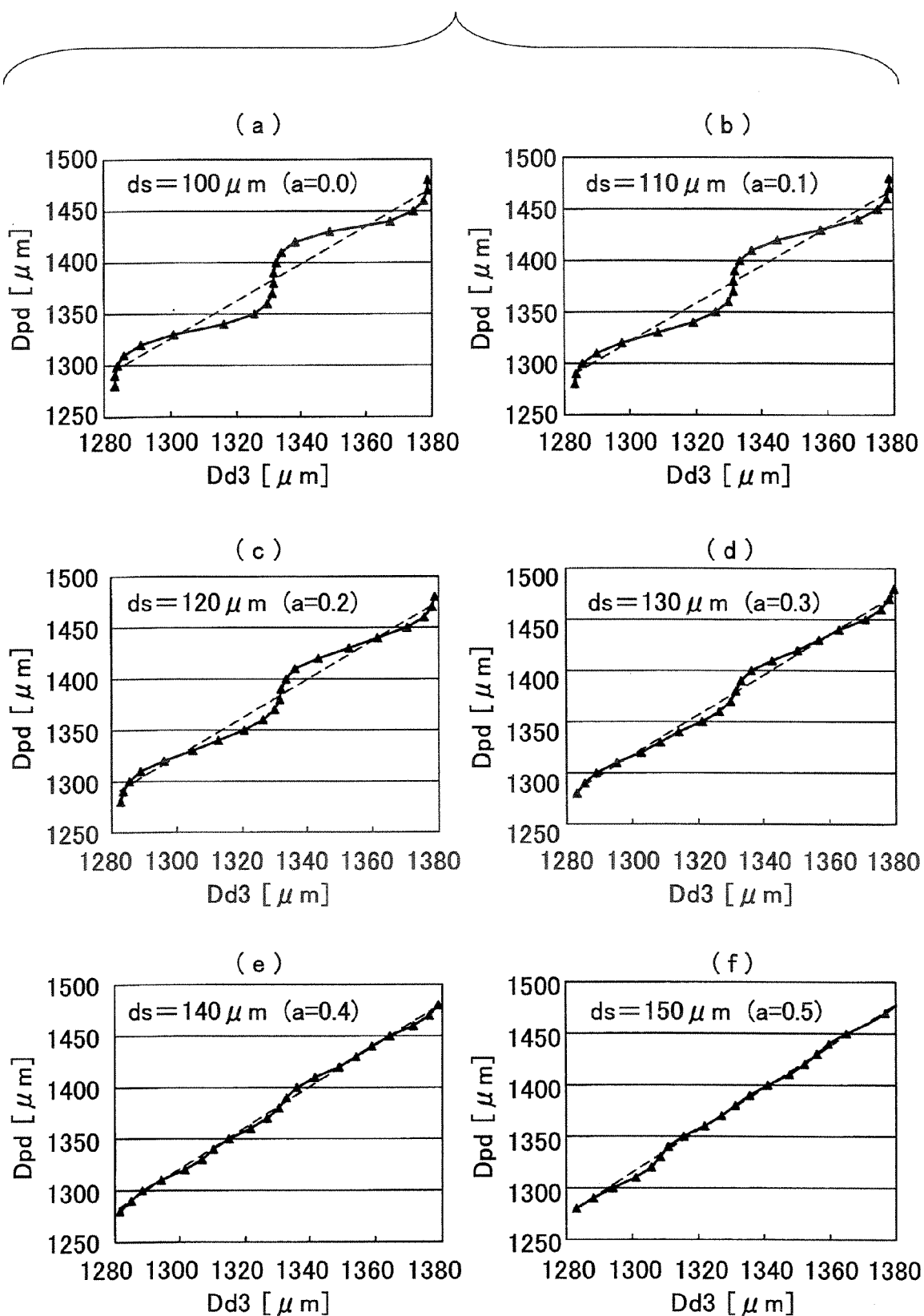
FIG. 12 is a graph showing a relationship between a position Dpd of the light receiving element and the detection position Dd3 of a dot string image d3.
Figure 13:
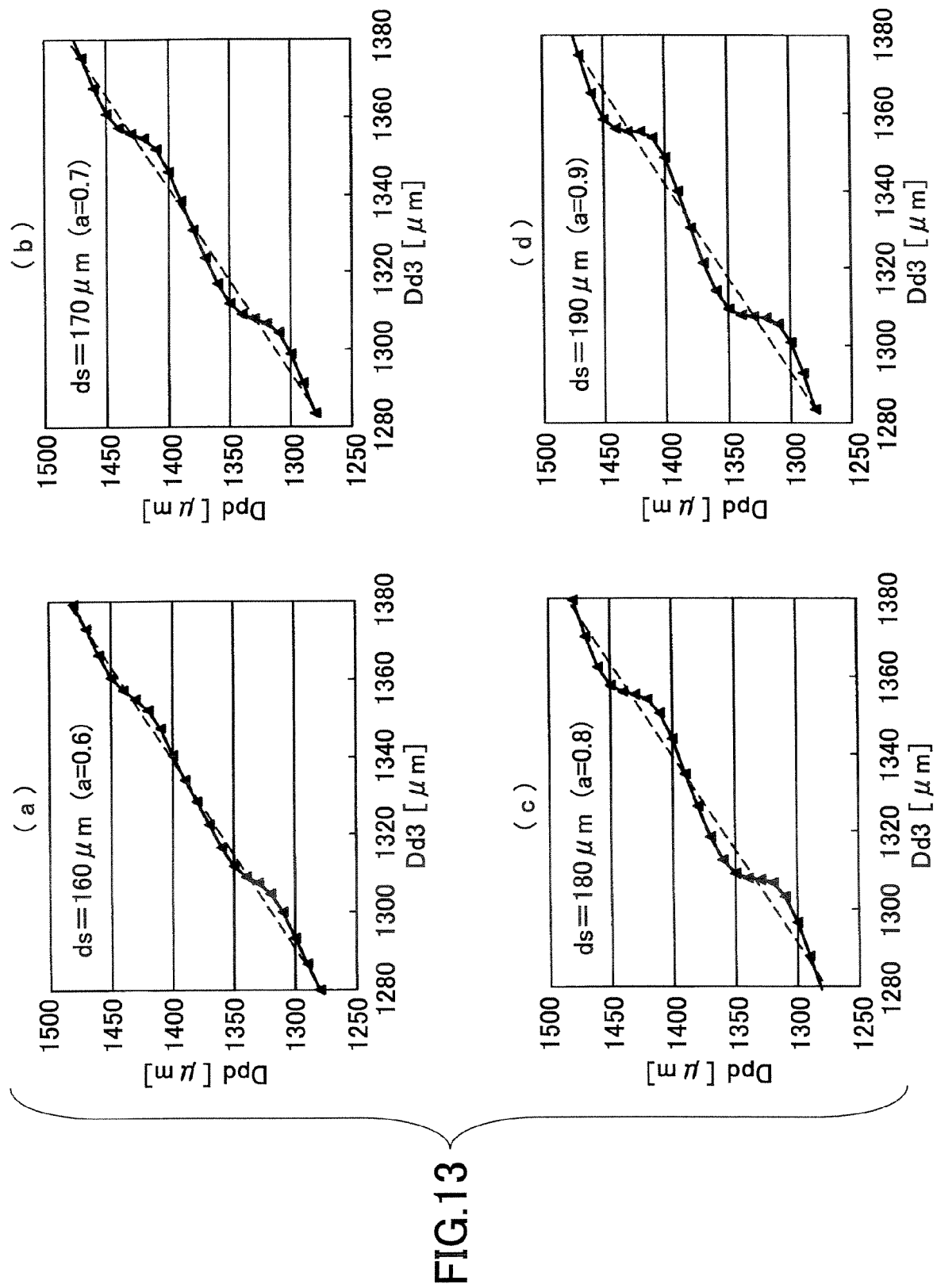
FIG. 13 is another graph showing the relationship between the position Dpd of the light receiving element and the detection position Dd3 of the dot string image d3.

FIG. 12 is a graph showing the relationship between the position Dpd of the light receiving element 405 and the detection position Dd3 of the dot string image d3. FIG. 13 is another graph showing the relationship between the position Dpd of the light receiving element 405 and the detection position (Dd3) of the dot string image d3.

In FIG. 12, (a) shows a calculated result where ds=100 μm, (b) shows a calculated result where ds=110 μm, (c) shows a calculated result where ds=120 μm, (d) shows a calculated result where ds=130 μm, (e) shows a calculated result where ds=140 μm, and (f) shows a calculated result where ds=150 μm. In addition, in FIG. 13, (a) shows a calculated result where ds=160 μm, (b) shows a calculated result where ds=170 μm, (c) shows a calculated result where ds=180 μm, and (d) shows a calculated result where ds=190 μm.

Figure 14:
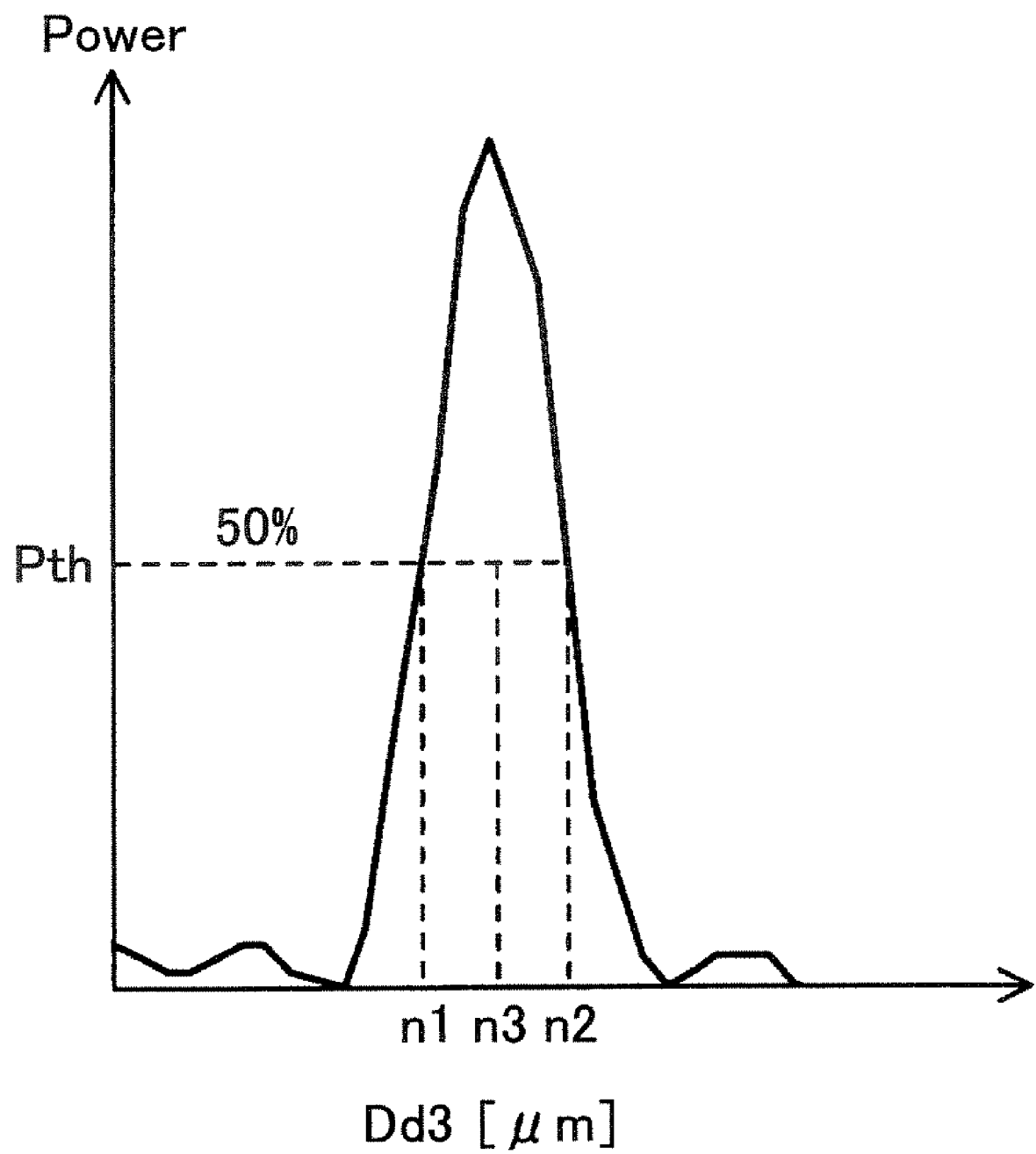
FIG. 14 is a graph showing the detection position Dd3 of the dot string image d3 for a signal output from the light receiving element.

FIG. 14 is a graph showing the detection position Dd3 of the dot string image d3 for a signal output from the light receiving element 405. For example, in FIG. 14, a threshold Pth of the light intensity is 50% of the maximum intensity, and the detection position Dd3 of the dot string image d3 is shown in three positions. That is, the position n1 which crosses the threshold Pth while the light intensity is increasing, the position n2 which crosses the threshold Pth while the light intensity is decreasing, and the position n3 which is the middle point between the positions n1 and n2.

Figure 15:
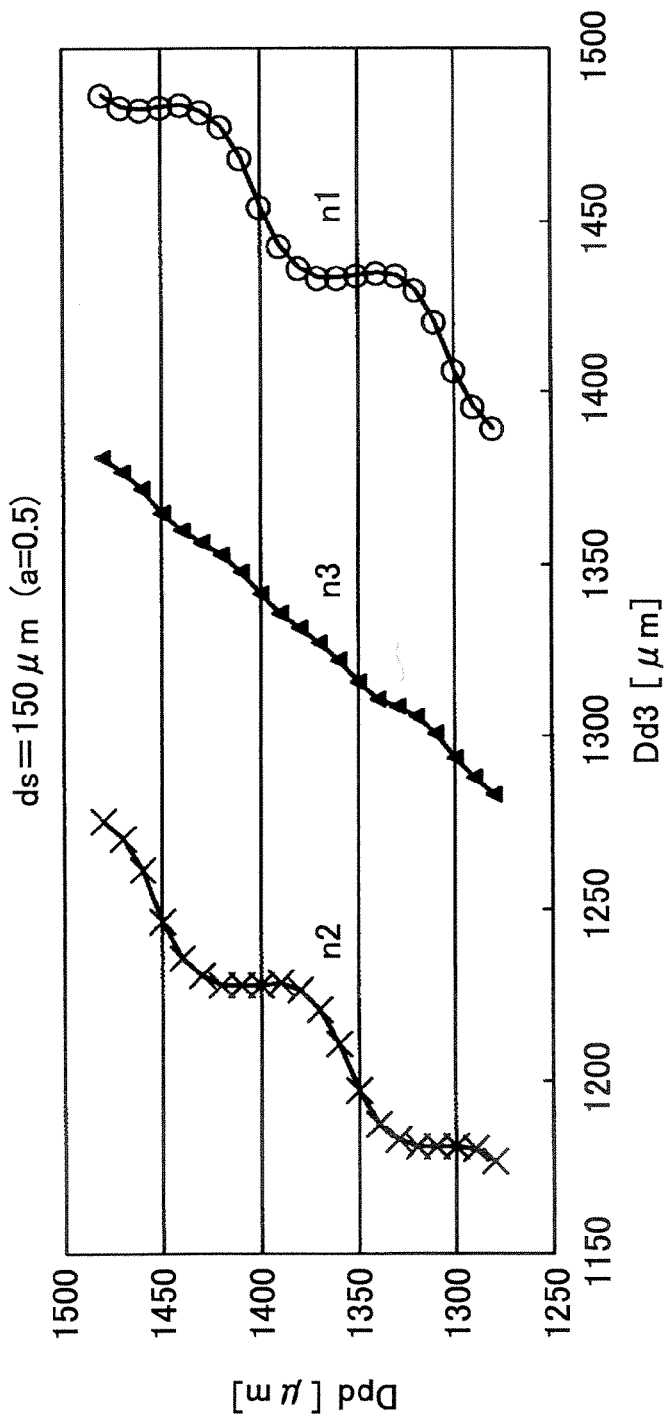
FIG. 15 is a graph showing a relationship between the position Dpd of the light receiving element and the detection position Dd3 of the dot string image d3 when ds=150 μm and the Dd3 is set in three positions n1, n2, and n3 shown in FIG. 14.

FIG. 15 is a graph showing the relationship between the position Dpd of the light receiving element 405 and the detection position Dd3 of the dot string image d3 when ds=150 μm and Dd3 is in three positions n1, n2, and n3 shown in FIG. 14. As shown in FIG. 15, when the detection position Dd3 of the dot string image d3 is at the position n3, the detection error caused by the irregularity of the light intensity can be decreased; further, the detection error caused by the discretely arrayed dots can be decreased.

In the above, it is not necessary that the position n3 which is the middle position between the positions n1 and n2 be the detection position Dd3 of the dot string image d3. The detection position Dd3 of the dot string image d3 can be a position obtained from an equation using the positions n1 and n2. Further, sampling is applied to positions between the positions n1 and n2 by using a suitable time interval and the detection position Dd3 of the dot string image d3 can be a center of the values obtained by the sampling.

By the result of the computer simulation, a relationship between a parameter "a" and a parameter which shows linearity of the relationship between the position Dpd of the light receiving element 405 and the detection position Dd3 of the dot string image d3 is obtained. The parameter "a" shows the size of the light receiving element 405 in the direction "dir_sub" for the dot interval in the dot string image d3 in the direction "dir_sub".

For example, as the parameter which shows linearity of the relationship between the position Dpd of the light receiving element 405 and the detection position Dd3 of the dot string image d3, a parameter $R^2$ is used. The parameter $R^2$ is a certainty factor and is a value between 0 and 1. The nearer to 1 the parameter $R^2$ is, the more the linearity is.

The parameter "a" is obtained by Equation (1) where the dot interval in the dot string image d3 in the direction "dir_sub" is ps mm, the size of the light receiving element 405 in the direction "dir_sub" is ds mm, and (ds−ps×n) is positive 0 or the maximum positive integer n.

$$a=(ds-ps\times n)/ps \tag{1}$$

When a=0.0, ds coincides with a value in which ps is multiplied by an integer. When ps=100 μm, ds=100 μm corresponds to a=0.0, ds=110 μm corresponds to a=0.1, ds=120 μm corresponds to a=0.2, ds=130 μm corresponds to a=0.3, ds=140 μm corresponds to a=0.4, and ds=150 μm corresponds to a=0.5. Further, when ps=100 μm, ds=160 μm corresponds to a=0.6, ds=170 μm corresponds to a=0.7, ds=180 μm corresponds to a=0.8, and ds=190 μm corresponds to a=0.9.

Figure 16:
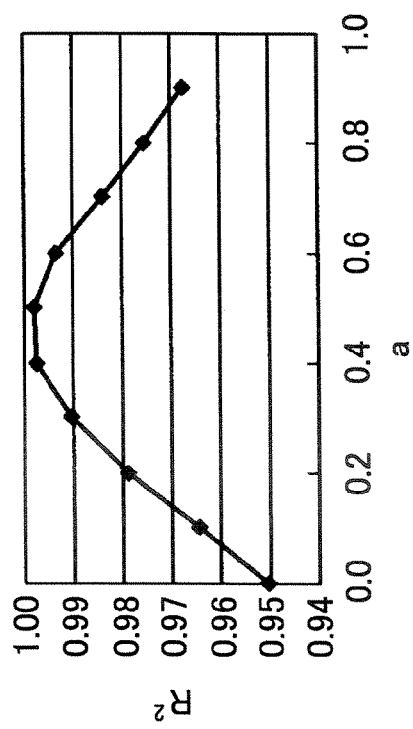
FIG. 16 is a graph showing a relationship between a parameter "a" and a parameter $R^2$.

FIG. 16 is a graph showing the relationship between the parameter "a" and the parameter $R^2$. As shown in FIG. 16, when the size of the light receiving element 405 in the direction "dir_sub" is different from a value where the dot interval in the dot string image d3 in the direction "dir_sub" is multiplied by an integer, the linearity of the relationship between the position Dpd of the light receiving element 405 and the detection position Dd3 of the dot string image d3 is improved. As shown in FIG. 16, it is most suitable that the parameter "a" be approximately 0.5. Therefore, in the present embodiment, the aperture 402 is disposed before the light receiving element 405, and the size of the light receiving element 405 in the direction "dir_sub" is determined to be 150 μm. However, it is possible that the size of the light receiving element 405 itself is 150 μm without using the aperture 402.

In addition, the irregularity of the light intensity among dots causes the linearity to become lower. Therefore, when the uniformity of the light intensity of dots is increased, the linearity of the relationship between the position Dpd of the light receiving element 405 and the detection position Dd3 of the dot string image d3 can be increased.

Next, a light source control circuit is described.

[Light Source Control Circuit]

FIG. 17 is a diagram showing the processing circuit 815 in the laser beam scanning device 900. As shown in FIG. 17, the processing circuit 815 includes four light source control circuits 815a, 815b, 815c, and 815d.

The light source control circuit 815a controls the light source unit 250a based on the black image information from the external apparatus 90, an output signal from the synchronization sensor 228a, an output signal from the light receiving element 405a, and so on. The light source control circuit 815b controls the light source unit 250b based on the cyan image information from the external apparatus 90, an output signal from the synchronization sensor 228b, an output signal from the light receiving element 405b, and so on. The light source control circuit 815c controls the light source unit 250c based on the magenta image information from the external apparatus 90, an output signal from the synchronization sensor 228c, an output signal from the light receiving element 405c, and so on. The light source control circuit 815d controls the light source unit 250d based on the yellow image information from the external apparatus 90, an output signal from the synchronization sensor 228d, an output signal from the light receiving element 405d, and so on. Each light source control circuit has almost the same structure; therefore, the light source control circuit 815c is described as the representative.

Figure 18:
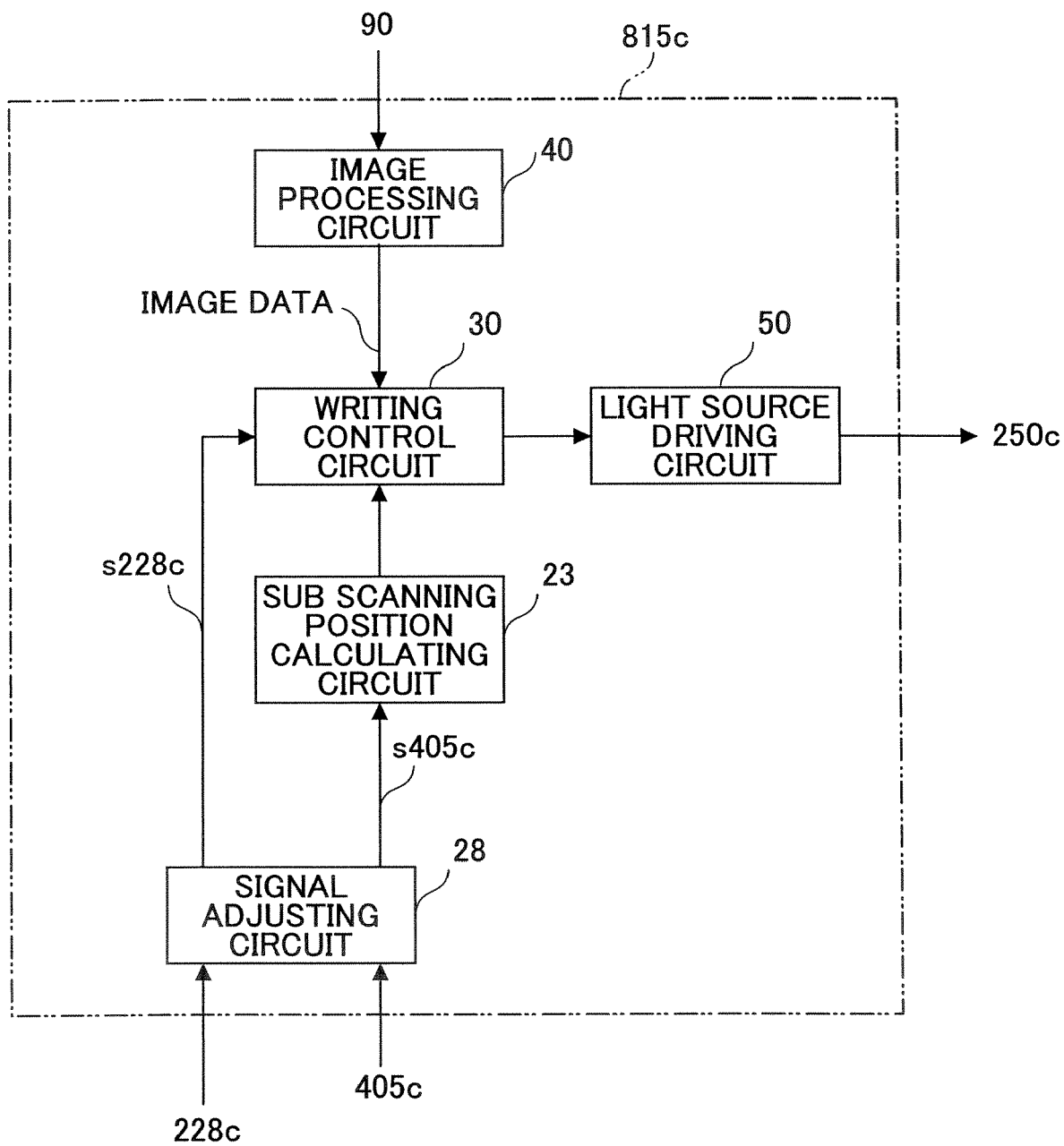
FIG. 18 is a block diagram showing a light source control circuit shown in FIG. 17.

FIG. 18 is a block diagram showing the light source control circuit 815c shown in FIG. 17. As shown in FIG. 18, the light source control circuit 815c includes a signal adjusting circuit 28, a sub scanning position calculating circuit 23, a writing control circuit 30, an image processing circuit 40, and a light source driving circuit 50.

The image processing circuit 40 forms magenta image data based on the magenta image information from the external apparatus 90.

The signal adjusting circuit 28 forms a signal s228c by amplifying, reversing, and binarizing a signal output from the synchronization sensor 228c. Therefore, when a laser beam is input to the synchronization sensor 228c, the signal s228c changes from H level to L level (high level to low level). Further, the signal adjusting circuit 28 forms a signal s405c by amplifying and binarizing a signal output from the light receiving element 405.

Figure 19:
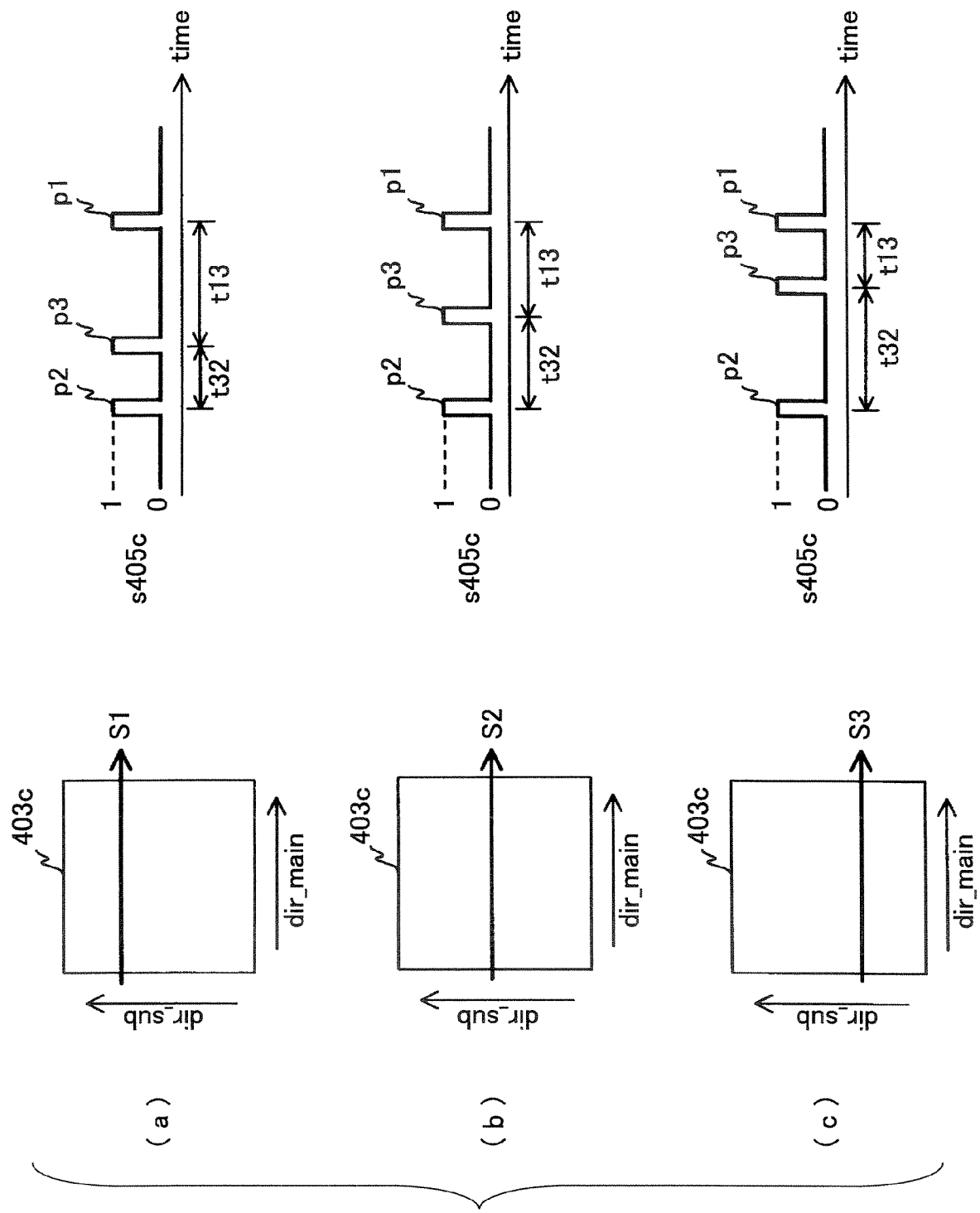
FIG. 19 is a diagram showing a signal formed by a signal adjusting circuit shown in FIG. 18.

FIG. 19 is a diagram showing the signal s405c formed by the signal adjusting circuit 28 shown in FIG. 18. As shown in FIGS. 19(a) through 19(c), the signal s405c provides a pulse p1 corresponding to the dot string image d1, a pulse p2 corresponding to the dot string image d2, and a pulse p3 corresponding to the dot string image d3, based on the corresponding scanning lines S1, S2, and S3. In addition, since the position of the pattern of the diffraction image in the direction "dir_sub" is changed by the position of the corresponding scanning lines S1 through S3 of the laser beam which scans the diffraction optical element 403c in the direction "dir_sub", the time interval t13 between the pulses p1 and p3 is different from the time interval t32 between the pulses p3 and p2.

Figure 20:
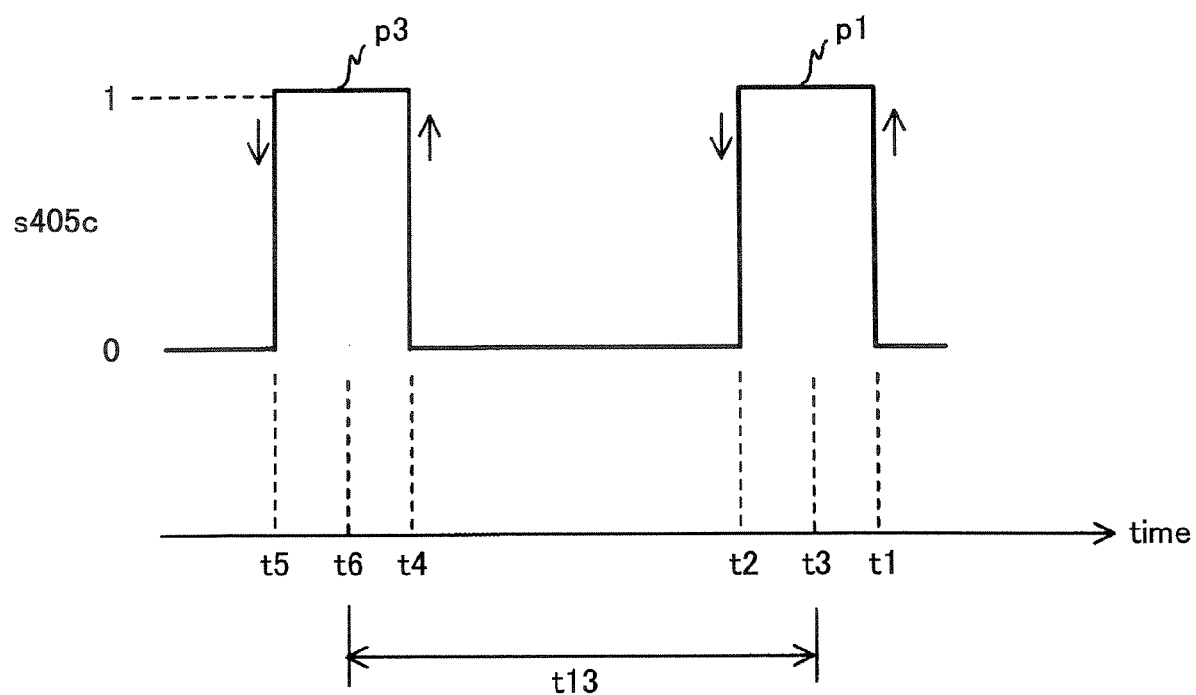
FIG. 20 is a diagram showing a calculation by a sub scanning position calculating circuit.

The sub scanning position calculating circuit 23 detects the position of the light spot on the photoconductor drum 901c in the sub scanning direction based on the signal s405c. FIG. 20 is a diagram showing a calculation by the sub scanning position calculating circuit 23. For example, as shown in FIG. 20, first, a rise timing t1 of the pulse p1, a fall timing t2 of the pulse p1, and the middle timing t3 between the timings t1 and t2, a rise timing t4 of the pulse p3, a fall timing t5 of the pulse p3, and the middle timing t6 between the timings t4 and t5 are calculated, then, the time interval t13 is calculated by the time difference between the timings t3 and t6.

Next, a difference Δt between the time interval t13 having no position shift (reference time interval) and the calculated time interval t13 is calculated, and the position shift amount and the position shift direction (+direction or −direction) of the light spot in the sub scanning direction is calculated. The reference time interval t13 and a relationship between the Δt and the position shift amount of the light spot in the sub scanning direction have been stored in a memory (not sown) beforehand. Further, the following method can be also used, that is, a timing t3' is obtained by inputting the rise timing t1 of the pulse p1 and the fall timing t2 of the pulse p1 to a predetermined equation, and a timing t6' is obtained by inputting the rise timing t4 of the pulse p3 and the fall timing t5 of the pulse p3 to a predetermined equation. Then, the time interval t13 is calculated from the timings t3' and t6'.

The writing control circuit 30 generates modulation data by allocating image data from the image processing circuit 40 to each pixel, and outputs the modulation data as serial signals. The serial signals are output corresponding to the semiconductor laser of the light source unit 250c.

In addition, the writing control circuit 30 corrects the position shift based on the position shift amount and the position shift direction of the light spot in the sub scanning direction detected by the sub scanning position calculating circuit 23. The writing control circuit 30 corrects the position shift by adjusting the image forming start position in the sub scanning direction in each line corresponding to the image resolution.

Figure 21:
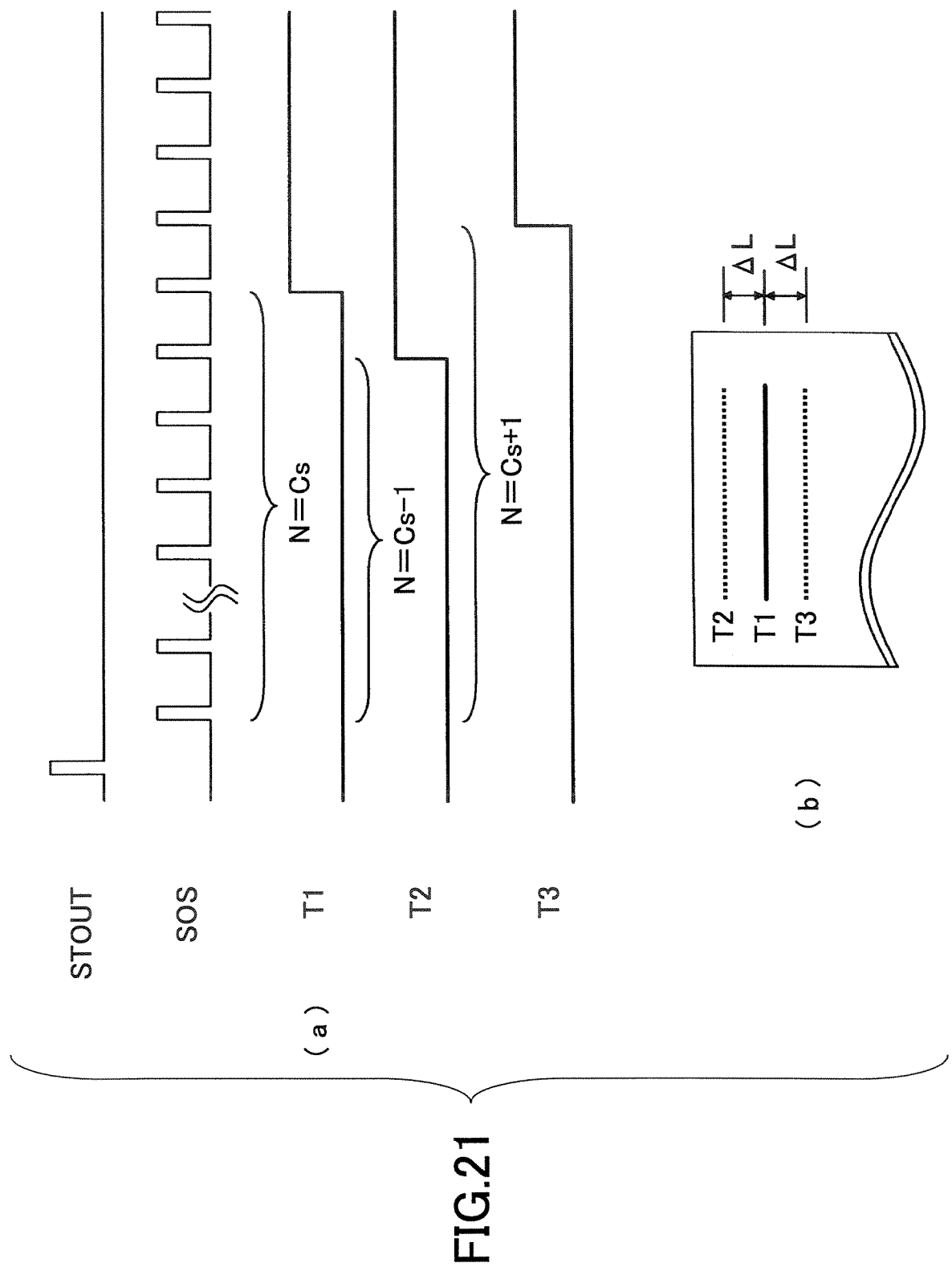
FIG. 21 is a diagram showing a correction process of a position shift of a light spot in the sub scanning direction by a writing control circuit 30 shown in FIG. 18.

FIG. 21 is a diagram showing a correction process of the position shift of the light spot in the sub scanning direction by the writing control circuit 30. For example, as shown in FIG. 21(*a*) and 21(*b*), in the writing control circuit 30, when an operation start signal STOUT is detected, the number N of light scanning start signal pulses SOS is counted; when the number N reaches a predetermined value Cs, image forming is started at a time T1. One pulse SOS is detected in each scanning. In a case where the image forming is started when the number N reaches Cs−1, the image forming is started at T2, that is, the image forming is started at T2 advanced by one line ΔL from T1. In a case where the image forming is started when the number N reaches Cs+1, the image forming is started at T3, that is, the image forming is started at T3 delayed by one line ΔL from T1.

For example, when the resolution is 600 dpi, the position in the sub scanning direction can be shifted by a 42.3 μm unit, and when the resolution is 1200 dpi, the position in the sub scanning direction can be shifted by a 21.2 μm unit. That is, the writing control circuit 30 sets the number N at the image forming start so that the position shift is corrected based on the position shift amount and the position shift direction of the light spot in the sub scanning direction detected by the sub scanning position calculating circuit 23. In addition, when blank lines are formed at the head of the image data, the correction can be executed by changing the number of the blank lines. By using the above method, the image forming start position in the sub scanning direction can be adjusted by one line unit corresponding to the image resolution.

In addition, the writing control circuit 30 makes the light intensity of the laser beam toward outside the image forming region higher than that toward inside the image forming region in the photoconductor drum 901*c*. With this, unevenness of the light intensity among dots can be decreased.

The light source driving circuit 50 generates a signal for driving the light source unit 250*c* based on a serial signal from the writing control circuit 30.

As described above, in the laser beam scanning device 900 according to the present embodiment, the writing control circuit 30 forms a first scanning position shifting unit and a laser beam intensity adjusting unit.

In addition, in the full color image forming apparatus 100 according to the present embodiment, the photoconductor drum 901 is an object to be scanned, and a transfer device is formed by the drum charger 902, the developing roller 903, the toner cartridge 904, the transfer charger 913, and the fixing roller 910.

As described above, according to the present embodiment, in each image forming station, the laser beam is irradiated on the surface of the photoconductor drum 901 from the light source unit 250, and the laser beam scanning device 900 includes the diffraction optical element 403 for forming the pattern of the diffraction image including the two dot string images d1 and d2 extending in the direction "dir_sub" and the dot string image d3 inclining from the direction "dir_sub" by θ (0<θ<90°) and the light receiving element 405 (light detector) for detecting the diffraction image.

With this, a signal including position information in the direction "dir_sub" of the laser beam which is input to the diffraction optical element 403 is output from the light receiving element 405. Consequently, the position of the light spot formed on the photoconductor drum 901 in the sub scanning direction can be accurately detected without increasing cost and making the size large.

In addition, according to the laser beam scanning device 900 of the present embodiment, the pattern of the diffraction image formed by the diffraction optical element 403 includes the dot string images d1, d2, and d3. Therefore, even if the positional relationship between the diffraction optical element 403 and the light receiving element 405 is changed with the passage of time, the detection error can be made small.

When the wavelength of the laser beam output from the semiconductor laser is changed or the diffraction optical element 403 is enlarged or reduced due to a temperature change, the pattern of the diffraction image is enlarged or reduced. However, according to the laser beam scanning device 900 of the present embodiment, the pattern of the diffraction image formed by the diffraction optical element 403 includes two diffraction images parallel to each other; therefore, an influence caused by the temperature change can be corrected by detecting the two diffraction images parallel to each other. Consequently, even if the wavelength of the laser beam output from the semiconductor laser is changed or the diffraction optical element 403 is enlarged or reduced due to the temperature change, the position of the light spot on the photoconductor drum 901 can be detected stably and accurately.

In addition, according to the laser beam scanning device 900 of the present embodiment, the diffraction optical element 403 has the concave sections and the convex sections arrayed two-dimensionally so as to form the pattern of the diffraction image by spatially modulating a phase of input laser beam. Therefore, lowering the light intensity by the diffraction optical element 403 can be prevented.

In addition, according to the laser beam scanning device 900 of the present embodiment, the lens 404 is disposed between the diffraction optical element 403 and the light receiving element 405 so that the surface equivalent to the surface of the photoconductor drum 901 and the light receiving surface of the light receiving element 405 are conjugated. Therefore, the range (dynamic range) where the position of the light spot in the sub scanning direction is detected can be widened. In addition, the size of the pattern of the diffraction image can be adjusted by the magnification of the lens 404; therefore, the degree of freedom in designing can be great.

In addition, according to the laser beam scanning device 900 of the present embodiment, the position of the light spot formed on the surface of the photoconductor drum 901 in the sub scanning direction is detected by using the laser beam toward outside the image forming region. Therefore, the position of the light spot formed on the surface of the photoconductor drum 901 in the sub scanning direction can be detected in real time.

In addition, according to the laser beam scanning device 900 of the present embodiment, the light intensity of the laser beam toward outside the image forming region is larger than that toward inside the image forming region. Therefore, the light intensity of the laser beam to be detected by the light receiving element 405 can be increased without increasing the light intensity of the laser beam toward the photoconductor drum 901. Consequently, the SN ratio of a signal which is detected by the light receiving element 405 can be increased and the detection accuracy of the signal can be increased. In addition, since the light intensity toward the photoconductor drum 901 is not increased, bad influence on the image quality of the output image and the photoconductor drum 901 can be prevented In addition, according to the laser beam scanning device 900 of the present embodiment, in the sub scanning position detecting system 400, the length of the light receiving element 405 in the direction "dir_sub" is different from a value in which the dot interval in the pattern of the diffraction image in the direction "dir_sub" is multiplied by an integer. With this, the detection error can be small.

In addition, according to the laser beam scanning device 900 of the present embodiment, in the sub scanning position detecting system 400, the aperture 402 is disposed which aperture determines that the width of the laser beam input to the light receiving element 405 in the direction "dir_sub" is 150 μm. With this, a low-cost and general-purpose light receiving element can be used as the light receiving element 405.

According to the full color image forming apparatus 100 of the present embodiment, since the laser beam scanning device 900 is provided, an image of high quality can be formed without high cost and a large size.

According to the full color image forming apparatus 100 of the present embodiment, a position shift of the light spot to be formed on the surface of the photoconductor drum 901 is corrected by adjusting the image forming start position in the sub scanning direction. With this, a full color image forming apparatus can be realized at low cost with a small size.

FIRST MODIFIED EXAMPLE OF FIRST EMBODIMENT

Next, a first modified example of the first embodiment of the present invention is described.

Figure 22:
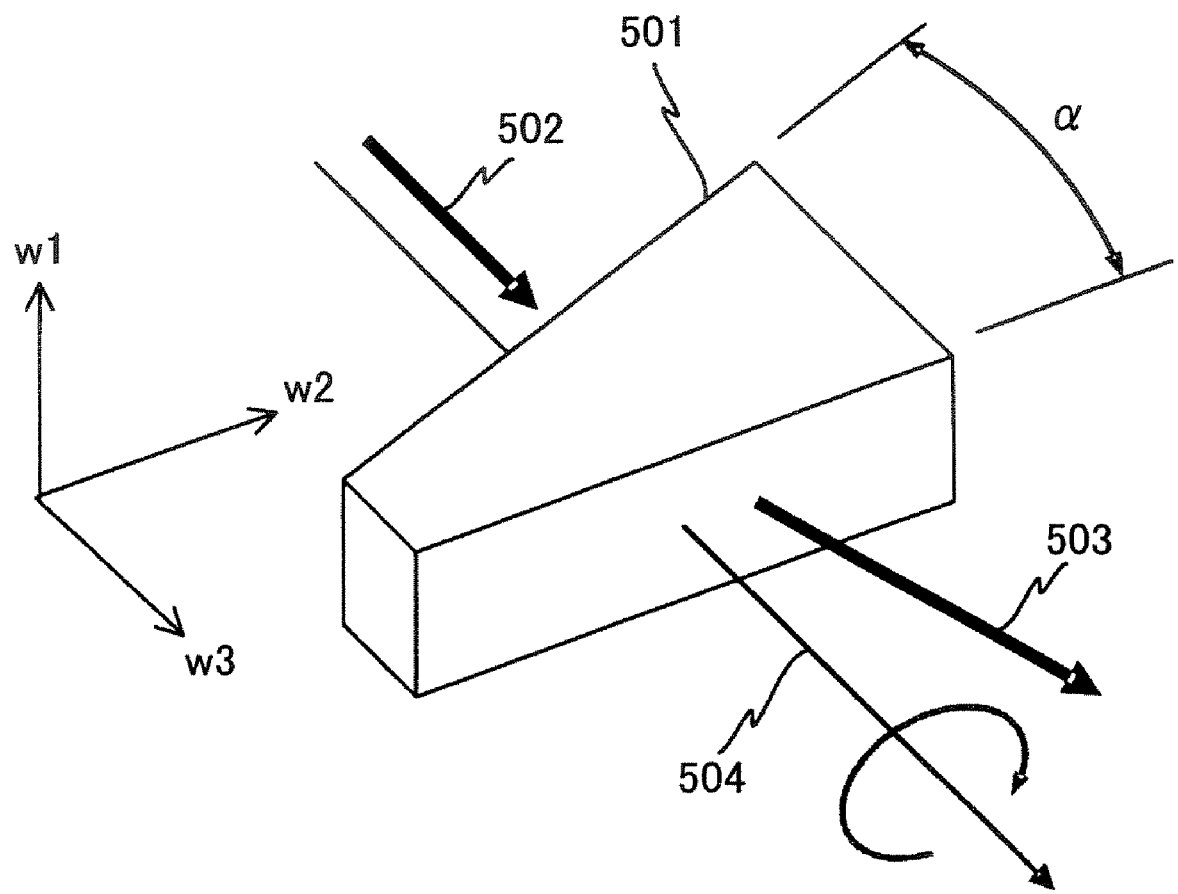
FIG. 22 is a perspective view of a mechanism using a wedge-shaped prism in a first modified example of the first embodiment of the present invention.

In the first embodiment, the position shift of the light spot to be formed on the surface of the photoconductor drum 901 is corrected by adjusting the image forming start position in the sub scanning direction; however, the correction method is not limited to the above. FIG. 22 is a perspective view of a mechanism using a wedge-shaped prism in the first modified example of the first embodiment of the present invention. For example, as shown in FIG. 22, when it is necessary to shift the position less than one line, a wedge-shaped prism 501 can be disposed between the light source unit 250 and the polygon mirror 213. The wedge-shaped prism 501 has a light input surface and a light output surface non-parallel to the light input surface and is rotated around the optical axis 504 by a rotating mechanism (not Shown). The wedge-shaped prism 501 outputs an output laser beam 503 deflected toward the direction w1 corresponding to the sub scanning direction for an input laser beam 502 based on the rotation of the wedge-shaped prism 501. In FIG. 22, the angle between the light input surface and the light output surface is α, the direction w2 corresponds to the main scanning direction and the direction w3 corresponds to the optical axis 504. In this case, the writing control circuit 30 generates a driving signal for rotating the wedge-shaped prism 501 so as to correct the position shift based on the position shift amount and the position shift direction detected by the sub scanning position calculating circuit 23, and outputs the driving signal to the rotating mechanism. With this, a second scanning position shifting unit is formed by the writing control circuit 30, the wedge-shaped prism 501, and the rotating mechanism.

SECOND MODIFIED EXAMPLE OF FIRST EMBODIMENT

Next, a second modified example of the first embodiment of the present invention is described.

Figure 23:
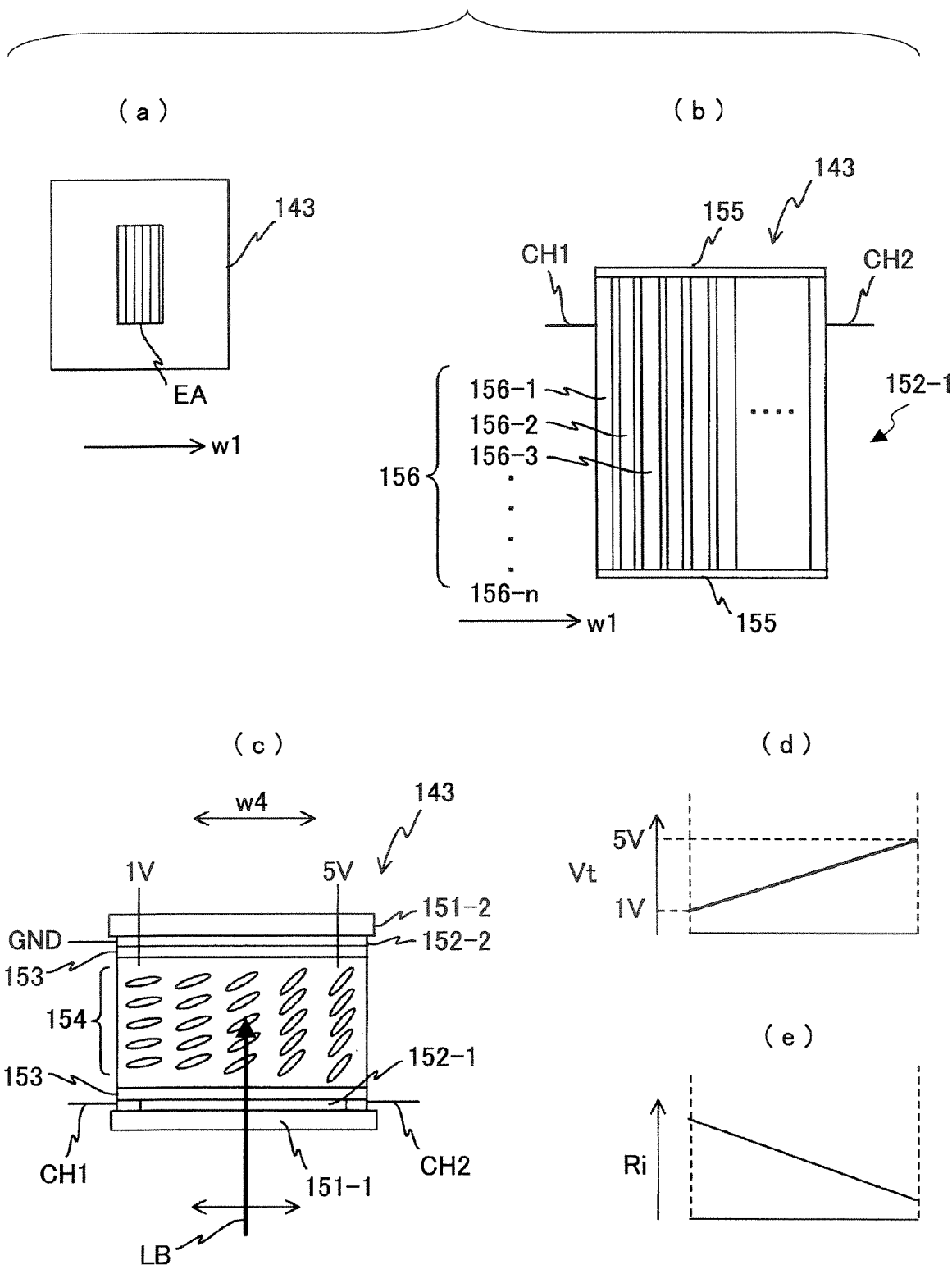
FIG. 23 is a diagram showing a liquid crystal deflection element for correcting the position shift of the light spot on the surface of the photoconductor drum.

FIG. 23 is a diagram showing a liquid crystal deflection element for correcting the position shift of the light spot on the surface of the photoconductor drum 901. As shown in FIG. 23, a liquid crystal deflection element 143 can be used to correct the position shift of the light spot on the surface of the photoconductor drum 901 in the sub scanning direction. The liquid crystal deflection element 143 deflects light by utilizing characteristics that the refractive index for light having a deflection direction is changed by applying a voltage. The liquid crystal deflection element 143 is disposed between the light source unit 250 and the polygon mirror 213, similar to the wedge-shaped prism 501.

FIG. 23(a) shows the shape of the liquid crystal deflection element 143 and an effective area EA where the optical path of the laser beam can be deflected is disposed in the center of the liquid crystal deflection element 143. FIG. 23(b) shows a transparent electrode plate 152-1 (refer to FIG. 23(c)) viewed from the light input side in the effective area EA. In FIG. 23(b), plural transparent electrode patterns 156-1, 156-2, 156-3, . . . , 156-n having a stripe shape in the up and down direction are arrayed with the same interval therebetween in the sub scanning direction w1. The transparent electrode patterns 156-1 through 156-n are electrically connected by a pair of resistors 155. The optical paths of the laser beams are deflected in the sub scanning direction w1. FIG. 23(c) is a schematic diagram showing the liquid crystal deflection element 143 and shows the orientation of liquid crystal molecules. In FIG. 23(c), a liquid crystal layer 154 whose thickness is a few μm to some tens of μm is sandwiched by two glass substrates 151-1 and 151-2 via the transparent electrode plates 151-1 and 151-2 and orientation films 153. On the whole surface of the transparent electrode plate 152-2 at the light output side, a uniform electrode pattern is formed.

A terminal CH1 is connected to the transparent electrode pattern 156-1 and a terminal CH2 is connected to the transparent electrode pattern 156-n. Driving voltages are applied to the corresponding terminals CH1 and CH2. For example, when a 1 V voltage is applied to the terminal CH1 and a 5 V voltage is applied to the terminal CH2, as shown in FIG. 23(d), electric potential Vt is generated in the liquid crystal layer 154 by causing the resistance of the resistor 155 to be a proportional constant. The tilt angles of the liquid crystal molecules are changed by an electric potential distribution generated by the electric potential. When a laser beam LB is input to the oriented liquid crystal molecules which laser beam is polarized in the long axis direction of the liquid crystal molecules at 0 V, as shown in FIG. 23(e), the laser beam LB follows an inclination of the refractive index Ri in the same direction of the polarization direction.

In other words, the liquid crystal deflection element 143 can deflect the laser beam LB by having operations similar to a prism. When the driving voltages are changed, the inclination of the refractive index Ri can be changed. Therefore, the deflection angle of the laser beam LB can be controlled. In this case, the writing control circuit 30 generates a driving signal corresponding to the driving voltages of the liquid crystal deflection element 143 so that the position shift can be corrected based on the position shift amount and the position shift direction of the light spot in the sub scanning direction detected by the sub scanning position calculating circuit 23. That is, a third scanning position shifting unit is formed by the writing control circuit 30 and the liquid crystal deflection element 143.

THIRD MODIFIED EXAMPLE OF FIRST EMBODIMENT

Next, a third modified example of the first embodiment of the present invention is described.

Figure 24:
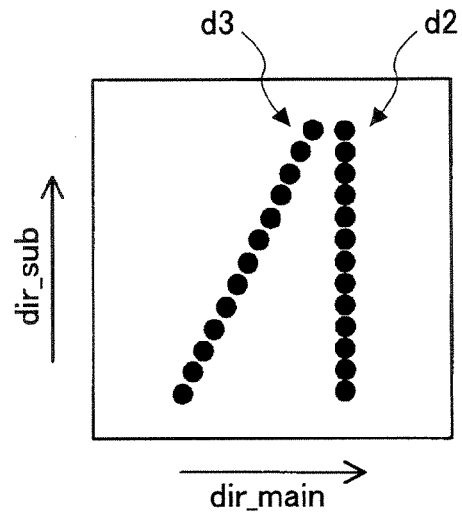
FIG. 24 is a diagram showing a pattern of a diffraction image in which two dot string images d2 and d3 are used.

FIG. 24 is a diagram showing a pattern of a diffraction image in which the two dot string images d2 and d3 are used. In the first embodiment, when the influence caused by the temperature change is small, in the pattern of the diffraction image formed by the diffraction optical element 403, as shown in FIG. 24, one of the dot string images d1 and d2 is not needed, that is, in FIG. 24, the dot string image d1 is not used.

In addition, in the first embodiment, the two dot string images d1 and d2 extend in the direction "dir_sub". However, the two dot string images can extend in the corresponding directions different from the direction "dir_main" and from each other.

In addition, in the first embodiment, the two dot string images d1 and d2 are extended in parallel. However, one of the two dot string images d1 and d2 can be parallel to the dot string image d3.

In addition, the pattern of the diffraction image formed by the diffraction optical element 403 can include a part of each of the dot string images d1, d2, and d3 instead of including all the dot string images d1, d2, and d3.

In addition, in the above embodiment, the pattern of the diffraction image formed by the diffraction optical element 403 includes the dot string images d1, d2, and d3; however, instead of using the dot string image d3, a dot group image can be used in which image plural dots are arrayed to form a predetermined curve.

In addition, instead of using the two dot string images d1 and d2, dot group images can be used in each of which plural dots form a predetermined identical curve (curve A). In this case, further, instead of using the dot string image d3, a dot group image can be used in which plural dots form a predetermined curve different from the curve A.

That is, at least a part of the pattern of the diffraction image formed by the diffraction optical element 403 includes plural dots whose intervals are different among the dots in the direction "dir_main" at a position in the direction "dir_sub". When the above is used, it is sufficient.

FOURTH MODIFIED EXAMPLE OF FIRST EMBODIMENT

Next, a fourth modified example of the first embodiment of the present invention is described.

Figure 25:
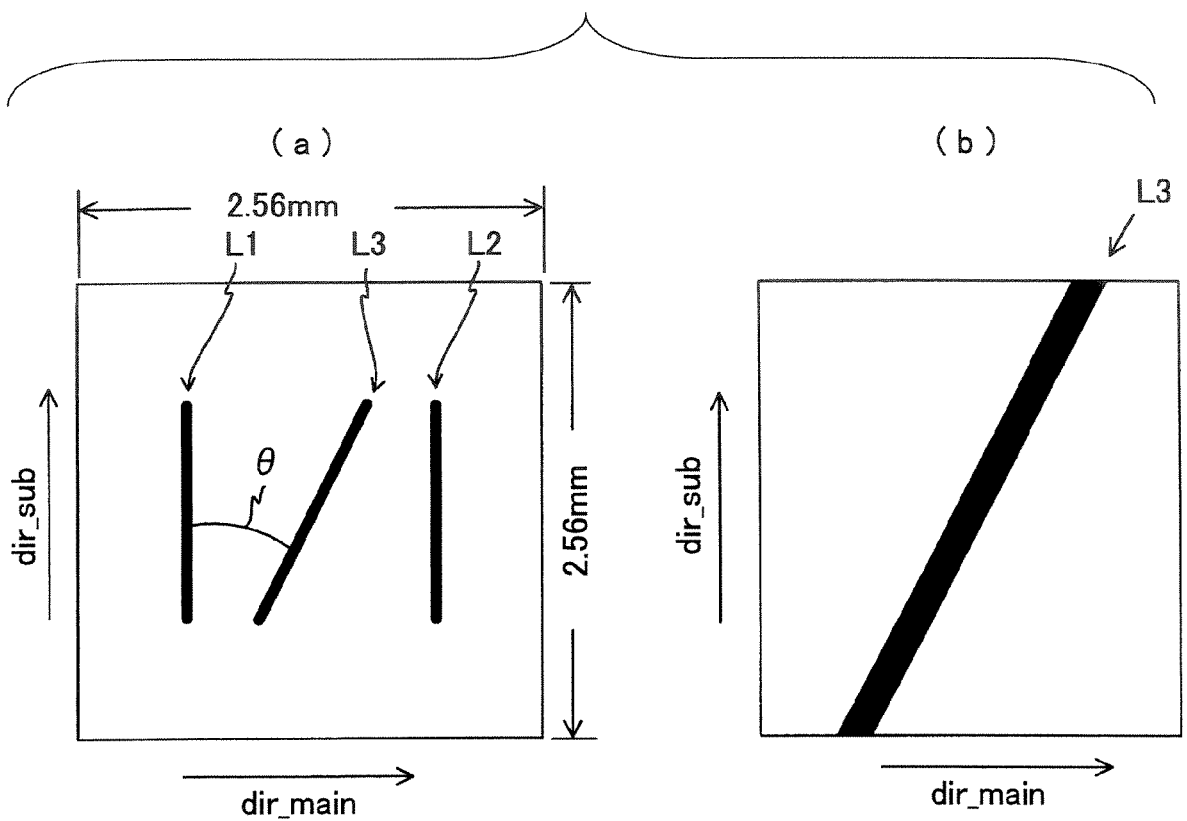
FIG. 25 is a diagram showing patterns of diffraction images formed by line images.

In addition, in the first embodiment, when the positional relationship between the diffraction optical element 403 and the light receiving element 405 does not largely change with the passage of time, as shown in FIG. 25(a), the diffraction optical element 403 can be designed so that a diffraction image is formed by three lines images L1, L2, and L3. In this, the line images L1 and L2 extend in the direction "dir_sub" and the line image L3 is disposed between the line images L1 and L2 with an angle θ (0<θ<90°) from the direction "dir_sub". FIG. 25 is a diagram showing patterns of diffraction images formed by the line images. In FIG. 25(b), a center part shown in FIG. 25(a) is enlarged. In FIG. 25, the line images L1, L2, and L3 are formed at the same density; however, actually, the light intensity of the line images L1 through L3 is not the same (refer to FIG. 26(b)).

Figure 26:
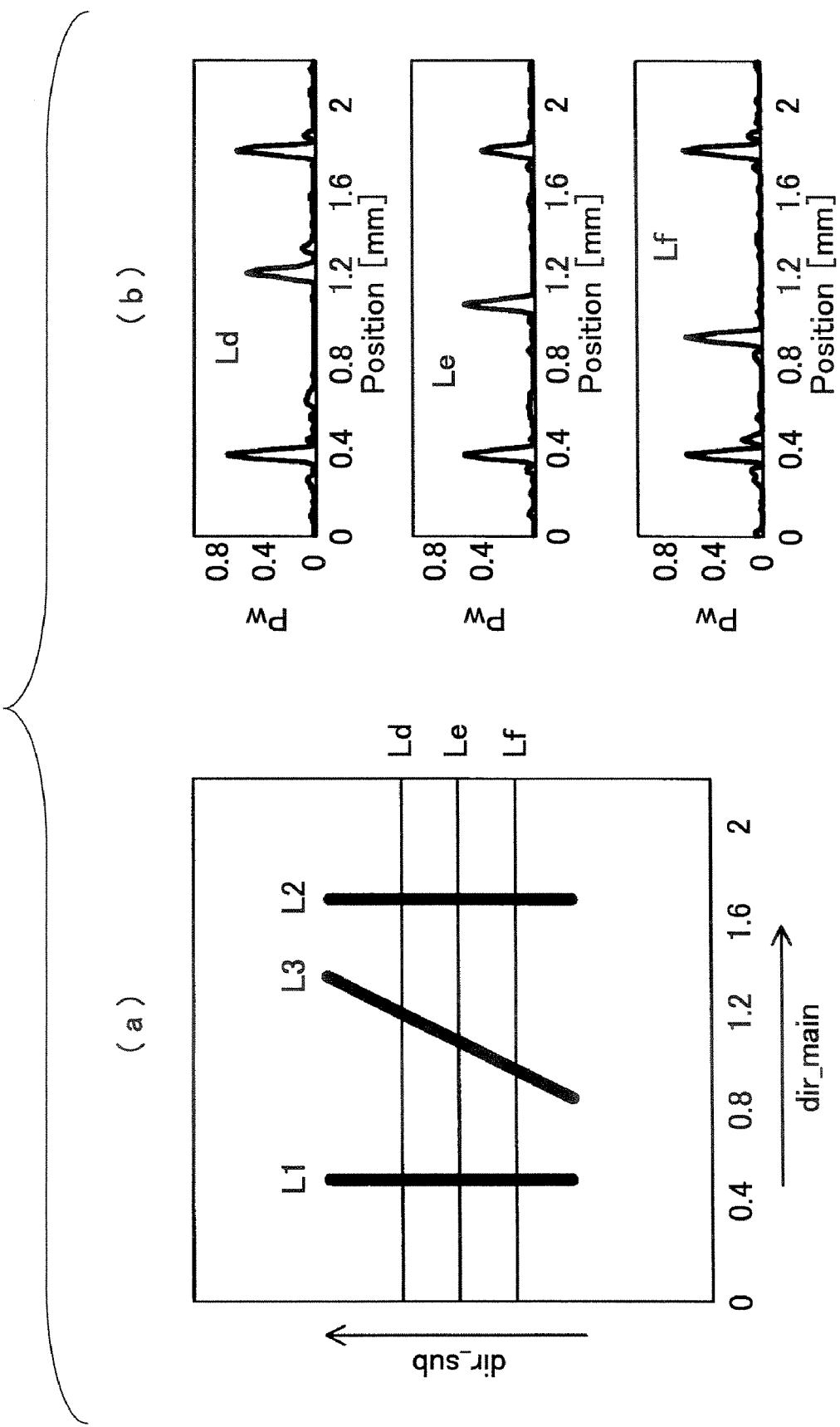
FIG. 26 is a diagram showing light intensity of the pattern of the diffraction image shown in FIG. 25(a)

FIG. 26 is a diagram showing the light intensity of the pattern of the diffraction image shown in FIG. 25(a). In FIG. 26(b), calculated results of light intensity Pw on three lines Ld, Le, and Lf are shown in the pattern of the diffraction image formed by the diffraction optical element 403. In this, the calculation is executed by a computer simulation. As shown in FIG. 26(a), the positions of the three lines Ld, Le, and Lf are different from each other in the direction "dir_sub" and the three lines Ld, Le, and Lf are extended in the direction "dir_main". The interval between the lines is 300 μm and the light intensity Pw is 1 at the maximum. As shown in FIG. 26(b), the light intensity Pw is high at the line positions.

Figure 27:
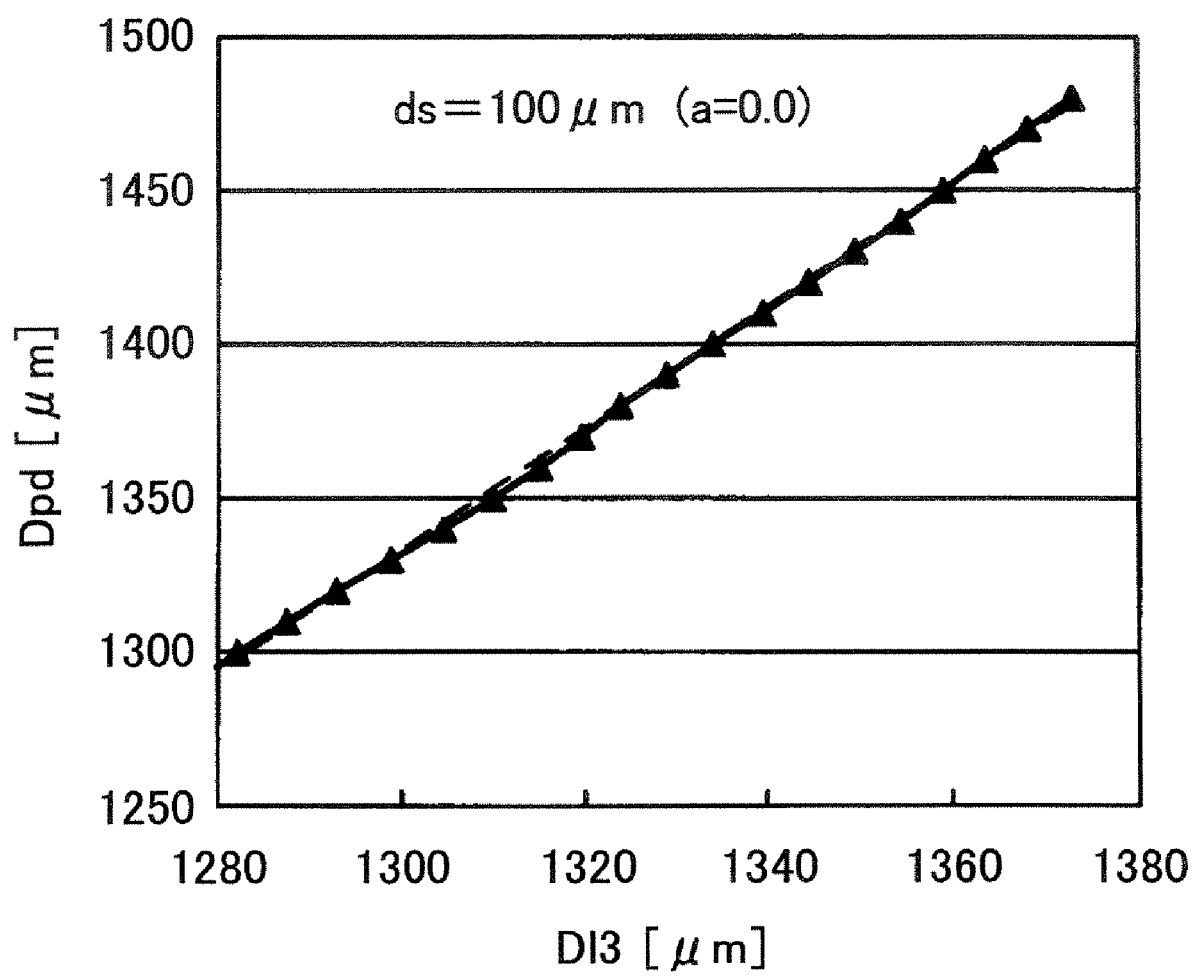
FIG. 27 is a graph showing a relationship between the position Dpd of the light receiving element and the detection position D13 of the line image L3.

FIG. 27 is a graph showing the relationship between the position Dpd of the light receiving element 405 and the detection position D13 of the line image L3. As shown in FIG. 27, even if the size ds of the light receiving element 405 in the direction "dir_sub" is 100 μm, the relationship between the position Dpd of the light receiving element 405 and the detection position D13 of the line image L3 is almost linear.

Figure 28:
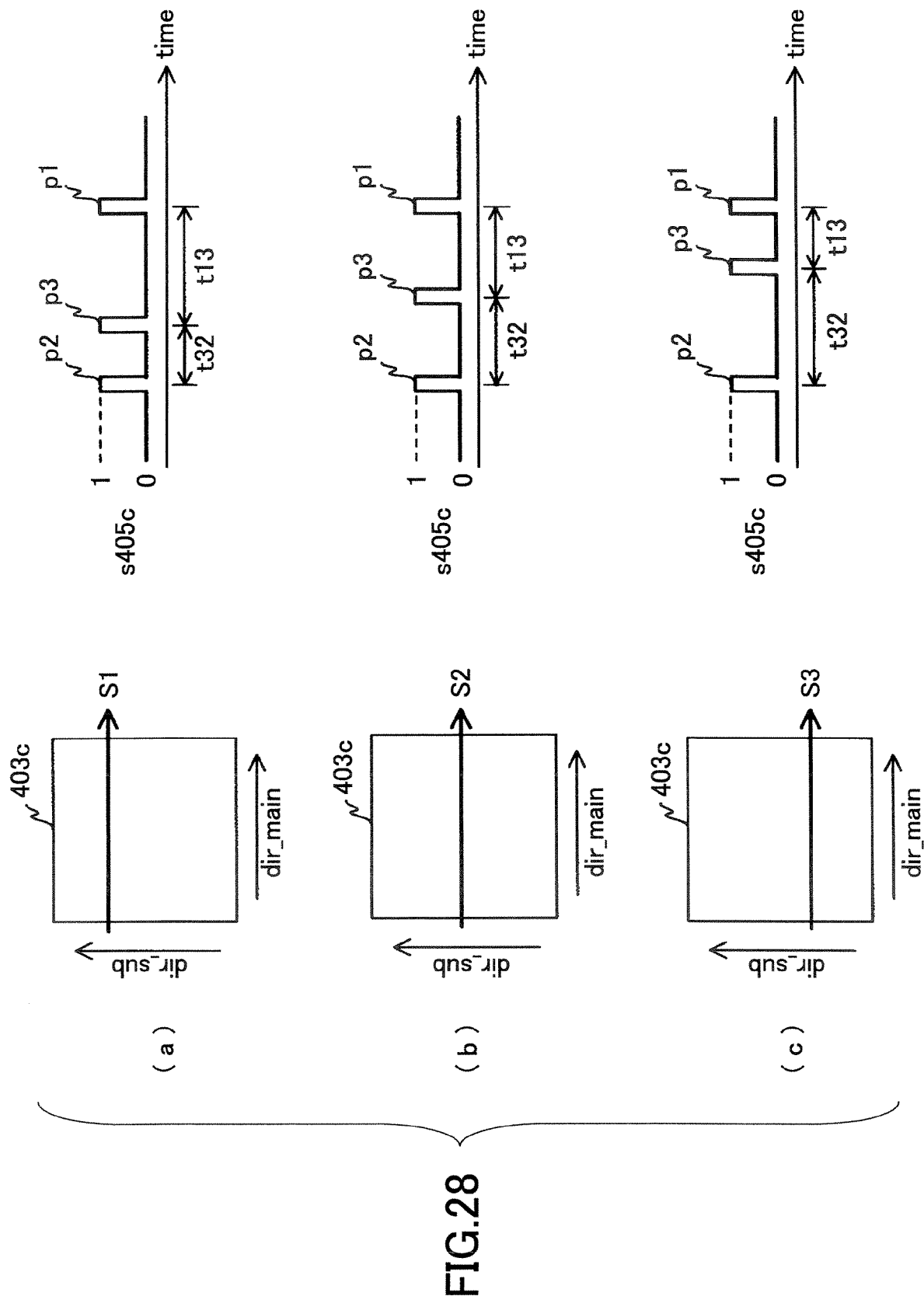
FIG. 28 is a diagram showing a signal formed by the signal adjusting circuit shown in FIG. 18.

FIG. 28 is a diagram showing the signal s405c formed by the signal adjusting circuit 28 shown in FIG. 18. As shown in FIG. 28(a) through 28(c), the signal s405c provides a pulse p1 corresponding to the line image L1, a pulse p2 corresponding to the line image L2, and a pulse p3 corresponding to the line image L3, based on the corresponding scanning lines S1, S2, and S3. In addition, since the position of the pattern of the diffraction image in the direction "dir_sub" is changed by the position of the corresponding scanning lines S1 through S3 of the laser beam which scans the diffraction optical element 403c in the direction "dir_sub", the time interval t13 between the pulses p1 and p3 is different from the time interval t32 between the pulses p3 and p2.

Figure 29:
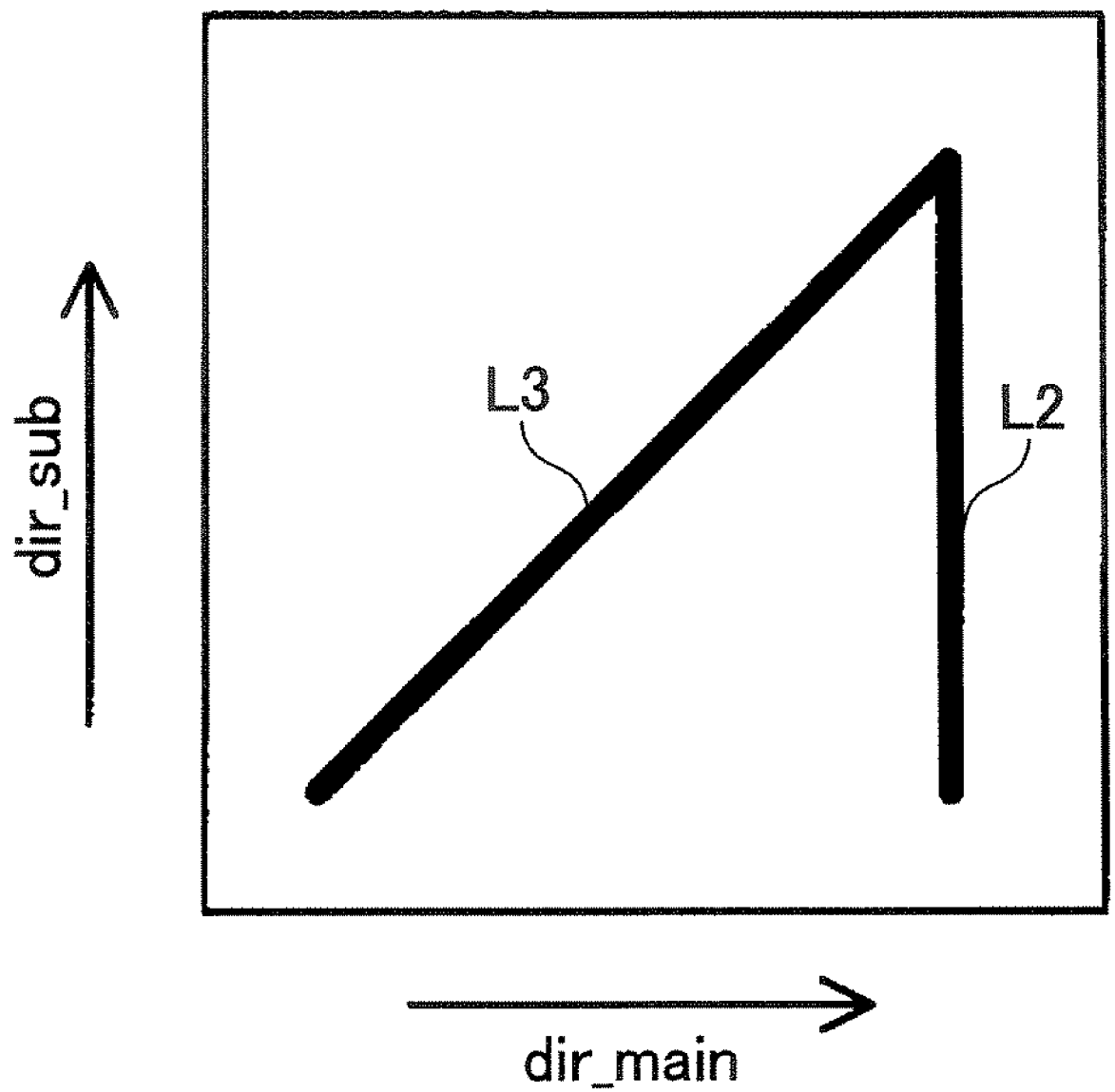
FIG. 29 is a diagram showing a pattern of a diffraction image in which two line images are used.

FIG. 29 is a diagram showing a pattern of a diffraction image in which two line images are used. When the influence caused by the temperature change is small, in the diffraction image formed by the diffraction optical element 403, as shown in FIG. 29, one of the line images L1 and L2 is not needed. In FIG. 29, the line image L1 is not used.

In addition, the two line images L1 and L2 extend in the direction "dir_sub" (refer to FIG. 26). However, the two line image L1 and L2 can extend in a direction which is different from the direction "dir_main" and from the direction of the line image L3.

In addition, the line images L1 and L2 are extended in parallel. However, one of the two line images L1 and L2 can be parallel to the line image L3.

In addition, the pattern of the diffraction image formed by the diffraction optical element 403 can include a part of each of the line images L1, L2, and L3 instead of including all the line images L1, L2, and L3.

In addition, the pattern of the diffraction image formed by the diffraction optical element 403 includes the line images L1, L2, and L3; however, instead of using the line image L3, a predetermined curved image can be used.

In addition, instead of using the two line images L1 and L2, curved images having a predetermined identical curve (curve "a") can be used. In this case, further, instead of using the line image L3, a curved image having a predetermined curve different from the curve "a" can be used.

That is, at least a part of the pattern of the diffraction image formed by the diffraction optical element 403 includes plural images whose intervals are different among the images in the direction "dir_main" at a position in the direction "dir_sub". When the above is used, it is sufficient.

FIFTH MODIFIED EXAMPLE OF FIRST EMBODIMENT

Next, a fifth modified example of the first embodiment is described.

In the fifth modified example of the first embodiment, when a lens mechanism is added to the diffraction optical element 403 by which mechanism a condensing position of the laser beam by a corresponding scanning optical system is conjugated with the position of the light receiving element 405, the lens 404 is not needed.

In addition, in the first embodiment, the diffraction optical element 403 modulates the phase by transmitting the laser beam; however, the phase can be modulated by reflecting the laser beam.

Figure 30:
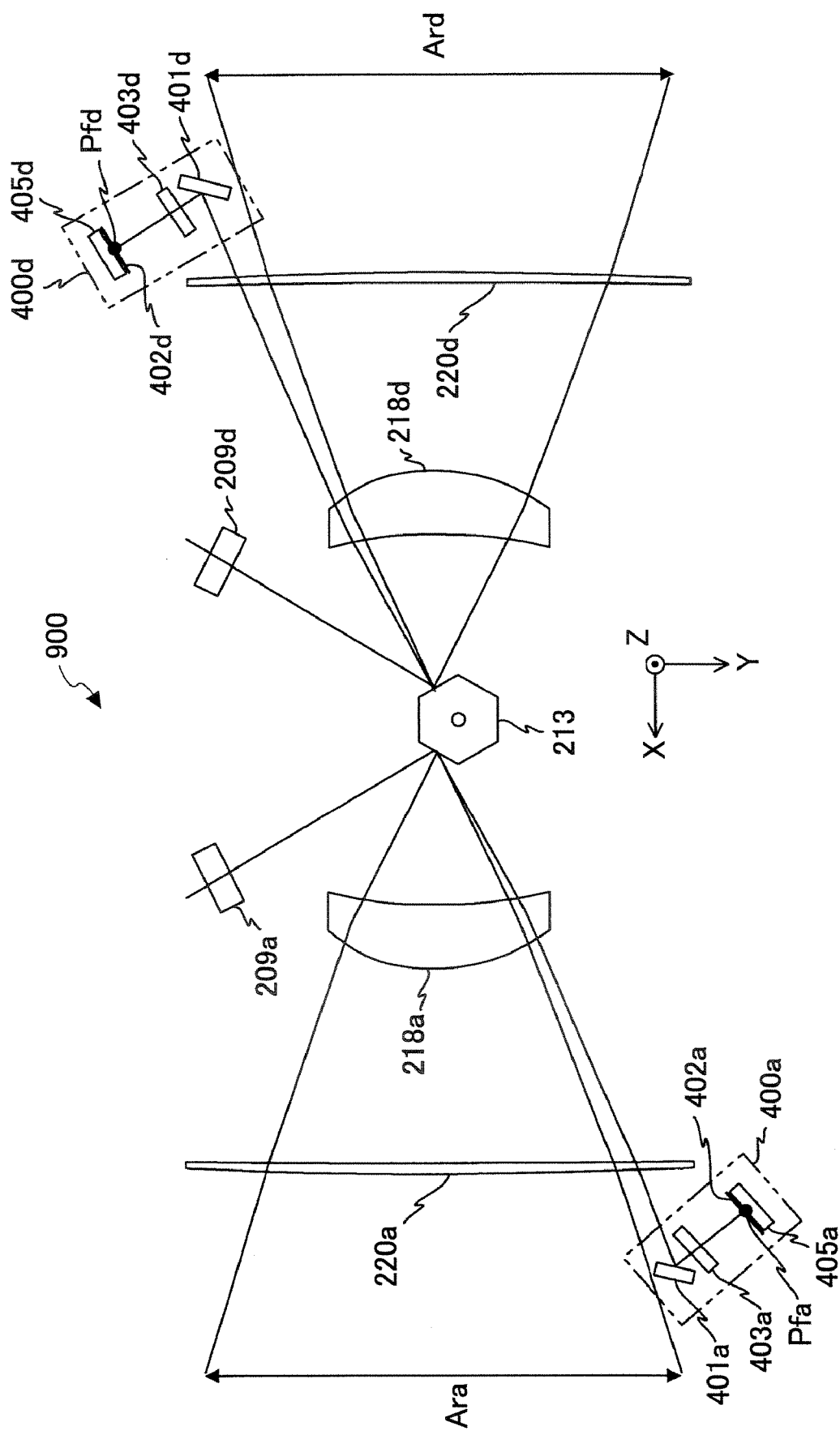
FIG. 30 is a diagram showing a sub scanning position detecting system according to a fifth modified example of the first embodiment of the present invention.

In addition, in the first embodiment, the light receiving element 405 is disposed at the position further along the optical path than the condensing position of the laser beam by the corresponding scanning optical system. However, the light receiving element 405 can be disposed at a position at the same distance from the polygon mirror 213 as the condensing position of the laser beam by the corresponding scanning optical system has. In this case, as shown in FIG. 30, the lens 404 is not needed. FIG. 30 is a diagram showing a sub scanning position detecting system according to the fifth modified example of the first embodiment.

In addition, in the first embodiment, the full color image forming apparatus 100 is used; however, the present embodiment can be applied to a one color image forming apparatus such as a monochrome laser printer.

Second Embodiment

Next, referring to the drawings, a second embodiment of the present invention is described.

In the second embodiment, a reference number of an element is different from that in the first embodiment. For example, in the first embodiment, the photoconductor drum 901a is used; however, in the second embodiment, a photoconductor drum 111a is used. Further, when a suffix is not attached to a reference number of an element, the reference number represents the set of elements. For example, the photoconductor drum 111 represents the photoconductor drums 111a, 111b, 111c, and 111d.

Figure 31:
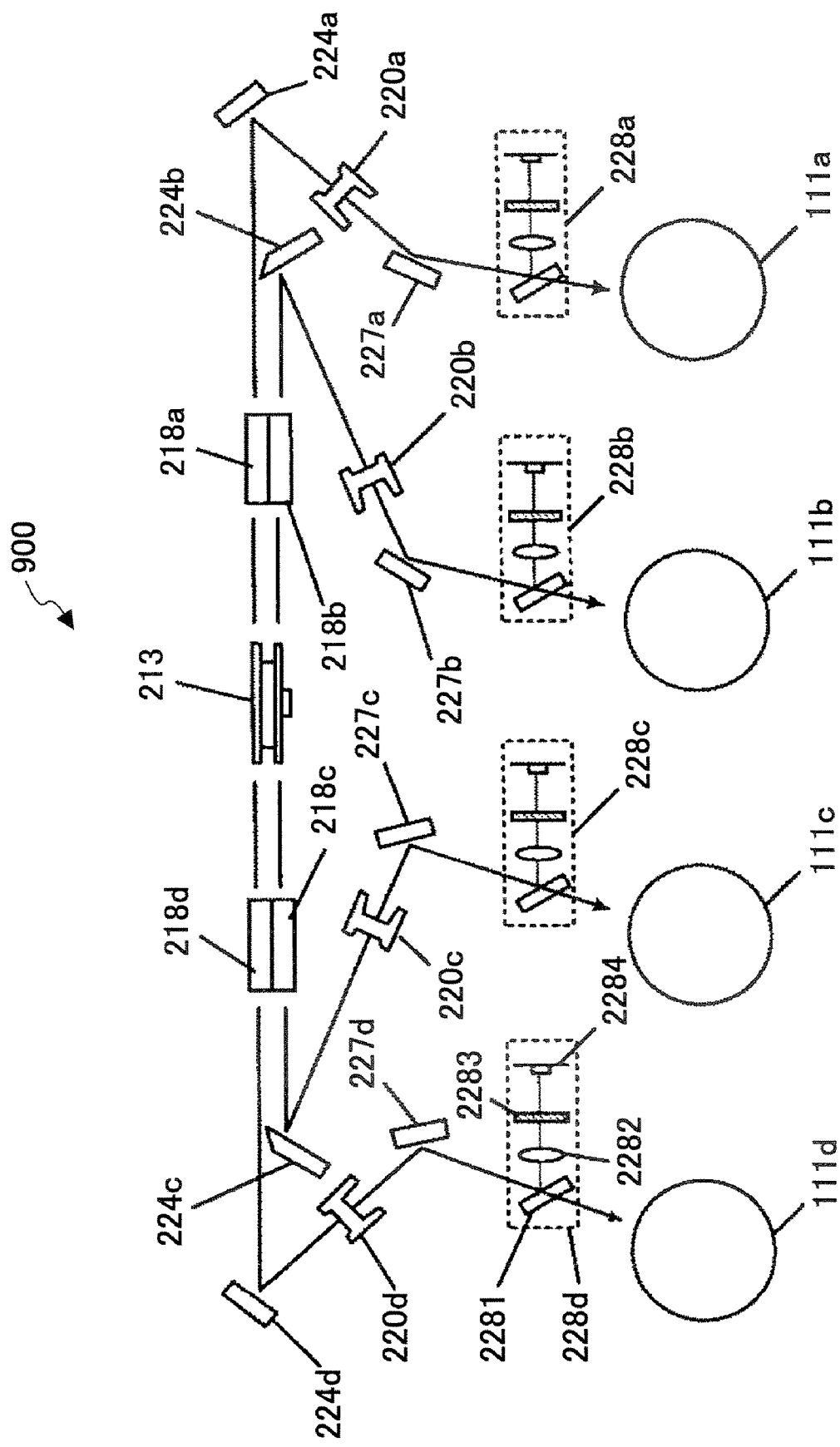
FIG. 31 is a schematic diagram showing a laser beam scanning device and photoconductor drums according to a second embodiment of the present invention.

FIG. 31 is a schematic diagram showing a part of a laser beam scanning device and photoconductor drums according to the second embodiment of the present invention. In FIG. 31, the laser beam scanning device includes a sub scanning position detecting system (unit) 228a for a yellow image, a sub scanning position detecting system 228b for a magenta image, a sub scanning position detecting system 228c for a cyan image, and a sub scanning position detecting system 228d for a black image. As shown in FIG. 31, in the second embodiment of the present invention, the disposed order of the elements in the laser beam scanning device and the reference number of the sub scanning position detecting system are different from those in the first embodiment. Further, as the reference number, the synchronization sensor 228 is used in the first embodiment; however, in the second embodiment, the sub scanning direction detecting system 228 is used and is different from the sub scanning direction detecting system 400 in the first embodiment.

The sub scanning direction position detecting system 228 includes a reflection mirror 2281, a lens 2282, a diffraction optical element 2283, and a light receiving element (light detector) 2284. The sub scanning direction position detecting system 228 is disposed on an optical path of a laser beam deflected by the polygon mirror 213. The laser beam input to the sub scanning direction position detecting system 228 is reflected by the reflection mirror 2281 outside the image forming region. The reflected laser beam is condensed by the lens 2282. The diffraction optical element 2283 forms a diffraction image having a desirable pattern by dividing the condensed laser beam into plural beams (diffraction light). The light receiving element 2284 detects the sub scanning position of a light spot by receiving a part of the diffraction image in the sub scanning direction. The light receiving element 2284 is a light detector made of, for example a PH (photodiode).

Next, a sub scanning position detecting method by using the diffraction optical element 2283 is described.

In order to form an arbitrary diffraction image from coherence light output from, for example, a semiconductor laser, it is necessary to control diffraction; therefore a diffraction optical element is used which element spatially modulates an amplitude distribution or a phase distribution of a laser beam or both the distributions. The modulation of the amplitude distribution is executed by modulating a transmittance distribution, and the modulation of the phase distribution is executed by modulating a refractive index distribution (concave-convex height distribution of the optical surface) of the diffraction optical element. By using the diffraction optical element 2283, a diffraction image having a desirable pattern can be obtained. In order to obtain the amplitude distribution (transmittance distribution) or the phase distribution (concave-convex height distribution), or both the distributions, a computer is needed to calculates the distributions.

Figure 32:
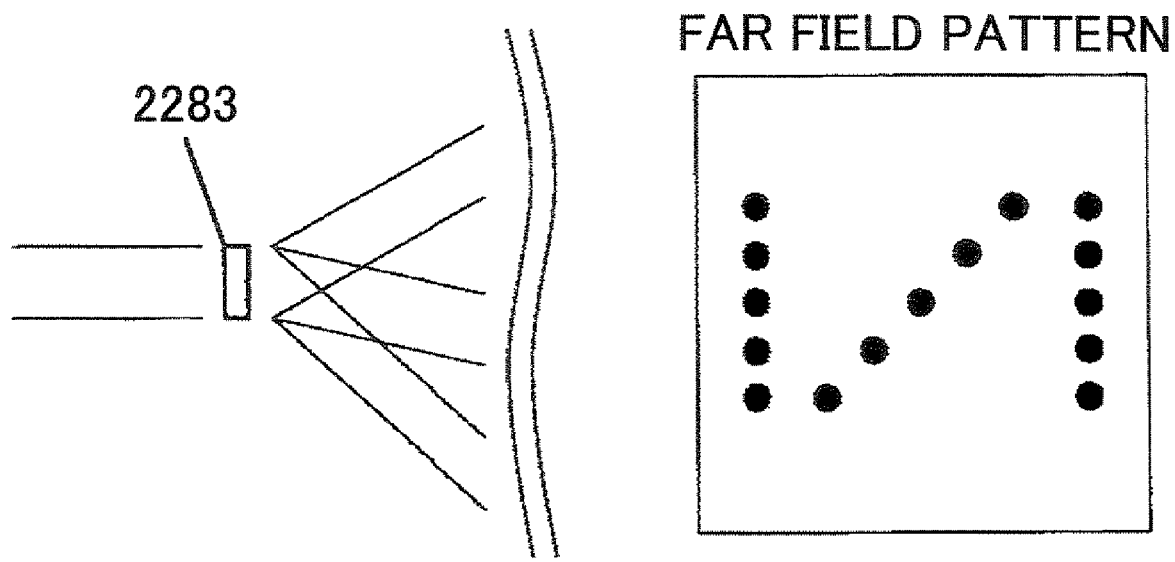
FIG. 32 is a schematic diagram showing a method for obtaining a desirable pattern by using a diffraction optical element.

FIG. 32 is a schematic diagram showing a method for obtaining a desirable pattern by using the diffraction optical element 2283. In FIG. 32, since the plane wave is transmitted through the diffraction optical element 2283, the amplitude distribution or the phase distribution, or both the distributions are spatially modulated, and a desirable diffraction image (far field pattern) can be obtained at the infinite-point.

In addition, when an inverse Fourier transformation is applied to a diffraction image having a desirable pattern, an amplitude distribution or a phase distribution for obtaining the desirable pattern can be easily obtained. That is, when a diffraction optical element which modulates both the amplitude distribution and the phase distribution is used, a diffraction image having a desirable pattern can be easily obtained. When a diffraction optical element which modulates only one of the amplitude distribution and the phase distribution is used, a diffraction image having a desirable pattern cannot be obtained; however, a diffraction image having a pattern similar to a desirable pattern can be obtained. Therefore, the amplitude distribution or the phase distribution is obtained by using an iterative calculation method.

Figure 33:
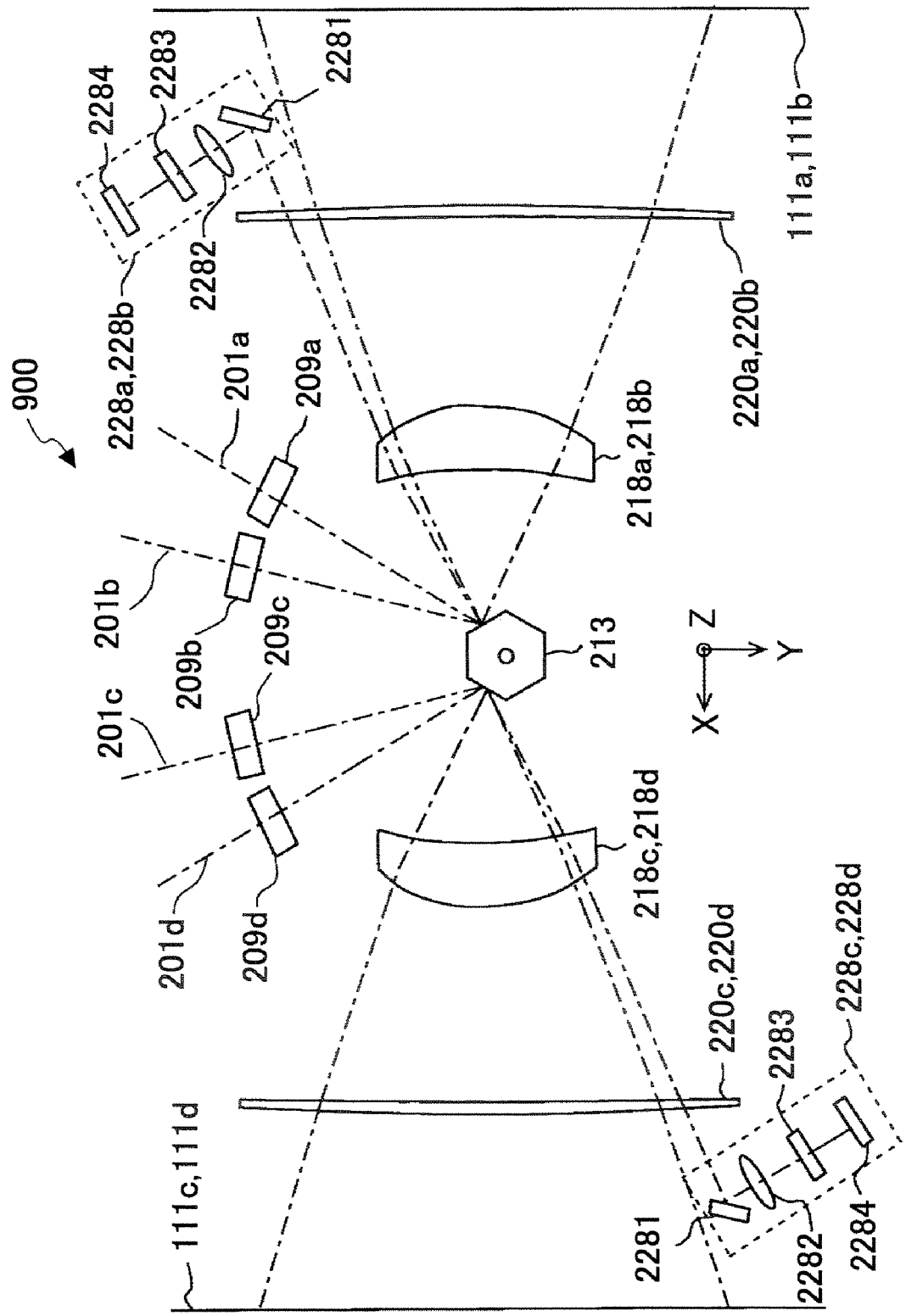
FIG. 33 is a schematic diagram showing an optical system on a deflection scanning surface of the laser beam scanning device according to the second embodiment of the present invention.
Figure 34:
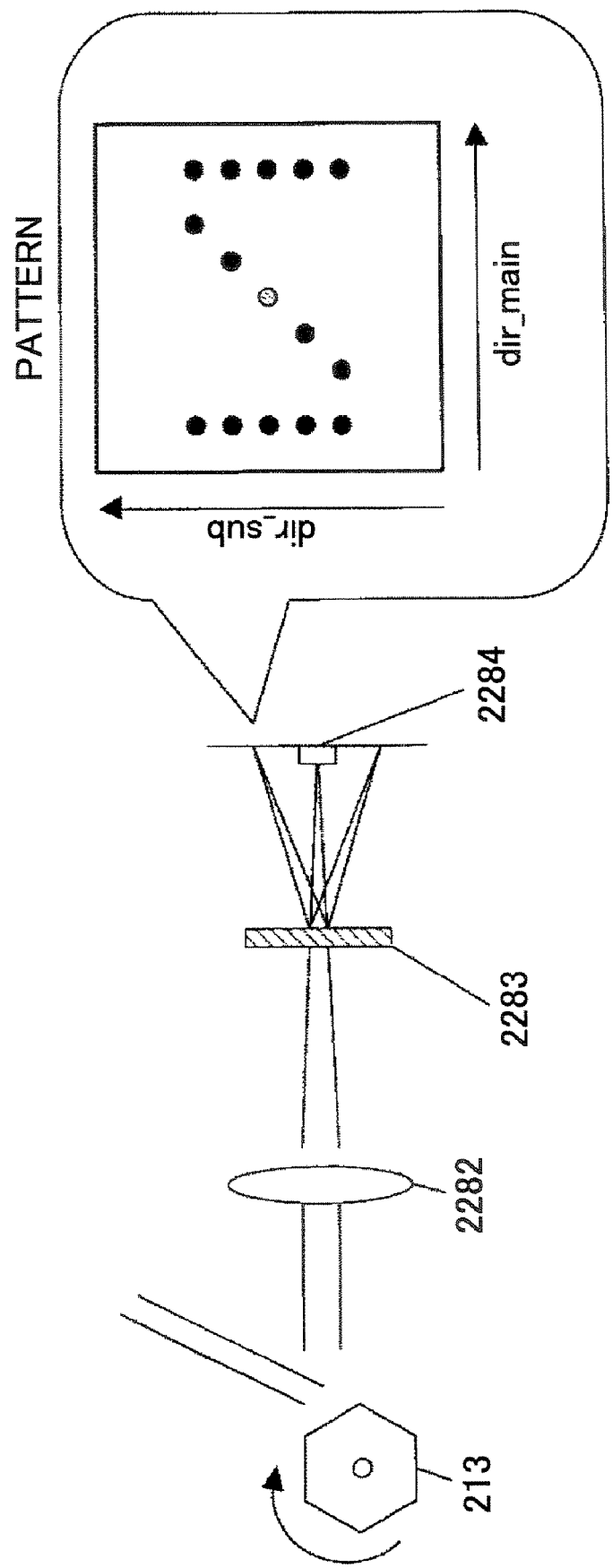
FIG. 34 is a schematic diagram showing a pattern of a diffraction image used for detecting a light spot at a sub scanning position.

FIG. 33 is a schematic diagram showing an optical system on a deflection scanning surface of the laser beam scanning device according to the second embodiment of the present invention. FIG. 34 is a schematic diagram showing a pattern of a diffraction image used for detecting a light spot at a sub scanning position.

Referring to FIGS. 31, 33, and 34, the detecting method of the light spot (laser beam) in the sub scanning direction by scanning the diffraction image having a pattern on the light receiving element (light detector) 2284 is described.

In the following, the detecting method is described by using a sub scanning position detecting system 228d.

The sub scanning position detecting system 228d detects the position of the light spot formed on the photoconductor drum 111d in the sub scanning direction. The reflection mirror 2281 is disposed between the optical path folding mirror 227d and the photoconductor drum 111d on an optical path of the laser beam which scans a region outside an image forming region on the photoconductor drum 111d at the time of scanning in the main scanning direction.

The lens 2282 condenses the laser beam reflected from the reflection mirror 2281 so that the light condensing position of the laser beam formed by the scanning optical system and the light receiving position on the light receiving element 2284 are conjugated. The diffraction optical element 2283 forms a diffraction image having a desirable pattern by diffracting the laser beam.

In addition, in order that the light receiving element 2284 detects a part of the diffraction image (far field pattern) in the sub scanning direction formed by the lens 2282 and the diffraction optical element 2283, a unit, for example, an aperture can be disposed which aperture controls the width of the direction corresponding to the sub scanning direction at the light receiving region of the light receiving element (light detector) 2284.

In FIG. 34, a pattern of a diffraction image used for detecting a light spot at a sub scanning position is shown.

The pattern of the diffraction image shown in FIG. 34 is formed by two dot string images d1 and d2 extending in the direction "dir_sub" corresponding to the sub scanning direction and a dot string image d3 inclined from the "dir_sub" direction by θ (0<θ<90°) and disposed between the dot string images d1 and d2. That is, the dot string image d3 extends in a direction different from the direction "dir_main" corresponding to the main scanning direction and the direction "dir_sub" corresponding to the sub scanning direction.

In FIG. 34, the black dot part is a large light intensity part, and the optical axis exists at the center dot shown by oblique lines. In addition, the pattern shown in FIG. 34 has rotational symmetry of 180° about the optical axis.

In a method of scanning on the light receiving element (light detector) 2284 by using the diffraction image having the pattern, a laser beam to be input to the diffraction optical element 2283 scans by using the polygon mirror 213 (deflecting unit). In FIG. 34, the laser beam is condensed by the lens 2282, the condensed laser beam is divided into plural laser beams by being diffracted at the diffraction optical element 2283, and the plural laser beams form a light spot on the light receiving element 2284. That is, the diffraction images having the pattern (dot string images) are formed on the light receiving element 2284. When the diffraction optical element 2283 is designed in the following way (described below in detail), the diffraction image forming position is changed depending on the laser beam input position to the diffraction optical element 2283. That is, when the laser beam input position to the diffraction optical element 2283 is shifted, the diffraction image forming position is shifted corresponding to the laser beam input position.

The pattern of the diffraction image is determined as follows. That is, when the pattern of the diffraction image is scanned on the light receiving element 2284, the light receiving element 2284 outputs a signal at least twice in one scanning, and the times of the two signals output from the light receiving element 2284 are different from each other depending on the relative positional relationship between the pattern of the diffraction image and the sub scanning direction of the light receiving element 2284.

In FIG. 34, the pattern of the diffraction image includes the two dot string images d1 and d2 extending in the direction "dir_sub" and the dot string image d3 formed between the dot string images d1 and d2 with a predetermined angle from the direction "dir_sub". Therefore, when the diffraction image scans once on the light receiving element 2284, three signals are output from the light receiving element 2284, and the times of the three signals output from the light receiving element 2284 are different from each other depending on the relative positional relationship between the pattern of the diffraction image and the sub scanning direction of the light receiving element 2284. That is, there are time intervals between the second and first signals and between the second and third signals.

Figure 35:
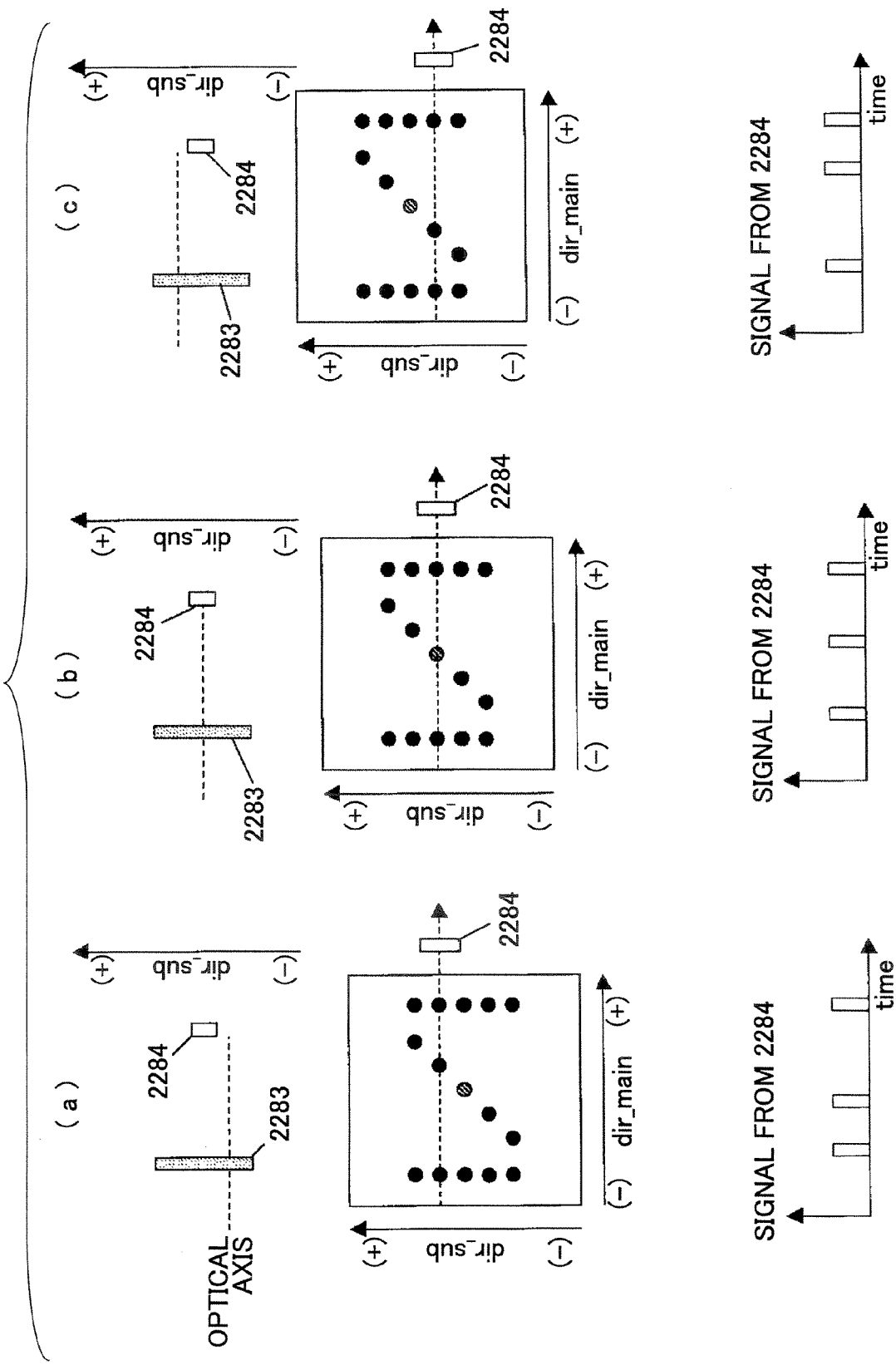
FIG. 35 is a diagram showing a laser beam (light spot) detecting method by using the diffraction optical element.

Next, a case is studied in which case the position of the laser beam input to the diffraction optical element 2283 is changed in the sub scanning direction. FIG. 35 is a diagram showing a laser beam (light spot) detecting method by using the diffraction optical element 2283. In FIG. 35, the middle part shows the pattern of the diffraction image shown in FIG. 34, and the center dot shown by the oblique lines is formed on the optical axis of the diffraction optical element 2283. In addition, the dashed line shows the optical axis of the input laser beam.

In the middle part of FIG. 35, the diffraction image formed by the diffraction optical element 2283 scans in the +direction of the main scanning direction by the deflection of the polygon mirror 213 (not shown). When the relative positional relationship between the pattern of the diffraction image and the light receiving element 2284 is as shown in the middle part of FIG. 35(*a*), signals shown in the lower part of FIG. 35(*a*) are output from the light receiving element 2284.

In addition, as shown in FIG. 35(*b*), when the position of the laser beam input to the diffraction optical element 2283 is shifted in the +direction of the sub scanning direction and the pattern of the diffraction image is formed at the position shown in the middle part of FIG. 35(*b*), signals shown in the lower part of FIG. 35(*b*) are output from the light receiving element 2284. Further, as shown in FIG. 35(*c*), when the position of the laser beam input to the diffraction optical element 2283 is further shifted in the +direction of the sub scanning direction and the pattern of the diffraction image is formed at the position shown in the middle part of FIG. 35(*c*), signals shown in the lower part of FIG. 35(*c*) are output from the light receiving element 2284.

As shown in FIG. 35(*a*) through 35(*c*), the time interval between the second and first signals and the time interval between the second and third signals output from the light receiving element 2284 are changed corresponding to the position of the laser beam input to the diffraction optical element 2283. Therefore, the change of the position of the laser beam (light spot) in the sub scanning direction can be detected by measuring the time interval between the plural signals output from the light receiving element 2284.

When a laser beam is passed through the light receiving element 2284, a rise time and a fall time exist in the output from the light receiving element 2284. Instead of using one of the rise time and the fall time of the laser beam that has passed through the light receiving element 2284, it is desirable that the time of the laser beam passing through the light receiving element 2284 be determined by using both the rise time and the fall time, for example, the average of the rise time and the fall time. Further, when plural signals output from the light receiving element 2284 are detected by sampling and the center of the detected signals exceeds a predetermined threshold, the time of the laser beam passing through the light receiving element 2284 is determined by the center. This is the most preferable.

In the sub scanning position detecting method using the diffraction optical element 2283, it is not necessary to use a special photodiode such as a photodiode having non-parallel sides disclosed in Patent Documents 3 and 4. That is, a general-purpose photodiode can be used as the light receiving element 2284 to detect the sub scanning position of the laser beam (light spot); therefore, cost can be largely decreased.

In addition, the size of the photodiode having non-parallel sides is larger than that of the general-purpose photodiode; that is, the package of the photodiode having non-parallel sides is large. The photodiode for detecting the sub scanning position is disposed outside the image forming region. When the photodiode having non-parallel sides is used, the scanning possible region by the deflection unit using a polygon mirror must be large; consequently, the sizes of lenses and mirrors in the scanning optical system must be large. When the size of the scanning optical system is large, the length of the optical path becomes large and the optical system must be widened. Consequently, it becomes difficult to manufacture the apparatus due to a large sensitivity error and a great thickness of a scanning lens. In addition, it is difficult to miniaturize the apparatus.

Therefore, according to the present embodiment, the scanning optical system can be made small by using the diffraction optical element 2283 and the light receiving element 2284 formed of a small-sized general-purpose photodiode. Consequently, a laser beam scanning device can be realized which device can detect the sub scanning position of the laser beam at low cost with a small size.

FIRST MODIFIED EXAMPLE OF SECOND EMBODIMENT

In the first modified example of the second embodiment, the diffraction optical element 2283 controls only the phase distribution of the input laser beam.

That is, the diffraction optical element 2283 does not control the amplitude distribution (transmittance distribution) of the input laser beam. With this, the light utilizing efficiency can be increased. The control of the phase distribution can be realized by controlling the refractive index distribution. When the control of the phase distribution is executed by using the concave-convex height distribution of the optical surface, the diffraction optical element 2283 can be easily manufactured.

SECOND MODIFIED EXAMPLE OF SECOND EMBODIMENT

In the second modified example of the second embodiment, the diffraction optical element 2283 has a structure in which predetermined unit components are periodically disposed.

As described above, when the position of the laser beam input to the diffraction optical element 2283 is shifted, the position where a pattern of the diffraction image is formed is shifted corresponding to the position shift of the laser beam. In order to realize the above, the phase distribution of the diffraction optical element 2283 is formed so that the predetermined unit components are periodically disposed in the diffraction optical element 2283.

Figure 37:
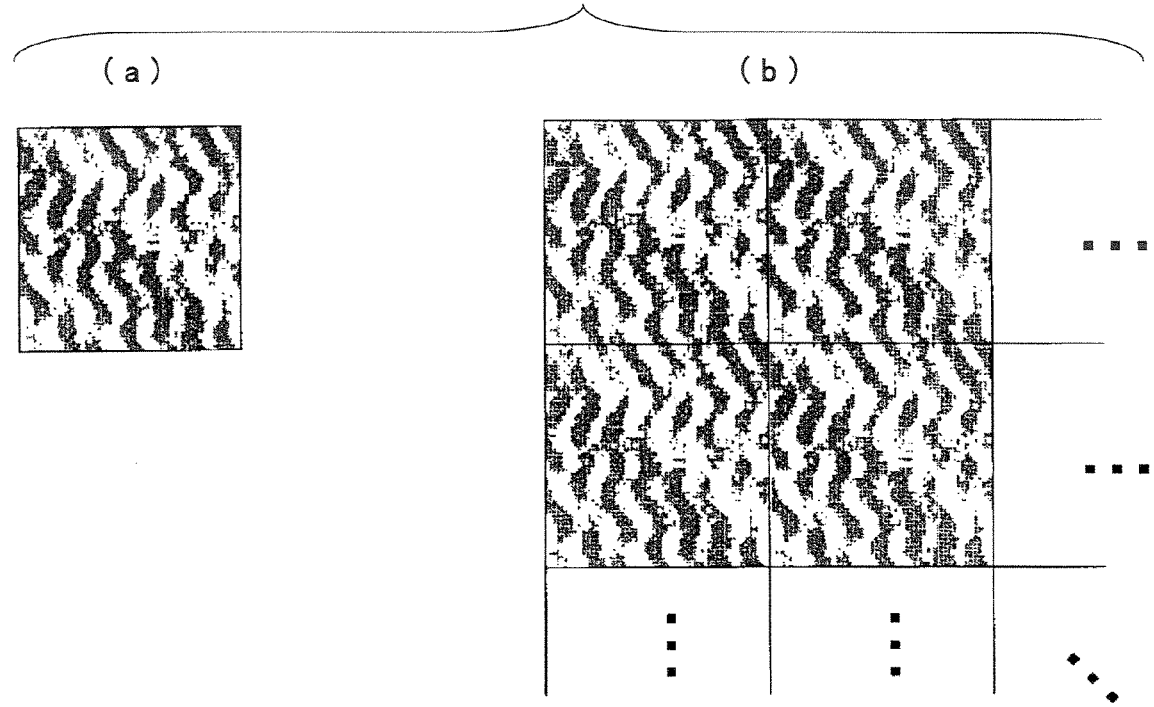
FIG. 37 is a diagram showing a structure of the diffraction optical element which controls only the phase distribution of the input laser beam.

FIG. 37 is a diagram showing a structure of the diffraction optical element 2283 which controls only the phase distribution of the input laser beam. In FIG. 37(*a*), a unit component is shown which component is composed of 64 pixels×64 pixels, where a gray part shows a 0 phase and a white part shows a π phase. When the 0 phase is desired to be changed to the π phase, the height of the gray part is changed. That is, the phase distribution can be a height distribution. In FIG. 37(*b*), an example is shown in which the four unit components shown in FIG. 37(*a*) are periodically disposed and a phase distribution is shown.

In addition, the unit component is designed so that the boundaries of the unit component are smoothly connected to adjacent predetermined unit components. In FIG. 37(*b*), a phase distribution is shown in which the boundaries of the unit components are smoothly connected. With this, when the laser beam scanning is executed to generate the diffraction image, the relative light intensity among the divided laser beams can be prevented from being changed.

Figure 38:
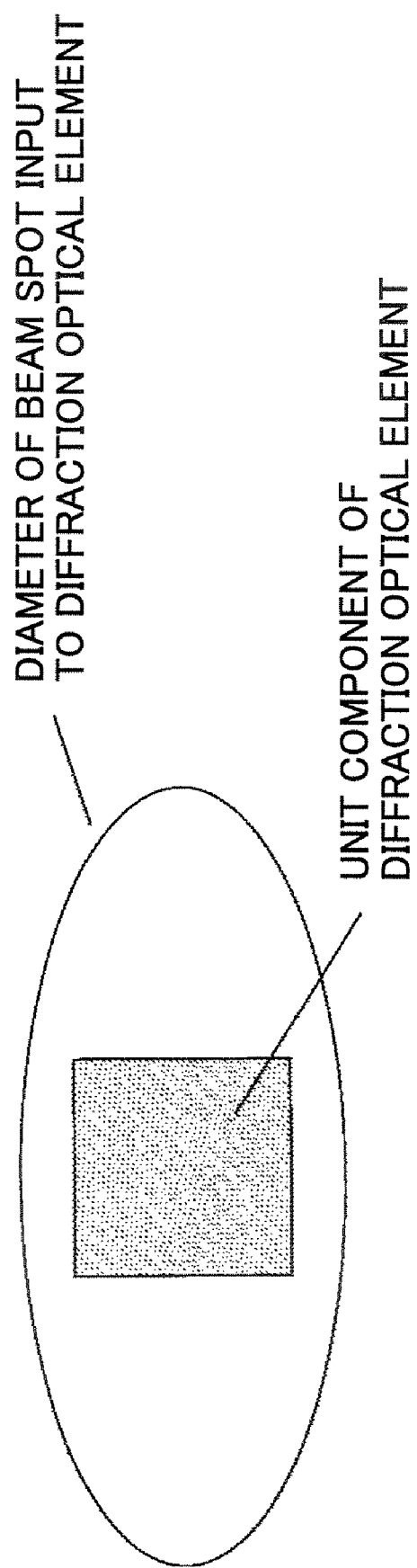
FIG. 38 is a diagram showing the beam spot diameter of the input laser beam and a unit component.

In addition, it is preferable that the longest diagonal of the unit component be smaller than the spot diameter of the input laser beam. The spot diameter of the input laser beam is defined as a diameter in which the light intensity becomes 1/e2 of the peak. When a semiconductor laser is used, generally, the beam spot has an elliptical shape; in this case the length of the minor axis of the ellipse is defined as the beam spot diameter. FIG. 38 is a diagram showing the beam spot diameter of the input laser beam and the unit component. As shown in FIG. 38, since the size of the unit component is within the size of the input laser beam, when the laser beam scanning is executed by using the divided plural laser beams, the relative light intensity among the divided plural laser beams can be prevented from being changed.

More preferably, four unit components are disposed within the size of the input laser beam, and most preferably, nine unit components are disposed within the size of the input laser beam. In a case where the number of the unit components to be disposed within the size of the input laser beam is larger than that described above, when the laser beam scanning is executed by using the divided plural laser beams, the relative light intensity among the divided plural laser beams can be further prevented from being changed. However, when nine unit components are disposed within the size of the input laser beam, the relative light intensity among the divided plural laser beams can be actually prevented from being changed.

In FIG. 37(*a*), the unit component is composed of 64 pixels×64 pixels. Generally, the unit component is composed of plural pixels, and the shape of the unit component is a square; however, the shape can be a hexagon.

THIRD MODIFIED EXAMPLE OF SECOND EMBODIMENT

Next, a third modified example of the second embodiment is described.

Figure 36:
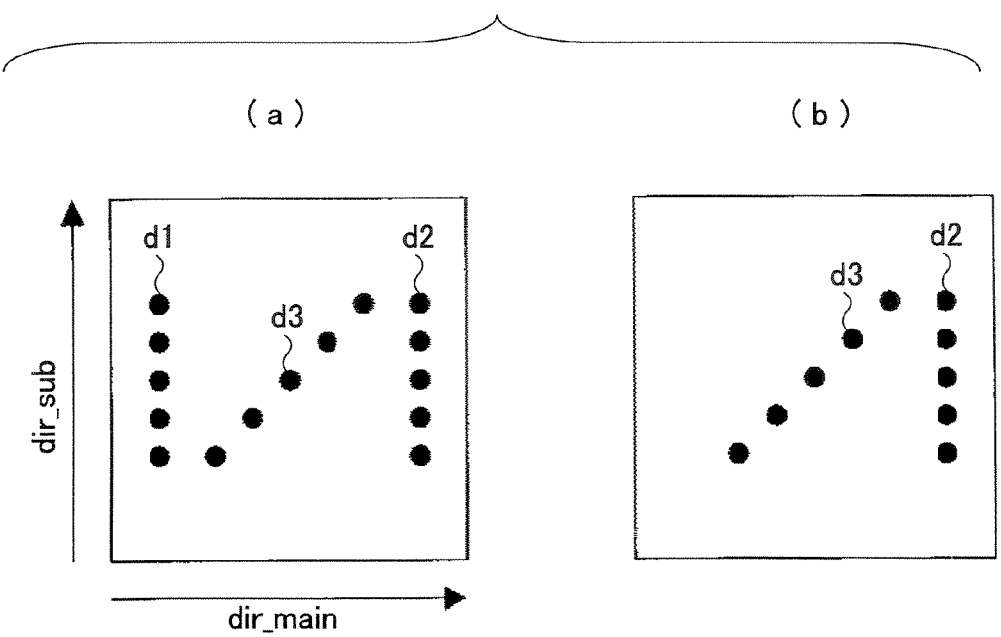
FIG. 36 is a diagram showing patterns of the diffraction image suitable for the laser beam scanning device according to the second embodiment of the present invention.

FIG. 36 is a diagram showing patterns of the diffraction image suitable for the laser beam scanning device according to the second embodiment of the present invention. The pattern of the diffraction image shown in FIG. 36(*a*) is ideal; however, at least, the pattern of the diffraction image shown in FIG. 36(*b*) is preferable. In the pattern shown in FIG. 36(*a*), the dot string images d1 and d2 and the dot string image d3 inclining from the dot string images d1 and d2 form the pattern of the diffraction image. In FIG. 36(*b*), the dot string image d2 and the dot string image d3 form the pattern of the diffraction image. In FIG. 36, dots in the dot string image are separately disposed; however, a part of dots can be connected to each other, or the dot string image can be a line-shaped image so that all the dots in the dot string image are connected to each other.

In addition, as shown in FIG. 36(*a*), the ideal pattern of the diffraction image is formed by the dot string images d1 and d2 parallel to the sub scanning direction and the dot string image d3 inclining from the dot string images d1 and d2 and disposed therebetween.

As described in the first embodiment of the present invention, due to a temperature change, when the wavelength of the laser beam output from the light source unit is changed or the diffraction optical element 2283 is enlarged or reduced, the diffraction angle of the diffraction optical element 2283 is changed. When the diffraction angle is changed, the diffraction image is enlarged or reduced, and an error occurs in detecting the sub scanning position with the laser beams. In order to avoid the error, as shown in FIG. 36, in addition to the dot string images d1 and d2 being parallel to the sub scanning direction, the dot string image d3 is disposed non-parallel to the sub scanning direction. Then, a time interval between signals output from the light receiving element 2284 by the dot string images d3 and d1 and a time interval between signals output from the light receiving element 2284 by the dot string images d3 and d2 are detected. With this, the change of the diffraction angle can be corrected and the sub scanning position can be accurately detected even when the temperature is changed.

FOURTH MODIFIED EXAMPLE OF SECOND EMBODIMENT

Next, a fourth modified example of the second embodiment is described.

When the unit component of the diffraction optical element 2283 is composed of pixels, in addition to a desirable diffraction image by first-order diffraction laser beams, diffraction images by high-order (second-order or more) diffraction laser beams are generated.

Figure 39:
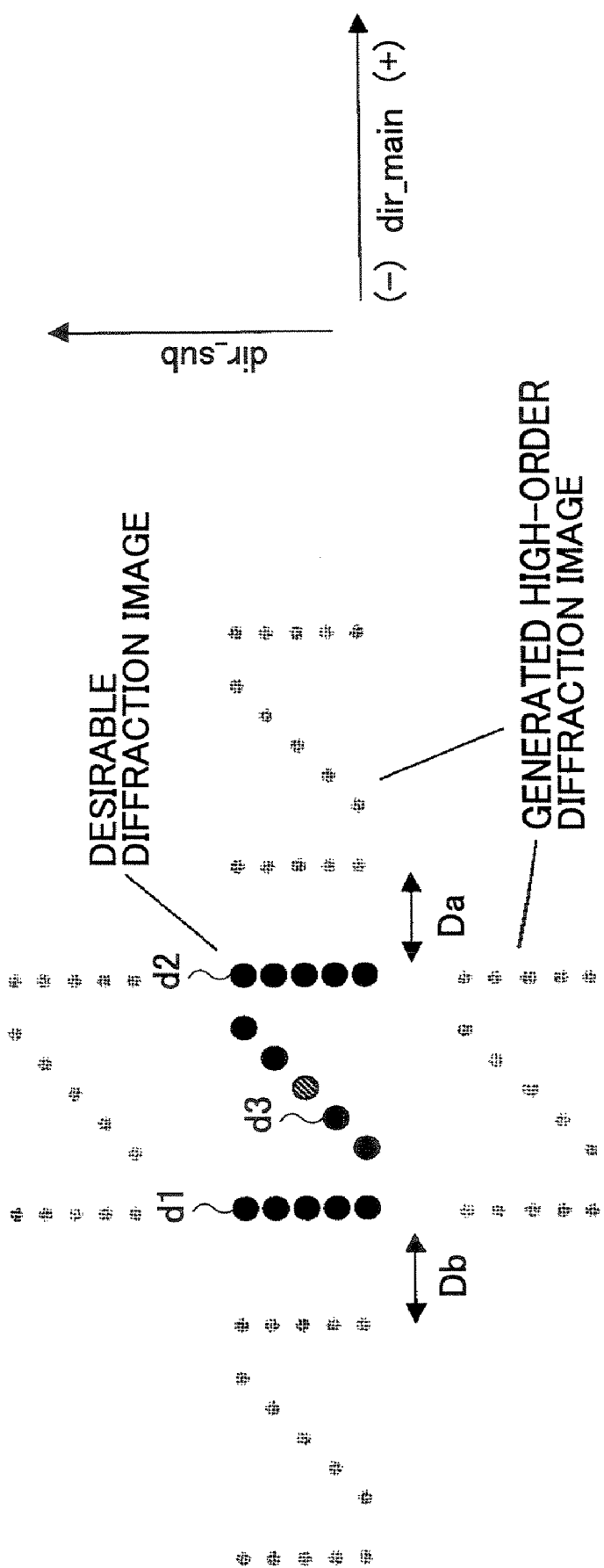
FIG. 39 is a diagram showing a desirable diffraction image and diffraction images produced by high-order diffraction laser beams.

FIG. 39 is a diagram showing the desirable diffraction image and the diffraction images produced by the high-order diffraction laser beams. In FIG. 39, a dot of oblique lines located at the center of the desirable diffraction image shows the position of the optical axis of the diffraction optical element 2283. In FIG. 39, the higher the size of the dot is and the blacker the color of the dot is, the larger the light intensity is. As shown in FIG. 39, plural diffraction images are generated by the high-order diffraction laser beams around the desirable diffraction image. In this, the width of the diffraction angle distribution of the diffraction image in the main scanning direction is defined as θmax. In FIG. 39, the θmax is the sum of the diffraction angles of the two dot string images d1 and d2 in the main scanning direction in the desirable diffraction image. In addition, it is defined that the interval between pixels is "p" and the using wavelength is λ.

When the pixel interval "p" and the diffraction angle are determined so that Inequality (2) is satisfied, as shown in FIG. 39, the diffraction images generated by the high-order diffraction laser beams can be separated from the desirable diffraction image, and the sub scanning position can be accurately detected.

$$\arcsin(\lambda/p) > \theta max \quad (2)$$

In addition, in a case where the diffraction images are generated by the high-order diffraction laser beams, when the high-order diffraction laser beams scan on the light receiving element 2284, the writing control circuit 30 controls the light source driving unit 50 so that the light source unit 250 is turned off. When the desirable diffraction image scans on the light receiving element 2284, the writing control circuit 30 controls the light source driving unit 50 so that the light source unit 250 is turned on.

Specifically, in FIG. 39, the light source unit 250 is turned on in a period Da and is turned off in a period Db in the main scanning direction. With this, the sub scanning position can be more accurately detected.

Plural diffraction images are generated by the high-order diffraction laser beams (second-order or more high-order diffraction laser beams). However, when the unit components are disposed on the light input side of a substrate of the diffraction optical element 2283, the high-order diffraction laser beams are totally reflected at the substrate and do not reach the light receiving element 2284. If the unit components are disposed on the light output side of the substrate of the diffraction optical element 2283, all the high-order diffraction laser beams are output to the side of the light receiving element 2284. Consequently, there is a risk that the high-order diffraction laser beams may reach the light receiving element 2284 as ghost light by being reflected at various parts. Therefore, when the unit components are disposed on the light input side of the substrate of the diffraction optical element 2283, the likelihood of influence caused by the ghost light can be decreased.

In addition, when λ>p (the pixel interval is "p" and the using wavelength is λ), all the high-order diffraction laser beams are totally reflected at the rear surface of the substrate of the diffraction optical element 2283. With this, the generation of the ghost light at the light receiving element 2284 can be prevented.

However, the laser beams reflected at the rear surface of the substrate of the diffraction optical element 2283 are output from the side of the substrate. Therefore, there is a risk that the output laser beams may reach the photoconductor drum 111 as the ghost light. In order to prevent the ghost light from reaching the photoconductor drum 111, when the refractive index of the substrate is defined as "m" and Inequality (3) is satisfied, $$\lambda/m > p \quad (3)$$

the high-order diffraction laser beams become evanescent waves and are not transmitted. With this, the ghost light can be prevented from reaching the light receiving element 2284 and the photoconductor drum 111.

In addition, when the laser beam is input in a slanting direction to the diffraction optical element 2283, the pattern of the diffraction image is distorted. Therefore, the laser beam is input in an almost perpendicularly direction to the input surface of the diffraction optical element 2283. With this, the sub scanning position can be accurately detected.

As described above, a part of the pattern of the diffraction image in the sub scanning direction is detected by the light receiving element 2284. Therefore, it is designed that the width of the light receiving element 2284 in the sub scanning direction becomes a predetermined width. However, as described in the first embodiment, an aperture for controlling the beam width in the sub scanning direction can be disposed before the light receiving element 2284; with this, the width of the laser beams input to the light receiving element 2284 in the sub scanning direction is controlled. When a general-purpose light receiving element, for example, a photodiode is combined with the aperture, the sub scanning position of the laser beams can be detected at low cost.

When a part of the pattern of the diffraction image formed by the diffraction optical element 2283 in the sub scanning direction is detected by the light receiving element 2284, it is preferable that a detectable width Psub be different from a value equal to an interval Bsub (the narrowest interval between dots) is multiplied by an integer. The detectable width Psub is a width at which the light receiving element 2284 can detect the laser beams in the sub scanning direction and the interval Bsub is an interval (the narrowest interval between dots) of the laser beams divided by the diffraction optical element 2283 in the sub scanning direction.

Figure 40:
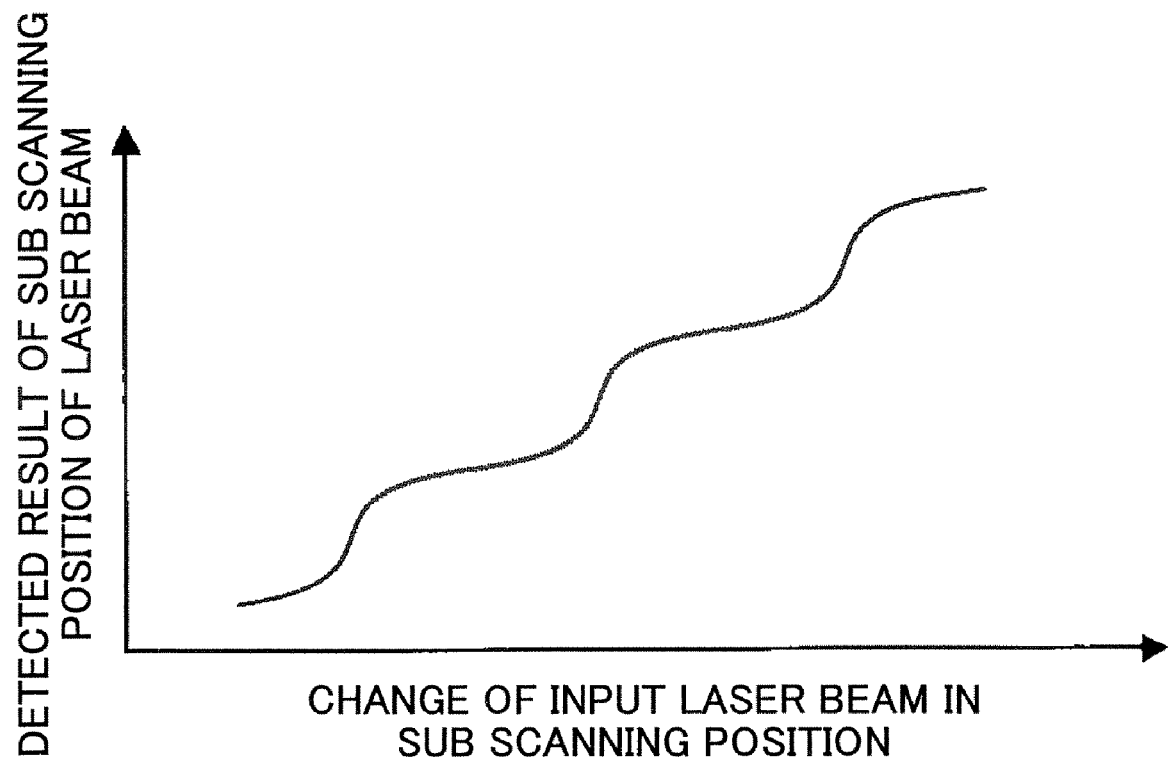
FIG. 40 is a graph showing a relationship between a change of the input laser beam in the sub scanning direction and a detected result of a sub scanning position of the laser beam.

In a case where the detectable width Psub becomes the value equal to the interval Bsub multiplied by an integer, when the input laser beam is changed in the sub scanning direction, the detected result of the sub scanning position of the laser beam becomes a characteristic expressed graphically as a wave shape as shown in FIG. 40. FIG. 40 is a graph showing a relationship between the change of the input laser beam in the sub scanning direction and the detected result of the sub scanning position of the laser beam. Since the plural laser beams divided by the diffraction optical element 2283 are discretely arrayed, the above wave-shaped characteristic is generated. It is ideal that the characteristic shown in FIG. 40 be linear; when the characteristic is shifted from the linear shape, the detection error in the detected result of the sub scanning position is increased.

When the detectable width Psub is changed from the value equal to the interval Bsub multiplied by an integer, the discretely arrayed laser beams are averaged at the detection by the light receiving element 2284 and the characteristic shown in FIG. 40 becomes almost linear. With this, the detection error in the detected result of the sub scanning position can be decreased.

It is most preferable that (Psub−Bsub×k) (the maximum integer at Psub>Bsub×k) be approximately ½ of Bsub (k is an integer).

It is preferable that the diffraction image formed by the diffraction optical element 2283 have rotational symmetry of 180° about the optical axis. When a desirable diffraction image (direct image by the first-order+diffraction laser beams) is obtained, an image is generated where the desirable diffraction image is rotated 180° by making the optical axis the center. The generated image is a conjugated image generated by the first-order diffraction laser beams. In addition, when the diffraction optical element 2283 is formed to have a two-step phase (height), theoretically, the direct image and the conjugated image are generated in the ratio of 1:1. Therefore, when the pattern of the desirable diffraction image has a rotational symmetry pattern of 180°, the direct image and the conjugated image are superposed. Therefore, in addition to the increase of the light utilizing efficiency, the generation of noise can be prevented.

FIFTH MODIFIED EXAMPLE OF SECOND EMBODIMENT

Next, a fifth modified example of the second embodiment is described.

In the above description, the method of detecting the laser beam (light spot) in the sub scanning direction is described. However, actually, it is preferable to provide an additional method which can further correct the position of the light spot in the sub scanning direction. By using the additional method, for example, in a full color image forming apparatus, a high-quality color image can be obtained in which the out of color registration and distortion of the image are small.

In the additional method, in addition to the method which physically changes the position of the light spot at the sub scanning position, the position of the light spot in the sub scanning direction is corrected by changing the timing of laser beam scanning and image data to be input to the laser beam scanning device.

As the additional method, there are three correction methods. The three correction methods are described in the first embodiment of the present invention. However, application of the three correction methods to the second embodiment of the present invention is described below.

[First Correction Method]

In the first correction method, an optical element (for example, a wedge-shaped prism) is rotated by a posture controlling unit (not shown), then the position of the light spot (laser beam) in the sub scanning direction is corrected. As shown in FIG. 22, a wedge-shaped prism 501 has a light input surface and a light output surface non-parallel to the light input surface and is rotated around the optical axis 504 by a rotating mechanism (posture controlling unit). The wedge-shaped prism 501 outputs an output laser beam 503 deflected toward the direction w1 corresponding to the sub scanning direction for an input laser beam 502 based on the rotation of the wedge-shaped prism 501. The wedge-shaped prism 501 can be disposed between the light source unit 250 and the polygon mirror 213. The angle between the light input surface and the light output surface is α, the direction w2 corresponds to the main scanning direction and the direction w3 corresponds to the optical axis 504.

In this case, the writing control circuit 30 generates a driving signal for rotating the wedge-shaped prism 501 so as to correct the position shift based on the position shift amount and the position shift direction detected by the sub scanning position calculating circuit 23, and outputs the driving signal to the rotating mechanism. With this, the angle of the output laser beam 503 in the sub scanning direction is changed and the position of the light spot in the sub scanning direction can be corrected.

[Second Correction Method]

Next, referring to FIG. 23 again, a second correction method is described. In the second correction method, the position in the sub scanning direction is corrected by using a liquid crystal deflection element 143. The liquid crystal deflection element 143 deflects light by utilizing characteristics that the refractive index for light having a deflection direction is changed by applying a voltage. A deflection element can be formed of an electro-optical material such as LiNbO$_3$ instead of using the liquid crystal. The liquid crystal deflection element 143 is disposed between the light source unit 250 and the polygon mirror 213, similar to the wedge-shaped prism 501.

FIG. 23(*a*) shows the shape of the liquid crystal deflection element 143 and an effective area EA where the optical paths of the laser beams can be deflected is disposed in the center of the liquid crystal deflection element 143. FIG. 23(*b*) shows a transparent electrode plate 152-1 (refer to FIG. 23(*c*)) viewed from the light input side in the effective area EA. In FIG. 23(*b*), plural transparent electrode patterns 156-1, 156-2, 156-3, . . . , 156-n having a stripe shape in the up and down direction are arrayed with the same interval therebetween in the sub scanning direction w1. The transparent electrode patterns 156-1 through 156-n are electrically connected by a pair of resistors 155. The optical paths of the laser beams are deflected in the sub scanning direction w1. FIG. 23(*c*) is a cut-away side view of the liquid crystal deflection element 143 and shows the orientation of liquid crystal molecules. In FIG. 23(*c*), a liquid crystal layer 154 whose thickness is a few μm to some tens of μm is sandwiched by two glass substrates 151-1 and 151-2 via the transparent electrode plates 151-1 and 151-2 and orientation films 153. On the whole surface of the transparent electrode plate 152-2 at the light output side, a uniform electrode pattern is formed.

A terminal CH1 is connected to the transparent electrode pattern 156-1 and a terminal CH2 is connected to the transparent electrode pattern 156-n. Driving voltages are applied to the corresponding terminals CH1 and CH2. For example, when a 1 V voltage is applied to the terminal CH1 and a 5 V voltage is applied to the terminal CH2, as shown in FIG. 23(*d*), electric potential Vt is generated in the liquid crystal layer 154 by causing a resistance of the resistor 155 to be a proportional constant. The tilt angles of the liquid crystal molecules are changed by an electric potential distribution generated by the electric potential. When a laser beam LB is input to the oriented liquid crystal molecules which laser beam is polarized in the long axis direction of the liquid crystal molecules at 0 V, as shown in FIG. 23(*e*), the laser beam LB follows an inclination of the refractive index Ri in the same direction of the polarization direction.

In other words, the liquid crystal deflection element 143 can deflect the laser beam LB by operating similar to a prism. When the driving voltages are changed, the inclination of the refractive index Ri can be changed. Therefore, the deflection angle of the laser beam LB can be controlled. In this case, the writing control circuit 30 generates a driving signal corresponding to the driving voltages of the liquid crystal deflection element 143 so that the position shift can be corrected based on the position shift amount and the position shift direction of the light spot in the sub scanning direction detected by the sub scanning position calculating circuit 23.

In the above method in which the wedge-shaped prism 501 or the liquid crystal deflection element 143 is used, in addition to the correction of the image forming start position in the sub scanning direction, the position in the sub scanning direction while an image is being formed can be corrected.

[Third Correction Method]

Next, referring to FIG. 21 again, a third correction method is described. In the third correction method, the image forming start position in the sub scanning direction is corrected in each line corresponding to the resolution of the image.

First, an image forming start position is described. In the writing control circuit 30, when an operation start signal STOUT is detected, the number N of light scanning start signal pulses SOS is counted, when the number N reaches a predetermined value Cs, image forming is started at a time T1. The operation start signal STOUT is generated by a user operation on an operations panel (not shown). The light scanning start signal pulse SOS is detected in each scanning by the light receiving element 2284.

When the image forming start position in the sub scanning direction in each line is adjusted corresponding to the resolution of the image, the value of the number N is changed.

When a value "1" is subtracted from the predetermined value Cs, the number N is Cs−1; then, the image forming is started at T2, that is, the image forming is started at T2 advanced by one line ΔL from T1. When a value "1" is added to the predetermined value Cs, the number N is Cs+1; then, the image forming is started at T3, that is, the image forming is started at T3 delayed by one line ΔL from T1.

As described above, by changing the number N of the light scanning start signal pulses SOS, the image forming start position in the sub scanning direction can be corrected. When the resolution is 600 dpi, the position in the sub scanning direction can be corrected by a 42.3 μm unit, and when the resolution is 1200 dpi, the position in the sub scanning direction can be corrected by a 21.2 μm unit. In addition, when blank lines are formed at the head of the image data, the correction can be executed by changing the number of the blank lines.

In the third correction method, the correction of the image forming start position in the sub scanning direction is applied to each line; therefore, this method is simple and easy. However, when the correction of the image forming start position in the sub scanning direction is applied to a unit less than each line, the first correction method using the wedge-shaped prism 501 or the second correction method using the liquid crystal deflection element 143 is used.

As described above, according to the second embodiment of the present invention, when the laser beam scanning device 900 is used in the full color image forming apparatus 100, the sub scanning position detecting system 228 can detect the position of the light spot in the sub scanning direction. In addition, since the three correction methods are further provided, the out of color registration among colors in the output image can be decreased. Therefore, a high-quality color image can be obtained.

In addition, conventionally, a pattern is formed on a transfer belt by toner particles, and the pattern is detected by a pattern detecting unit composed of a light emitting element, a light receiving element, a condenser lens, and so on. By the detected pattern, the out of color registration is detected and corrected. Consequently, the conventional method needs time for detecting the out of color registration and makes the productivity low; further, toner is excessively consumed and the excess consumption of the toner damages the environment.

However, according to the second embodiment of the present invention, since pattern forming by toner is not needed, the productivity can be increased and the consuming amount of toner can be decreased. In addition, since the pattern detecting unit is not used, the cost can be decreased.

Third Embodiment

Next, a third embodiment of the present invention is described. In the third embodiment, the reference number of each element is different from that in the first and the second embodiments. In some cases, the same reference number is used for an element in the third embodiment which is different from an element in the first and the second embodiments. However, within the third embodiment, the same reference number is used for the same element.

Referring to the drawings, the third embodiment of the present invention is described.

Figure 41:
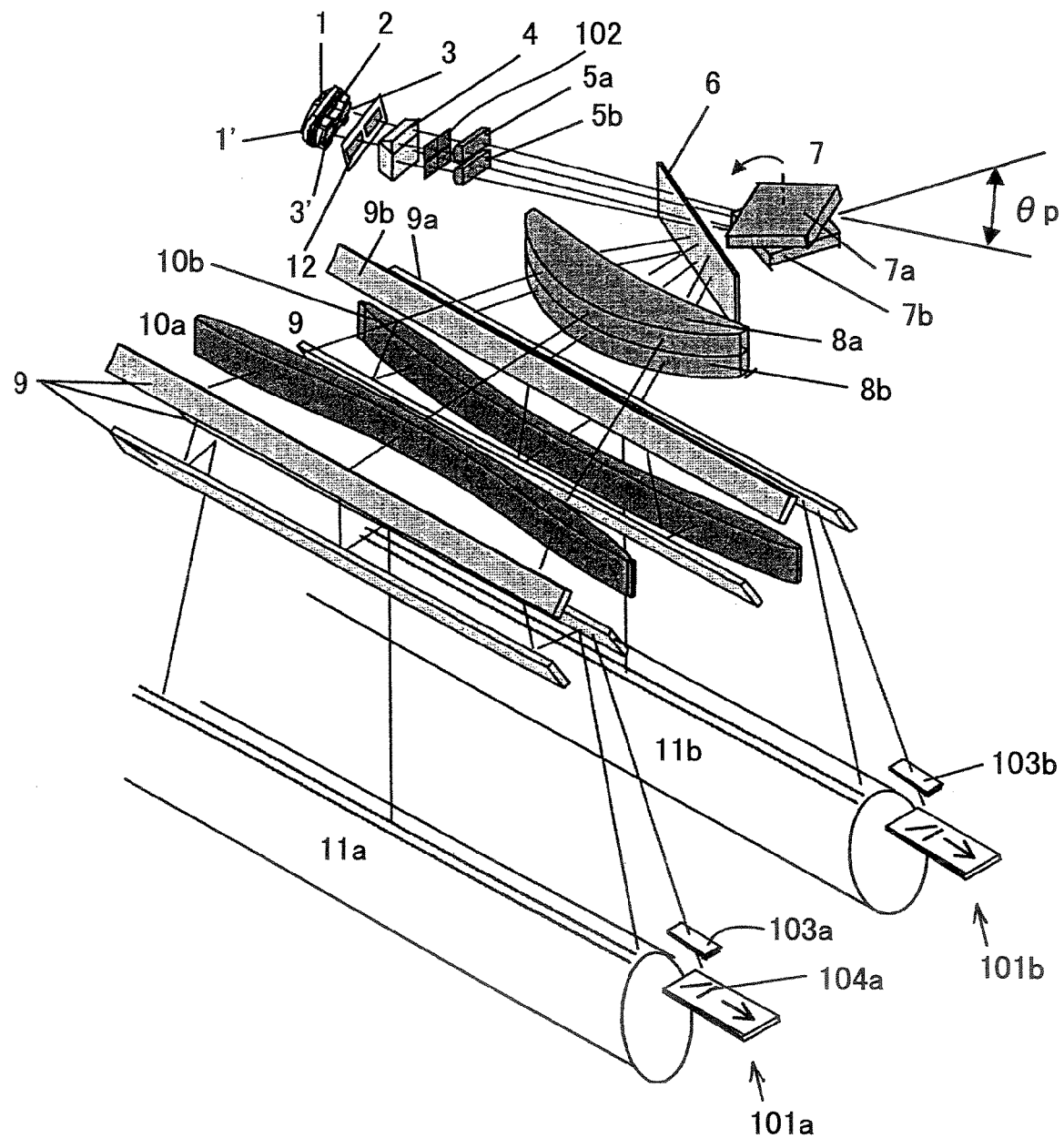
FIG. 41 is a perspective view of a part of a laser beam scanning device and photoconductor drums according to a third embodiment of the present invention.
Figure 42:
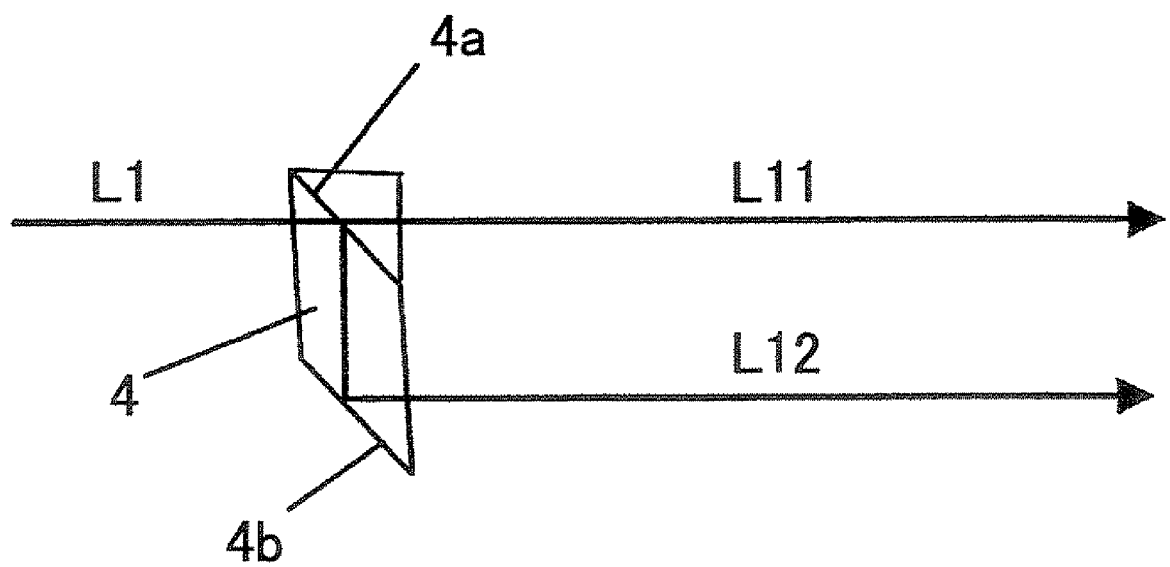
FIG. 42 is a schematic diagram showing a half mirror lens shown in FIG. 41.

FIG. 41 is a perspective view of a part of a laser beam scanning device and photoconductor drums according to the third embodiment of the present invention. In FIG. 41, a light deflection system includes semiconductor lasers 1 and 1' which are light sources, a base plate 2 which holds the semiconductor lasers 1 and 1', coupling lenses 3 and 3', a half mirror prism 4, cylindrical lenses 5a and 5b, and a light deflection element (laser beam deflecting unit) 7. Each of the laser beams emitted from the semiconductor lasers 1 and 1' is divided into two laser beams in the sub scanning direction by the half mirror prism 4. FIG. 42 is a schematic diagram showing the half mirror lens 4 shown in FIG. 41.

As shown in FIG. 42, the half mirror prism has a surface to which a laser beam L1 is perpendicularly input, a translucent surface 4a, and a reflection surface 4b. The translucent surface 4a is disposed so that an angle of 45° is formed for the laser beam L1. The reflection surface 4b is disposed parallel to the translucent surface 4a so that an angle of 45° is formed for light reflected from the translucent surface 4a. Therefore, the laser beam L1 input to the half mirror prism 4 is divided into two laser beams L11 and L12. That is, one part of the laser beam L1 is transmitted through the translucent surface 4a and is output from one surface of the output surface of the half mirror prism 4 as the laser beam L11. The other part of the laser beam L1 is reflected at the translucent surface 4a and is reflected again at the reflection surface 4b and is output from the other surface of the output surface of the half mirror prism 4 as the laser beam L12 which is parallel to the laser beam L11. The laser beam L11 is input to the cylindrical lens 5a, and the laser beam L12 is input to the cylindrical lens 5b.

In FIG. 41, a soundproof glass 6 is disposed at a window of a soundproof housing (not shown) of the light deflection element 7. A laser beam output from the semiconductor laser 1 is divided into two laser beams in the sub scanning direction by the half mirror prism 4, and a laser beam output from the semiconductor laser 1' is divided into two laser beams in the sub scanning direction by the half mirror prism 4. The total four laser beams are input to the light deflection element 7 via the soundproof glass 6. The light deflection element 7 is formed of polygon mirrors 7a and 7b, and the polygon mirrors 7a and 7b are rotated by a motor (not shown) at a predetermined velocity. The laser beams are reflected and deflected by the polygon mirrors 7a and 7b. The deflected laser beams are output to a scanning image forming optical system (described below) via the soundproof glass 6. As shown in FIG.

41, the polygon mirrors 7a and 7b are stacked in the sub scanning direction (rotation axis direction).

As shown in FIG. 41, the polygon mirrors 7a and 7b are the same shape each having four deflection surfaces. The deflection surface of the polygon mirror 7b is shifted by a predetermined angle θp=45° from the deflection surface of the polygon mirror 7a in the rotating direction.

In FIG. 41, first scanning lenses 8a and 8b, second scanning lenses 10a and 10b, optical path folding mirrors 9a and 9b, and photoconductor drums 11a and 11b are shown. The first scanning lens 8a, the second scanning lens 10a, and the optical path folding mirror 9a lead the two laser beams deflected by the upper polygon mirror 7a to the photoconductor drum 11a at the corresponding scanning positions and form two light spots separated in the sub scanning direction on the photoconductor drum 11a. That is, the first scanning lens 8a, the second scanning lens 10a, and the optical path folding mirror 9a form a first scanning image forming optical system. Similarly, the first scanning lens 8b, the second scanning lens 10b, and the optical path folding mirror 9b leads the two laser beams deflected by the lower polygon mirror 7b to the photoconductor drum 11b at the corresponding scanning positions and form two light spots separated in the sub scanning direction on the photoconductor drum 11b. That is, the first scanning lens 8b, the second scanning lens 10b, and the optical path folding mirror 9b form a second scanning image forming optical system.

In the following, when a suffix is not attached to a reference number of an element, the reference number represents the set of elements. For example, the photoconductor drum 11 represents the photoconductor drums 11a and 11b.

The main laser beams of the laser beams output from the semiconductor lasers 1 and 1' cross near the deflection and reflection surface of the light deflection element 7 viewed from the rotation axis direction of the light deflection element 7. Therefore, the two laser beams divided by the half mirror prism 4 and input to the deflection and reflection surface of the light deflection element 7 have an aperture angle. That is, when the semiconductor lasers 1 and 1' are viewed from the deflection and reflection surface of the light deflection element 7, the two laser beams form an angle by projecting the two laser beams on the surface orthogonal to the rotational axis of the light deflection element 7.

As described above, the two laser beams deflected by the polygon mirror 7a of the light deflection element 7 scan on the photoconductor drum 11a by multi-beam scanning, and similarly, the two laser beams deflected by the polygon mirror 7b of the light deflection element 7 scan on the photoconductor drum 11b by multi-beam scanning.

Since the deflection and reflection surface of the upper polygon mirror 7a of the light deflection element 7 is shifted by 45° from that of the lower polygon mirror 7b of the light deflection element 7, when the laser beams deflected by the upper polygon mirror 7a scan on the photoconductor drum 11a, the laser beams deflected by the upper polygon mirror 7b are not led to the photoconductor drum 11b. Similarly, when the laser beams deflected by the upper polygon mirror 7b scan on the photoconductor drum 11b, the laser beams deflected by the upper polygon mirror 7a are not led to the photoconductor drum 11a. That is, the laser beams scan on the corresponding photoconductor drums 11a and 11b with a time shift.

Figure 43:
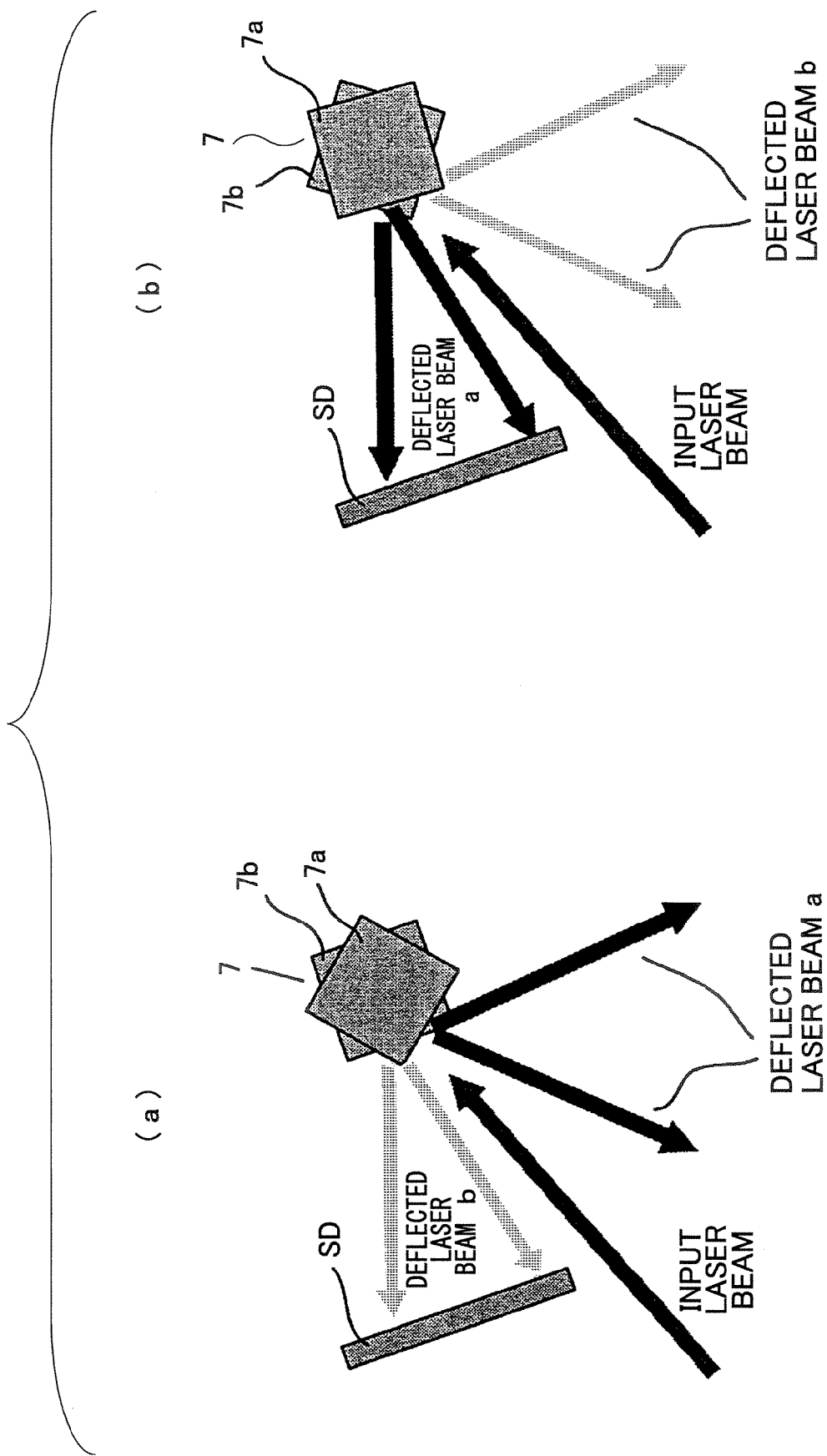
FIG. 43 is a diagram showing a time shift of scanning of the laser beams on corresponding photoconductor drums.

FIG. 43 is a diagram showing the time shift of scanning of the laser beams on the corresponding photoconductor drums. In FIG. 43, actually, four laser beams are input to the light deflection element 7; however, one laser beam is shown, in addition, deflected laser beams "a" are deflected by the upper polygon mirror 7a, and deflected laser beams "b" are deflected by the lower polygon mirror 7b.

In FIG. 43(a), the laser beams are input to the light deflection element 7 and the laser beams reflected and deflected by the upper polygon mirror 7a are led to the laser beam scanning position. At this time, the laser beams reflected and deflected by the lower polygon mirror 7b are not led to the laser beam scanning position. In FIG. 43(b), the laser beams are input to the light deflection element 7 and the laser beams reflected and deflected by the lower polygon mirror 7b are led to the laser beam scanning position. At this time, the laser beams reflected and deflected by the upper polygon mirror 7a are not led to the laser beam scanning position. In order that the laser beams deflected by the other polygon mirror do not operate as ghost laser beams, while the laser beams deflected by one polygon mirror are led to the laser beam scanning position, as shown in FIG. 43, a light shielding device SD is disposed at a suitable position. With this, the ghost laser beams are not led to the laser beam scanning position.

In FIG. 41, laser beam detectors (light receiving elements) 101a and 101b are disposed outside the ends of the corresponding photoconductor drums 11a and 11b in the axle direction of the corresponding photoconductor drums 11a and 11b. The light receiving surfaces of the light receiving elements 101a and 101b are positioned to face the scanning laser beams. In addition, a diffraction optical element 103a is disposed on the optical path of the scanning laser beam reaching the light receiving element 101a so as to form a predetermined pattern of a diffraction image on the light receiving element 101a, and a diffraction optical element 103b is disposed on the optical path of the scanning laser beam reaching the light receiving element 101b so as to form a predetermined pattern of a diffraction image on the light receiving element 101b. When the laser beams are transmitted through the corresponding diffraction optical elements 103a and 103b, the corresponding patterns of the diffraction images are formed on the corresponding light receiving elements 101a and 101b.

In FIG. 41, a pattern 104a of a diffraction image is roughly shown which pattern is formed on the light receiving element 101a by the laser beams transmitted through the diffraction optical element 103a. The arrows on the light receiving elements 101a and 101b show the laser beam scanning directions.

Figure 49:
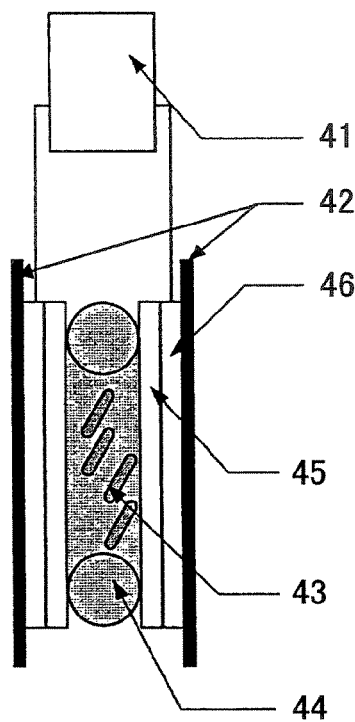
FIG. 49 is a schematic diagram showing a liquid crystal deflection element.

In FIG. 41, a liquid crystal deflection element 102 is disposed between the half mirror prism 4 and the cylindrical lenses 5a and 5b. FIG. 49 is a schematic diagram showing the liquid crystal deflection element 102. In FIG. 49, a liquid crystal layer 43 is formed by supplying liquid crystal between a pair of orientation films 45 disposed with an interval by spacers 44. Transparent electrodes 46 are disposed outside the corresponding orientation films 45, and laser beam transmitting members 42 are disposed outside the corresponding transparent electrodes 46.

Figure 50:
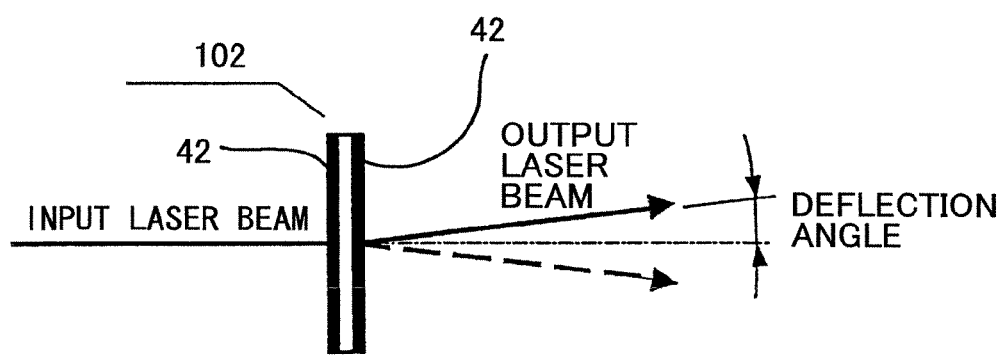
FIG. 50 is a diagram showing operations of the liquid crystal deflection element shown in FIG. 49.

When a voltage with a waveform of a rectangle or a sine wave is applied to the transparent electrodes 46 from a driving circuit 41, as shown in FIG. 50, the liquid crystal deflection element 102 deflects the input laser beam in the sub scanning direction. FIG. 50 is a diagram showing operations of the liquid crystal deflection element 102. The deflection direction is reversed corresponding to the polarity of the input voltage.

When the driving circuit 41 does not apply a voltage, the liquid crystal deflection element 102 transmits the input laser beam without deflection. The laser beam scanning position in the sub scanning direction is corrected based on the detected positions by the light receiving elements 101a and 101b so that the laser beam scanning position becomes a desirable position by controlling the liquid crystal deflection element 102. The liquid crystal deflection element 102 has four independently controllable liquid crystal deflection regions corresponding to the four laser beams, and each laser beam can be independently controlled. Therefore, it is preferable that the liquid crystal deflection element 102 be disposed behind the half mirror prism 4.

As described above, as shown in FIG. 41, since the photoconductor drums 11*a* and 11*b* are alternately scanned by multi-beam scanning, for example, when the laser beams scan on the photoconductor drum 11*a*, the light intensity of the light source is modulated by a black image signal, and when the laser beams scan on the photoconductor drum 11*b*, the light intensity of the light source is modulated by a cyan image signal. With this, a black electrostatic latent image can be formed on the photoconductor drum 11*a* and a cyan electrostatic latent image can be formed on the photoconductor drum 11*b*.

Figure 44:
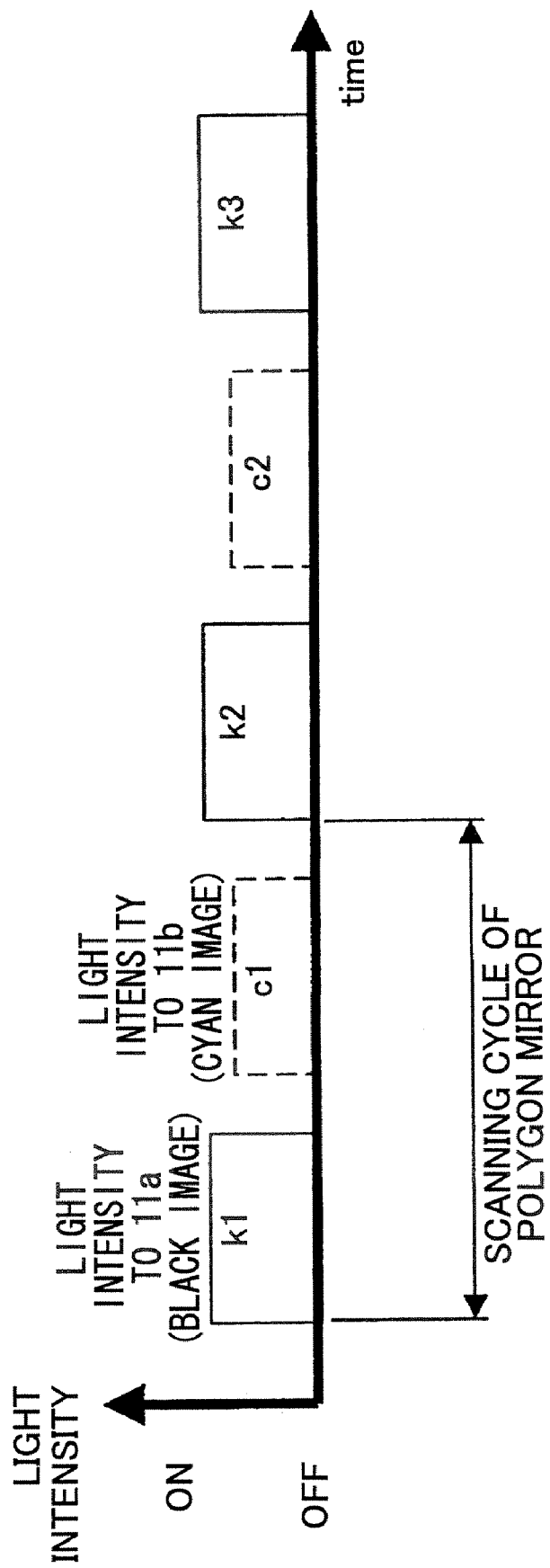
FIG. 44 is a timing chart in which timings and light intensity of plural laser beams reflected and deflected by a light deflection element are shown.

FIG. 44 is a timing chart in which timings and the light intensity of plural laser beams reflected and deflected by the light deflection element 7 are shown. In the timing chart shown in FIG. 44, laser beams in an effective scanning region are shown in a case where electrostatic latent black and cyan images are formed by writing black and cyan images by the semiconductor laser 1 and 1'. In FIG. 44, the continuous line corresponds to black images and the dashed line corresponds to cyan images. The black image writing start timing and the cyan image writing start timing in the main scanning direction are determined by detecting laser beams moving to the laser beam scanning start positions by a synchronization detection unit (not shown) disposed outside the effective scanning region.

When the light emitting intensity from the light source at a time of writing a black image is the same as at a time of writing a cyan image, the light amount reaching the photoconductor drums 11*a* is different from that reaching the photoconductor drum 11*b*, due to the differences of the transmittance and the reflectance of optical elements in the corresponding optical paths to the corresponding photoconductor drums 11*a* and 11*b*. Therefore, as shown in FIG. 44, when laser beams scan on photoconductor drums, the light amounts reaching the different photoconductor drums are made the same by making the light emitting intensity different from each other.

Figure 45:
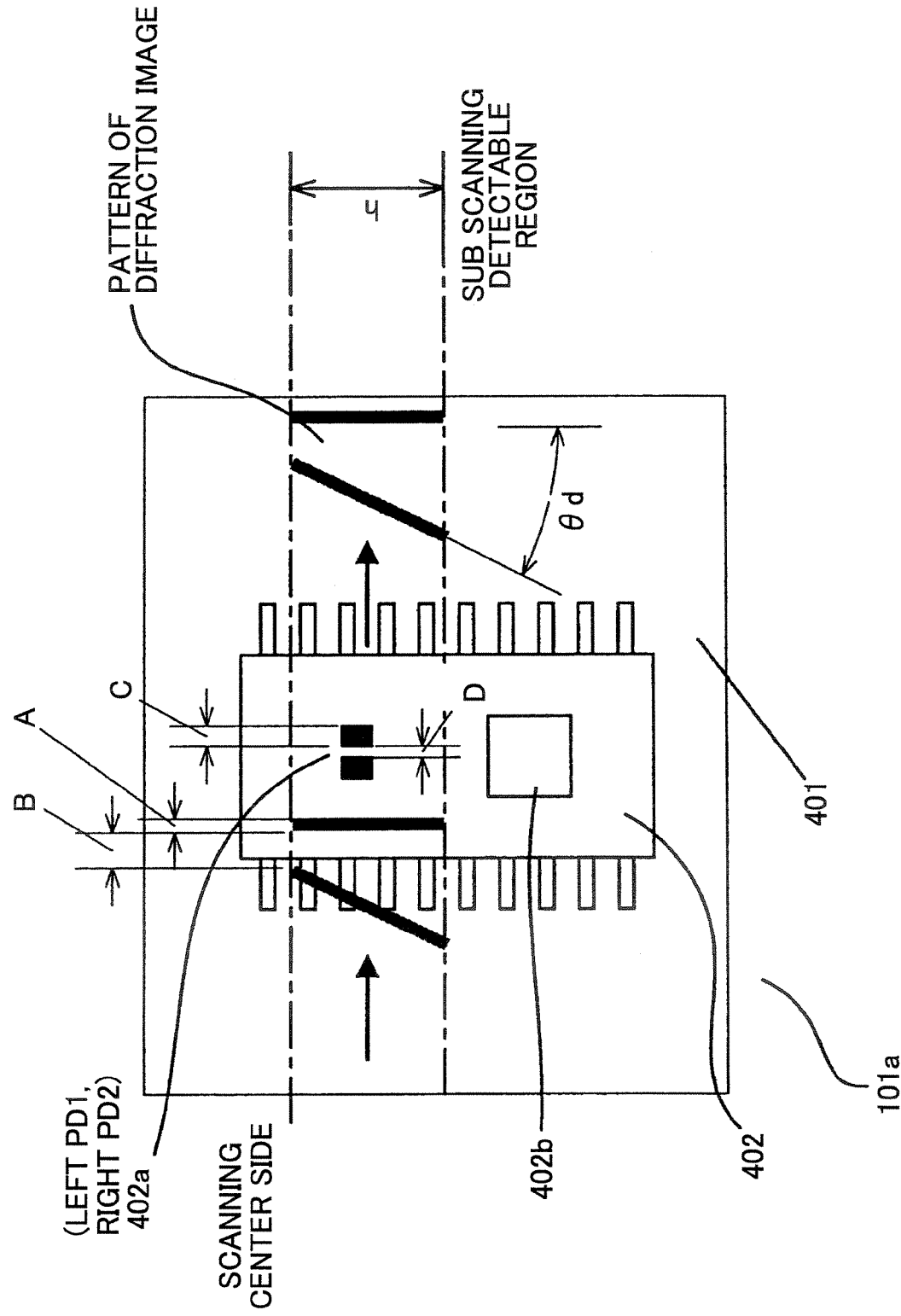
FIG. 45 is a schematic diagram showing a light receiving element.

FIG. 45 is a schematic diagram showing the light receiving element 101*a*. The light receiving element 101*b* has the same structure; therefore, the same description is omitted. The light receiving element 101*a* is disposed at an equivalent position where the laser beams scan on the photoconductor drum 11*a* in which an optical characteristic such as a fθ characteristic is equivalent for each optical path.

A substrate 401, a light receiving section 402, a light receiving component 402*a* formed of, for example, PDs (photodiodes), and a comparator circuit 402*b* are shown in FIG. 45. When the deflected laser beams are transmitted through the diffraction optical element 103*a*, a predetermined pattern of a diffraction image is formed. The predetermined pattern of the diffraction image is formed and the pattern scans on the light receiving element 101*a*. In FIG. 45, the pattern of the diffraction image is formed of two straight-line patterns in the scanning direction, that is, a first pattern is orthogonal to the scanning direction and a second pattern is inclined by an angle θd from the first pattern.

When the input laser beams are shifted in the sub scanning direction, the diffraction optical element 103*a* shifts the pattern of the diffraction image in the sub scanning direction by the same amount as the shifted amount. The light receiving component 402*a* fixed at a predetermined position detects the pattern of the diffraction image. When the patterns of the diffraction images are moved in the sub scanning direction, a time interval of outputs from the light receiving component 402*a* between the two patterns of the diffraction images is changed. By measuring the time interval between the outputs from the light receiving component 402*a* arrayed in the scanning direction, the position of the laser beams in the sub scanning direction can be detected. The light receiving component 402*a* is composed of a left PD1 and a right PD2. The width of the PD1 and the PD2 is defined as C in the scanning direction and the interval between the PD1 and PD2 is defined as D.

Figure 53:
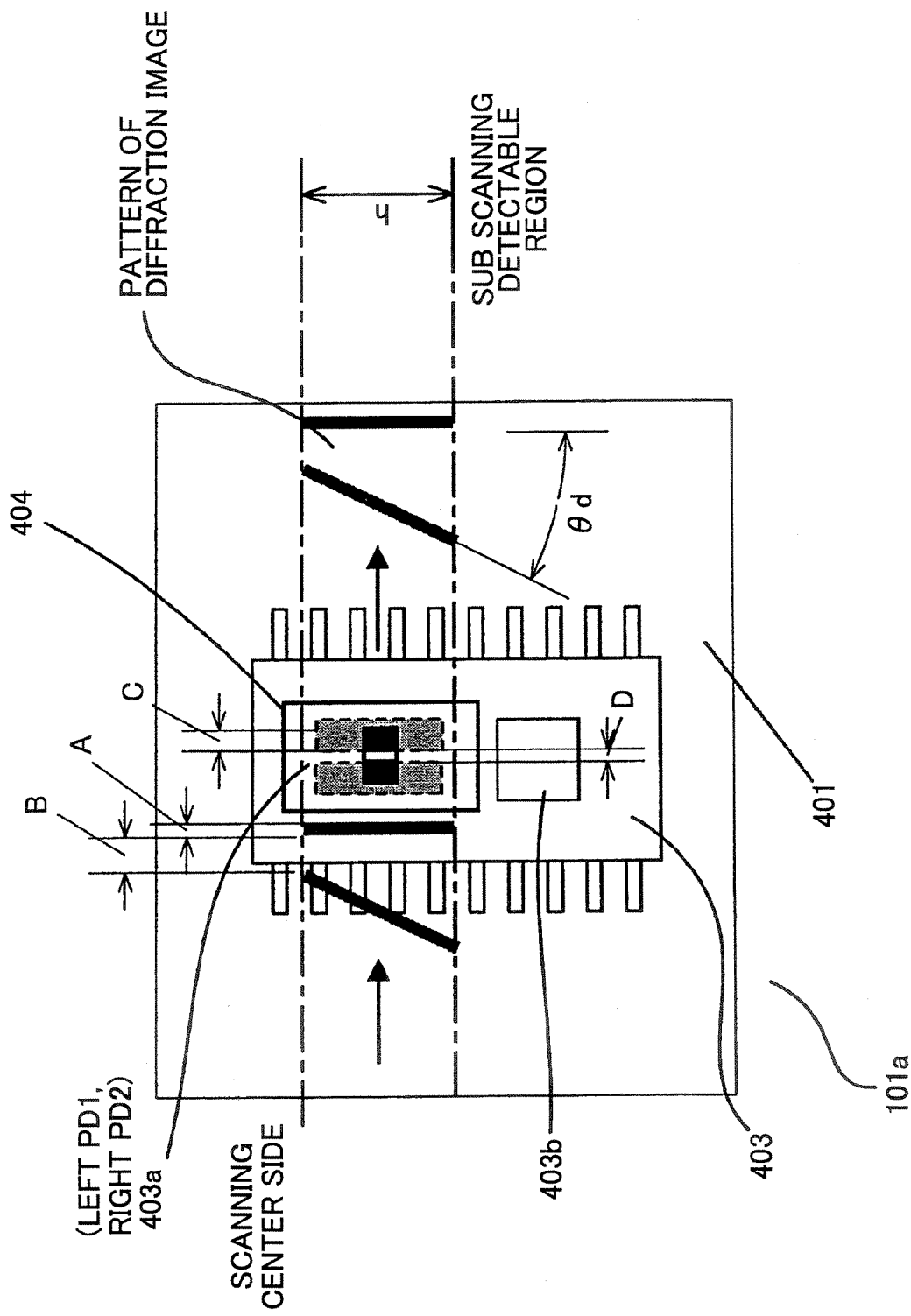
FIG. 53 is a schematic diagram showing a light receiving element using a general-purpose photo IC having a wide light receiving area.

FIG. 53 is a schematic diagram showing a light receiving element using a general-purpose photo IC 403 having a wide light receiving area. When the light receiving element shown in FIG. 53 is compared with the light receiving element 101*a* shown in FIG. 45, the light receiving element shown in FIG. 53 includes the photo IC 403 and an aperture 404. Therefore, the photo IC 403 and the aperture 404 are described in detail.

In FIG. 53, in the photo IC 403, similar to that shown in FIG. 45, the light receiving component 403*a* is disposed at the scanning position of the pattern of the diffraction image. The light receiving component 403*a* includes a left PD1 and a right PD2 arrayed in the scanning direction of the pattern of the diffraction image. The interval between the left PD1 and the right PD2 is D as described in FIG. 45, and the aperture 404 is disposed in front of the left PD1 and the right PD2.

Figure 54:
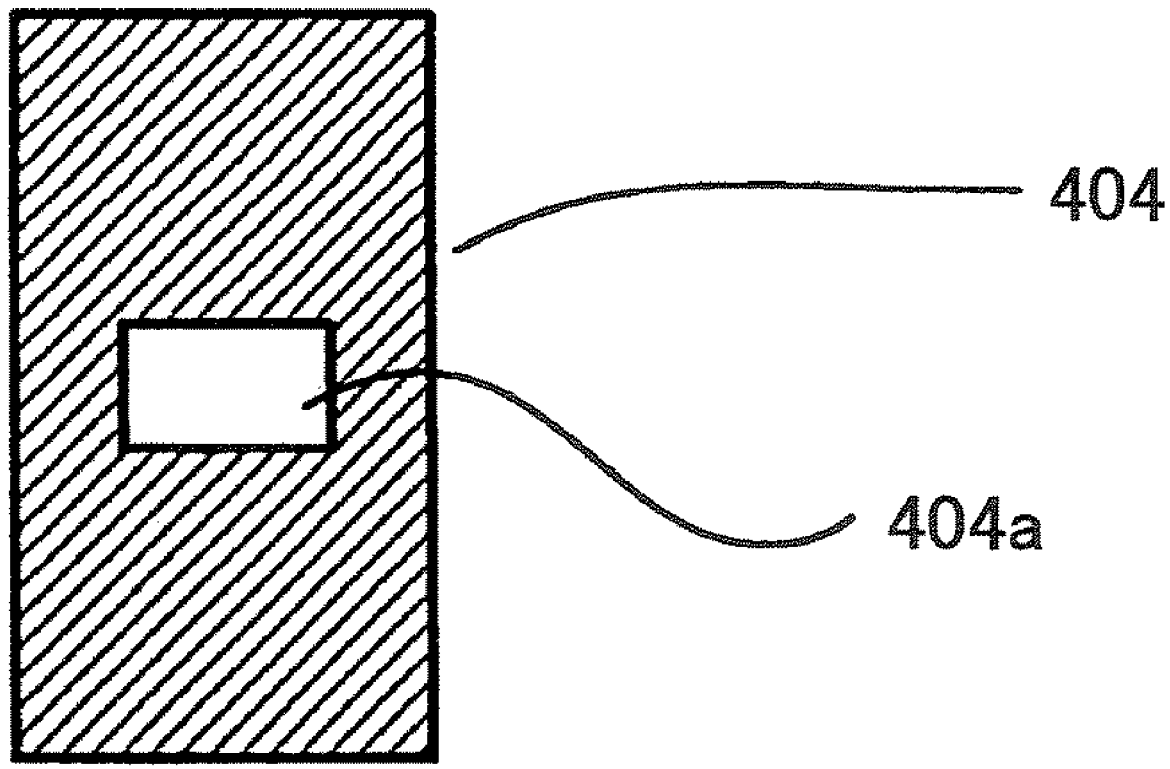
FIG. 54 is a plan view of an aperture shown in FIG. 53.

FIG. 54 is a plan view of the aperture 404. The aperture 404 is formed of a black metal plate having a thickness of less than 0.5 mm with an opening part 404*a* at the center. In FIG. 53, the aperture 404 is adhered on the surface of the photo IC 403 by an adhesive or a two-sided tape. The left PD1 and the right PD2 are disposed at the opening part 404*a* of the aperture 404. In FIG. 53, a comparator circuit 403*b* is shown.

By applying a plating process or a depositing process to the surface of the package of the photo IC 403, an opening part equivalent to the opening part 404*a* can be formed. With this, a function similar to the aperture 404 can be obtained. By the above method, since fixing of the aperture 404 to the photo IC 403 by using, for example, an adhesive is not needed, the opening part 404*a* can be accurately positioned and the laser beams can be accurately detected. When the aperture 404 and the photo IC 403 are separately fixed, it is difficult for the PD1 and PD2 to be precisely disposed at the opening part 404*a*; therefore, it is not desirable that the aperture 404 be fixed separately from the photo IC 403.

Next, a pattern forming method is described in which method a desirable pattern of laser beams is formed. In order to form the desirable pattern from coherent light such as laser beams output from a semiconductor laser, diffraction control must be applied to the laser beams. Therefore, an element is disposed which element spatially modulates the amplitude distribution or the phase distribution of the laser beams or both the distributions. When the element is disposed, a diffraction image having a desirable pattern can be obtained.

As a method for obtaining the amplitude distribution (transmittance distribution) or the phase distribution of the laser beams or both the distributions by calculation, there is CGH (computer generated holography). The CGH is realized by a CGH element. The CGH element is a kind of diffraction optical element; therefore, the CGH element is called a diffraction optical element.

Figure 46:
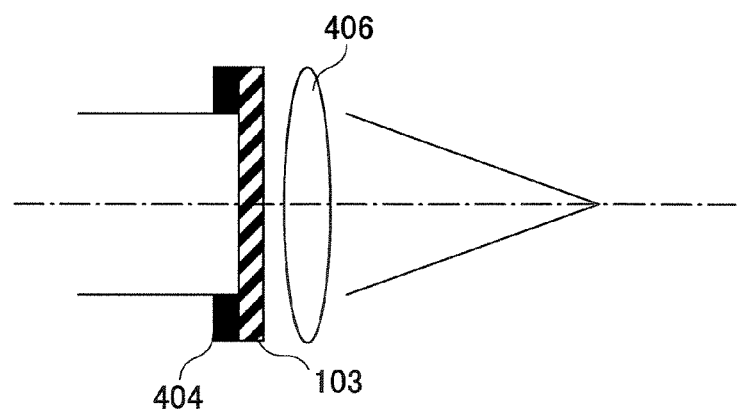
FIG. 46 is a schematic diagram showing an optical system having a diffraction optical element.

FIG. 46 is a schematic diagram showing an optical system having the diffraction optical element 103. In FIG. 46, when a plane wave is transmitted through the diffraction optical element 103, the amplitude distribution or the phase distribution of the plane wave or both the distributions are spatially modulated and the modulated wave is condensed by a lens 406. With this, a desirable diffraction image (far field pattern) can be obtained on a condensed position. The diffraction optical element 103 can include a lens; therefore, when the diffraction optical element 103 includes the lens, the lens 406 is not needed.

When the amplitude distribution (transmittance distribution) of the laser beams is spatially modulated, the light amount is decreased and it is difficult to manufacture an element having desirable transmittance. Therefore, in the present embodiment, the diffraction optical element 103 spatially modulates the phase distribution of the laser beams. That is, a diffraction optical element in which a decrease of the light amount is small is used as the diffraction optical element 103.

In order to generate a phase distribution in the laser beams, for example, a concave-convex structure is formed on a substrate which is transparent in a using wavelength region. The phase distribution can be generated in the laser beams by forming a reflection film on an element having the concave-convex structure and reflecting the laser beams with the reflection film. The concave-convex structure is formed by a three-dimensional fine pattern whose depth and pitch are 0.5 µm to 5 µm (1 to 6 times the using wavelength) when the using wavelength is 400 to 800 nm. The three-dimensional fine pattern can be formed by using a semiconductor manufacturing process or a micro-pattern transferring process. One cell of the diffraction optical element 103 is a square of 5 µm×5 µm, and the diffraction optical element 103 is composed of 256 cells×256 cells. As shown in FIG. 46, the region where the concave-convex structure is not formed is shielded by the aperture 404. The number of phase-levels is 256 tones in a 0 to 2Π rad cycle.

Figure 47:
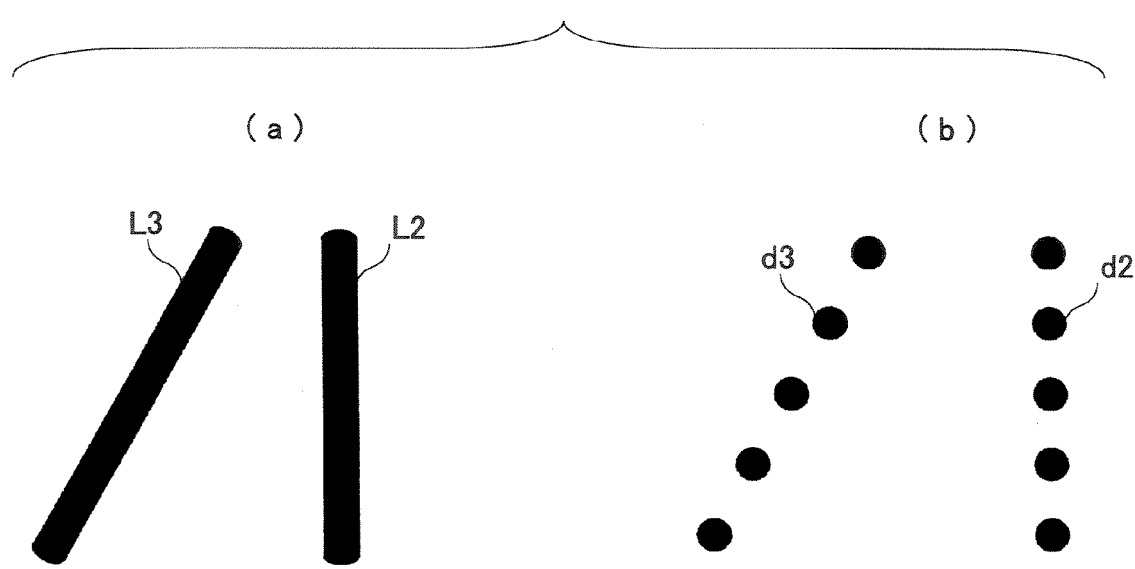
FIG. 47 is a diagram showing patterns of the diffraction image.

FIG. 47 is a diagram showing patterns of the diffraction image. In FIG. 47(a), a line-type pattern is shown, and in FIG. 47(b), a dot-type pattern is shown. In FIG. 47(b), the interval between the dots is wide and the number of the dots is small; however, actually, the number of the dots is large and the pattern is densely formed. The diffraction optical element 103 forms a pattern of plural dots or a pattern of plural lines when one laser beam is input thereto. That is, the diffraction optical element 103 has a function to divide the laser beam. When a position in the sub scanning direction is accurately detected, it is preferable to use the line-type pattern. On the other hand, in the dot-type pattern, when a temperature change in the laser beam scanning device is large, even if the positional relationship between the diffraction optical element 103 and the light detecting unit is shifted, the degradation of the pattern is low; therefore, it is preferable to use the dot-type pattern.

Figure 51:
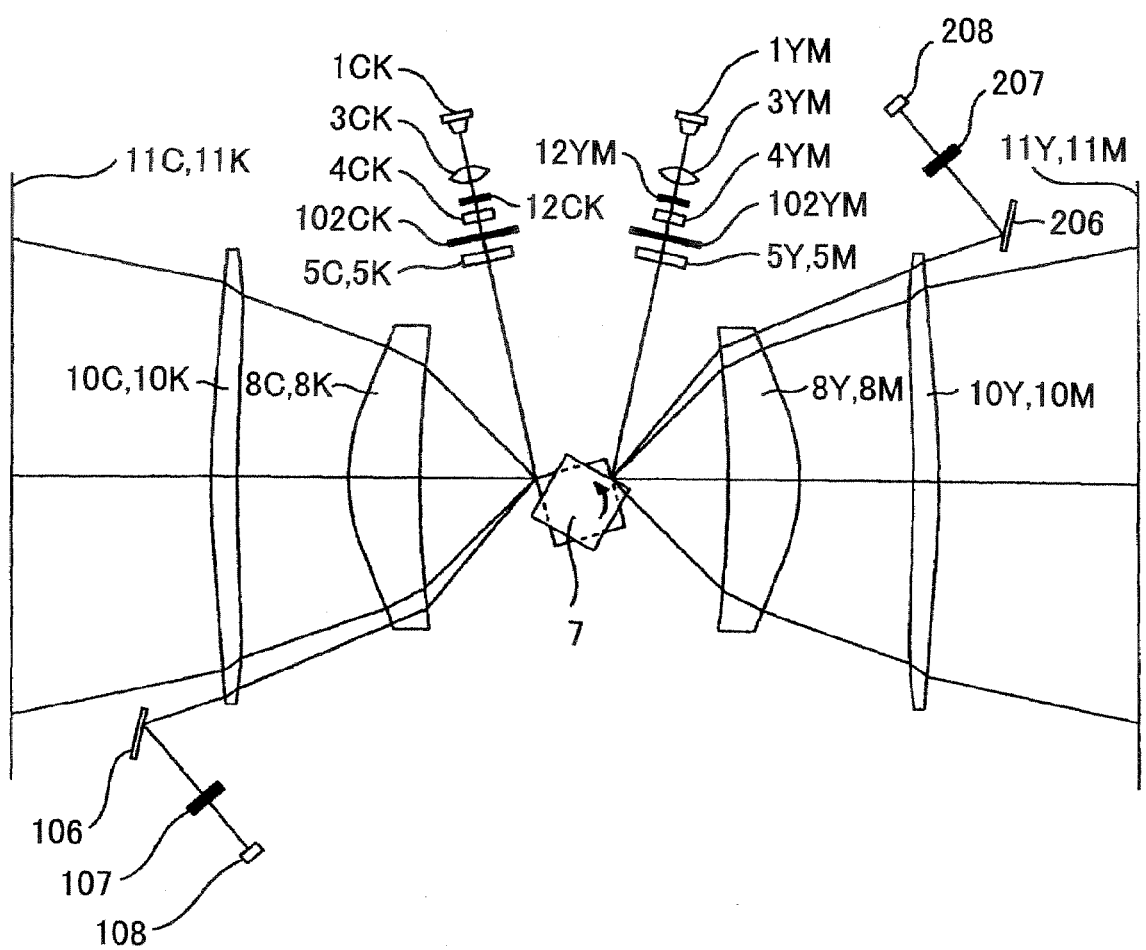
FIG. 51 is a schematic diagram showing an optical system of another laser beam scanning device.

As shown in FIG. 41, it is preferable that the light receiving surfaces of the light receiving elements 101a and 101b be positioned where the surfaces of the corresponding photoconductor drums 11a and 11b extend in the scanning direction. However, as shown in FIG. 51, instead of using the diffraction optical element 103 and the light receiving elements 101, the laser beam can scan on a light receiving element 108 via a reflection mirror 106 and a diffraction optical element 107, depending on the layout of the laser beam scanning device or the image forming apparatus using the laser beam scanning device. FIG. 51 is a schematic diagram showing an optical system of another laser beam scanning device.

In FIG. 41, only one side of the optical system of the full color image forming apparatus is shown. However, in FIG. 51, two sides of the optical system are symmetrically shown by sandwiching the light deflection element 7. Therefore, in FIG. 51, a reflection mirror 206, a diffraction optical element 207, and a light receiving element 208 are also shown.

As described above, the light receiving element (light detector) 101a includes the photo IC 403 shown in FIG. 13. The photo IC 403 is formed by integration of the light receiving component 403a and the comparator circuit 403b. The light receiving component 403a is formed of the left PD1 and the right PD2, and the comparator circuit 403b shapes waveforms of signals output from the left PD1 and the right PD2. The photo IC 403 is covered with resin and the front surfaces of the left PD1 and the right PD2 are covered with laser beam transmitting resin. The light receiving component 403a has a rectangular shape and the length thereof in the sub scanning direction is 50 to 150 µm. The beam diameter (1/e2 diameter of the peak intensity) of the dots or the lines of the pattern in the main scanning direction is 40 to 90 µm which is equivalent to the beam diameter forming an image on the scanning surface as shown in A in FIG. 53. The width C of the left PD1 and the right PD2 in the main scanning direction is larger than A. The minimum interval B between dots or lines of the pattern is 200 to 500 µm, and C is smaller than B. Specifically, C is 100 to 150 µm.

In addition, it is preferable that the width "h" of the pattern of the diffraction image in the sub scanning direction be 1 to 3 mm. When the width "h" is less than 1 mm, it is difficult to scan the pattern within the light receiving region of the light receiving component 403a at the initial stage, that is, at the assembling initial stage, without adjustment. At the assembling initial stage without adjustment, a shift of more than 1 mm occurs in the position shift in the sub scanning direction of the pattern caused by the dispersion of the tolerance of the sizes of optical components and the tolerance in assembling the optical components. Consequently, the light receiving component 403a cannot receive the laser beams. On the other hand, when the width "h" is more than 3 mm, the pattern becomes too large and the diffraction optical element 103 cannot accurately divide the laser beam. Consequently, the dispersion of dot or line arraying accuracy and the dispersion of the laser beam intensity occur; therefore, the light spot position detecting accuracy is lowered.

The photo IC 403 is disposed on the substrate 401, and the left PD1 and the right PD2 are disposed by having an interval D therebetween. The interval D is smaller than the beam diameter A of the dots or the lines of the pattern in the main scanning direction. It is preferable that the interval D be 10 to 20 µm, which is smaller than the beam diameter A of 40 to 90 µm.

The pattern L2 is disposed parallel to the sub scanning direction together with the left PD1 and the right PD2, and the pattern L3 is disposed with the angle θd for the sub scanning direction. The pattern L2 is a forward pattern and the pattern L3 is a backward pattern in the sub scanning direction.

Figure 48:
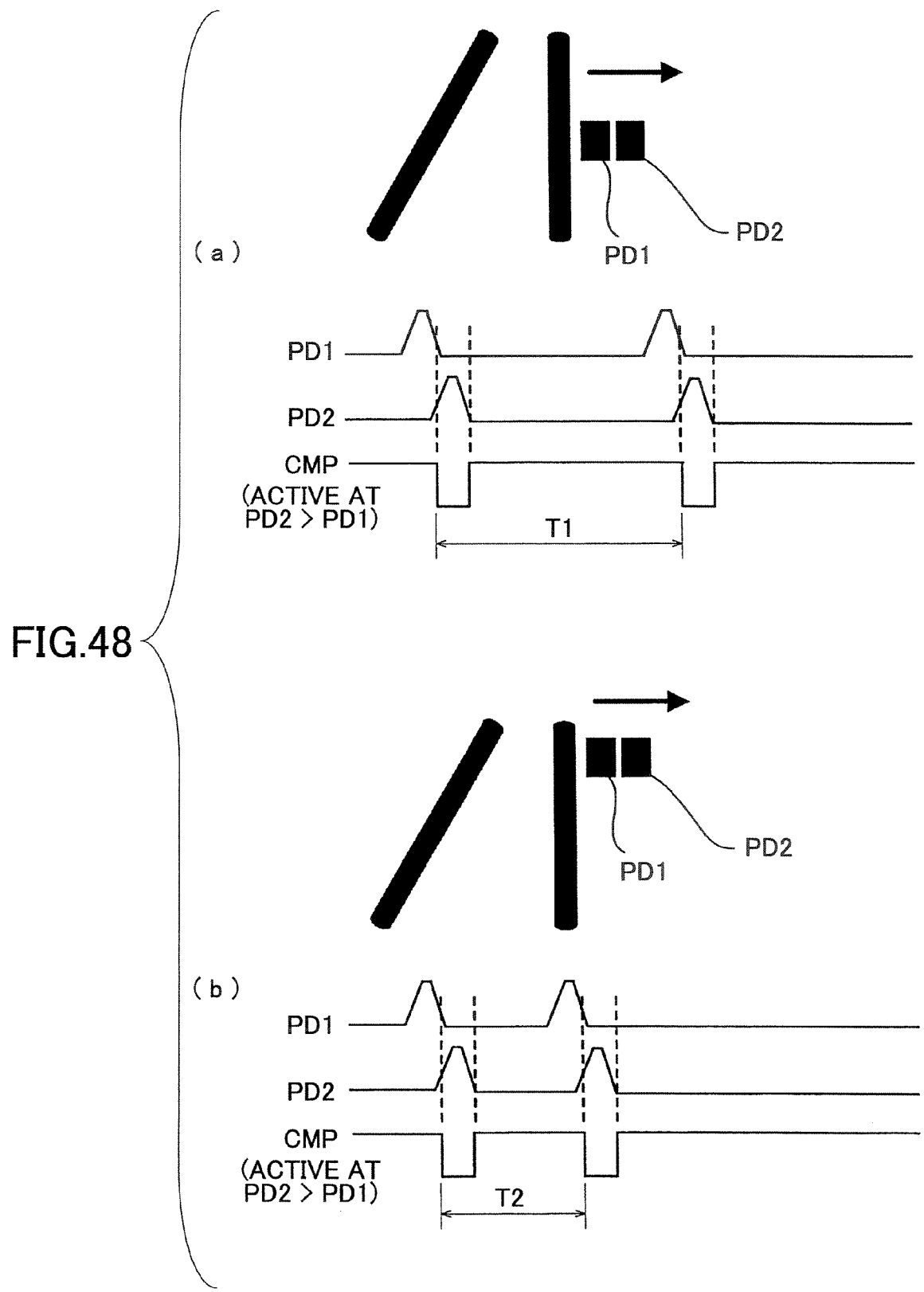
FIG. 48 is a timing chart of signals output from left and right PDs generated by the pattern of the diffraction image.

FIG. 48 is a timing chart of signals output from the left PD1 and the right PD2 generated by the pattern of the diffraction image. When the pattern of the diffraction image passes through the left PD1 and the right PD2 of the light receiving component 403a, signals are output from the left PD1 and the right PD2 as shown in the timing chart of FIG. 48. The signals output from the left PD1 and the right PD2 are compared by the comparator circuit 403c which becomes Active at PD2>PD1, and as shown in FIG. 48, a comparator signal CMP is output. The time interval between a fall of the output signal and a next fall of the output signal from the comparator circuit 403b depends on the position in the sub scanning direction scanned by the pattern. The position P of the laser beam in the sub scanning direction is obtained by Equation (4).

$$P=(v \times T)/\tan(\theta d) \quad (4)$$

where "v" is the velocity of the pattern to be scanned and is a deflection scanning velocity by the light deflection element 7.

FIG. 48(*a*) shows the time interval T1 of the CMP when the pattern exists at an approximately center position for the left PD1 and the right PD2 in the sub scanning direction. FIG. 48(*b*) shows the time interval T2 of the CMP when the pattern moves in the sub scanning direction (caused by the position change of the laser beam to the diffraction optical element 103). By the difference (T1−T2), the moved amount (changed amount) of the laser beam in the sub scanning direction can be obtained by using Equation (4).

As described above, since a cross point of outputs between the left PD1 and the right PD2 is detected, even if the light amount (intensity distribution) of the pattern is changed, the position can be accurately detected without any influence on the detecting accuracy. Therefore, the interval D between the left PD1 and the right PD2 is smaller than the laser beam diameter A. With this, the cross point can be surely generated. The calculated result by Equation (4) changes by the angle θd. However, in order that the width "h" of the sub scanning detectable region is 1 to 3 mm, it is preferable that the angle θd be 30 to 45°.

As shown in FIG. 41, in the laser beam scanning device in which plural laser beams corresponding to plural colors scan at the same time, when a laser beam scans the diffraction optical element 103, it is preferable that only one laser beam scan the diffraction optical element 103 so that the other laser beams are not detected. That is, it is preferable that other laser beams be reduced or quenched. When the plural patterns scan the light receiving component 403*a* of the light receiving element 102, the output signal from the light receiving component 403*a* is affected by the plural patterns, and mis-detection of the position may occur.

Since the light receiving element 101 is disposed outside the image scanning region (image forming region), for example, when a light deflection element having six reflection and deflection surfaces is used, optical characteristic are degraded by narrowing the scanning angle. In the third embodiment of the present invention, the light deflection element 7 having four reflection and deflection surfaces is used; therefore, the scanning angle can be wide. However, the degradation of the optical characteristic is small but exists; therefore, it is preferable that the light receiving element 101 be disposed as near as possible to the image scanning region.

In addition, it is preferable that the light receiving element 101 be movably disposed in the sub scanning direction. In order to realize the above, the light receiving element 101 is secured to a holder (not shown) and the holder is disposed to move in the sub scanning direction by using a screw mechanism (adjusting mechanism). The adjusting mechanism is adjusted at an initial stage so that the pattern of the diffraction image is positioned at an approximately center of the sub scanning detectable region "h" for the light receiving component 403*a* of the light receiving element 101 while the laser beam scanning device is being manufactured.

Since the position of the pattern may be moved to the upstream side and downstream side in the sub scanning direction, the upstream side and the downstream side of the sub scanning detectable region "h" are maintained as almost the same level. Since it is difficult to strictly dispose the pattern at the center, the pattern can be disposed at the position ±0.1 times of the sub scanning detectable region "h" of the center.

In FIG. 51, actually, optical paths from the light deflection element 7 to photoconductor drums 11C, 11K, 11M, and 11Y are folded by corresponding optical path folding mirrors (not shown); however, the optical paths are shown as linear lines.

In addition, in FIG. 51, semiconductor lasers 1YM and 1CK are shown. The semiconductor laser 1YM emits one laser beam and the semiconductor laser 1CK emits one laser beam. The light intensity of the laser beam output from the semiconductor laser 1YM is alternately modulated by an image signal of a yellow image and an image signal of a magenta image. The light intensity of the laser beam output from the semiconductor laser 1CK is alternately modulated by an image signal of a cyan image and an image signal of a black image.

The laser beam output from the semiconductor laser 1YM is made to be a laser beam by a coupling lens 3YM and the laser beam is shaped by being passed through an aperture 12YM. The shaped laser beam is input to a half mirror prism 4YM and is divided into two laser beams in the sub scanning direction. The half mirror prism 4YM is the same as that shown in FIG. 42. One of the divided laser beams is used to write a yellow image and the other of the divided laser beams is used to write a magenta image.

The sub scanning positions of the two laser beams are corrected by a liquid crystal deflection element 102YM, if necessary. Then, the two laser beams are condensed in the sub scanning direction by cylindrical lenses 5Y and 5M arrayed in the sub scanning direction and are input to the light deflection element 7. The cylindrical lenses 5Y and 5M are disposed to be stacked in the sub scanning direction. The light deflection element 7 is the same as that shown in FIGS. 41 and 43.

The laser beams converge only in the sub scanning direction by the corresponding cylindrical lenses 5Y and 5M and line images long in the main scanning direction are formed near the reflection and deflection surface of corresponding polygon mirrors of the light deflection element 7. The line images are reflected and deflected by the same angle velocity by the rotation of the polygon mirrors. The two laser beams reflected and deflected by the light deflection element 7 are transmitted through corresponding first scanning lenses 8Y and 8M formed of an fθ lens and corresponding second scanning lenses 10Y and 10M formed of a toroidal lens. Then, the two laser beams form corresponding light spots on the corresponding light scanning drums 11Y and 11M. The laser beams scan at the same velocity.

Similarly, the laser beam output from the semiconductor laser 1CK is made to be a laser beam by a coupling lens 3CK and the laser beam is shaped by being passed through an aperture 12CK. The shaped laser beam is input to a half mirror prism 4CK and is divided into two laser beams in the sub scanning direction. The half mirror prism 4CK is the same as that shown in FIG. 42. One of the divided laser beams is used to write a cyan image and the other of the divided laser beams is used to write a black image.

The sub scanning positions of the two laser beams are corrected by a liquid crystal deflection element 102CK, if necessary. Then, the two laser beams are condensed in the sub scanning direction by cylindrical lenses 5C and 5K arrayed in the sub scanning direction and are input to the light deflection element 7. The cylindrical lenses 5C and 5K are disposed to be stacked in the sub scanning direction.

The laser beams are converged only in the sub scanning direction by the corresponding cylindrical lenses 5C and 5K and line images long in the main scanning direction are formed near the reflection and deflection surface of corresponding polygon mirrors of the light deflection element 7. The line images are reflected and deflected at the same angular velocity by the rotation of the polygon mirrors. The two laser beams reflected and deflected by the light deflection element 7 are transmitted through corresponding first scanning lenses 8C and 8K formed of an fθ lens and corresponding second scanning lenses 10C and 10K formed of a toroidal lens. Then, the two laser beams form corresponding light spots on the corresponding light scanning positions 11C and 11K. The laser beams scan at the same velocity.

The length of the optical path from the semiconductor laser 1 to the photoconductor drum 11 is almost the same as that from the semiconductor laser 1 to the light receiving element 108. As shown in FIG. 51, it is preferable that the diffraction optical element 107 be disposed; between the image forming scanning optical system formed of the first scanning lens 8 and the second scanning lens 10, and the light receiving element 108. With this, the shift of the position of the laser beam in the sub scanning direction due to influence from the image forming scanning optical system, such as the deformation of the lens due to a temperature change, can be detected. Therefore, correlation between the laser beam on the surface to be scanned and the shift of the sub scanning position detected by the light receiving element 108 can be high and the sub scanning position can be accurately detected.

In the third embodiment of the present invention, the optical path folding mirror 9, the diffraction optical element 103, and the light receiving element 101 shown in FIG. 41 form a first sub scanning position detecting system. In addition, the reflection mirror 106 or 206, the diffraction optical element 107 or 207, and the light receiving element 108 or 208 shown in FIG. 51 form a second sub scanning position detecting system.

Figure 52:
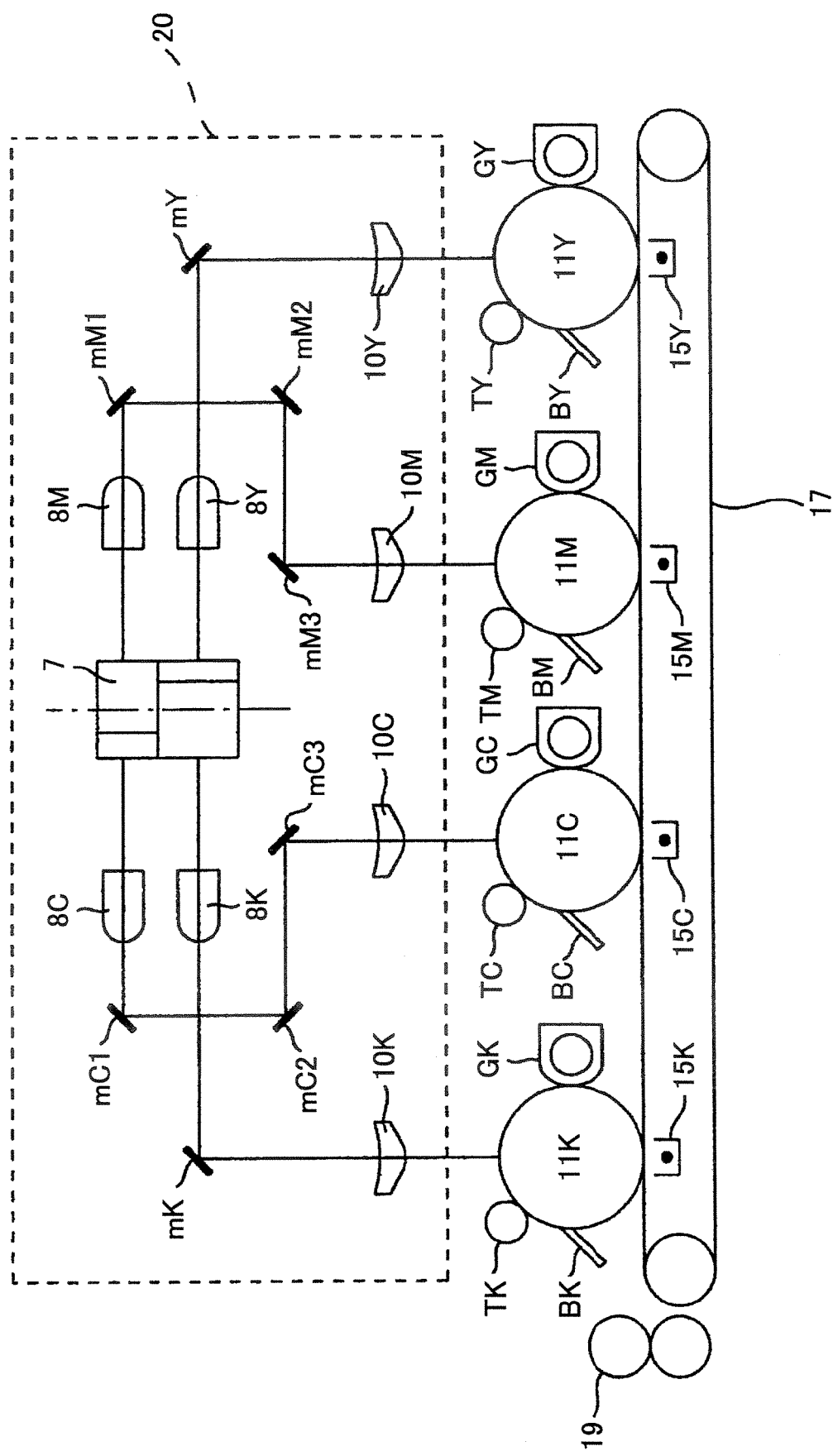
FIG. 52 is a diagram showing a part of a full color image forming apparatus according to the third embodiment of the present invention.

FIG. 52 is a diagram showing a part of a full color image forming apparatus according to the third embodiment of the present invention. In FIG. 52, a laser beam scanning device 20 without sub scanning position detecting systems is shown. The full color image forming apparatus includes scanning image forming systems corresponding to four colors yellow, magenta, cyan, and black, and laser beams of corresponding colors scan the surfaces of the corresponding photoconductor drums 11.

One of the laser beams deflected by an upper polygon mirror of the light deflection element 7 disposed in the laser beam scanning device 20 is led to the photoconductor drum 11M by an optical path folded by optical path folding mirrors mM1, mM2, and mM3. The other of the laser beams deflected by the upper polygon mirror of the light deflection element 7 is led to the photoconductor drum 11C by an optical path folded by optical path folding mirrors mC1, mC2, and mC3.

In addition, one of the laser beams deflected by an lower polygon mirror of the light deflection element 7 is led to the photoconductor drum 11Y by an optical path folded by an optical path folding mirror mY. The other of the laser beams deflected by the lower polygon mirror of the light deflection element 7 is led to the photoconductor drum 11K by an optical path folded by an optical path folding mirror mK.

As described above, a laser beam output from the semiconductor laser 1YM is divided into two laser beams by the half mirror prism 4YM and a laser beam output from the semiconductor laser 1CK is divided into two laser beams by the half mirror prism 4CK, and four laser beams scan the corresponding photoconductor drums 11Y, 11M, 11C, and 11k. The two laser beams obtained by dividing the laser beam output from the semiconductor laser 1YM alternately scan the corresponding photoconductor drums 11Y and 11M by the rotation of the light deflection element 7. In addition, the two laser beams obtained by dividing the laser beam output from the semiconductor laser 1CK alternately scan the corresponding photoconductor drums 11C and 11K by the rotation of the light deflection element 7.

In FIG. 52, the photoconductor drums 11Y through 11K are rotated clockwise at a constant angular velocity, and the surfaces thereof are uniformly charged by corresponding charging rollers TY, TM, TC, and TK. When corresponding laser beams scan on the corresponding surfaces of the photoconductor drums 11Y through 11K, electrostatic latent images of yellow, magenta, cyan, and black are formed on the corresponding surfaces of the photoconductor drums 11Y through 11K. The electrostatic latent images of yellow, magenta, cyan, and black are developed by corresponding developing units GY, GM, GC, and GK, and a yellow toner image, a magenta toner image, a cyan toner image, and a black toner image are formed on the corresponding photoconductor drums 11Y, 11M, 11C, and 11K.

Each color toner image is sequentially transferred onto a sheet by being carried by a carrying belt 17. With this, a full color image is formed on the sheet when color images are superposed. The full color image is fixed on the sheet by a fixing unit 19. Therefore, the full color image can be obtained.

As described above, when a full color image is formed, the out of color registration is corrected by the laser beam scanning device 20.

As described above, according to the third embodiment of the present invention, in the laser beam scanning device, a low-cost and general-purpose photo IC is used as the light receiving component. Therefore, a small-size and a low-cost laser beam scanning device can be realized. In addition, by using the laser beam scanning device, the out of color registration can be easily corrected in the image forming apparatus.

Further, the present invention is not limited to the specifically disclosed embodiments, and variations and modifications may be made without departing from the scope of the present invention.

The present invention is based on Japanese Priority Patent Application No. 2005-367434, filed on Dec. 21, 2005, Japanese Priority Patent Application No. 2006-046337, filed on Feb. 23, 2006, and Japanese Priority Patent Application No. 2006-253373, filed on Sep. 19, 2006, with the Japanese Patent Office, the entire contents of which are hereby incorporated herein by reference.

What is claimed is:

1. A laser beam scanning device which scans a surface to be scanned by using a laser beam, comprising:

a light source which emits the laser beam;

a laser beam deflecting unit which deflects the laser beam emitted from the light source;

a scanning optical system which condenses the laser beam deflected by the laser beam deflecting unit onto the surface to be scanned;

a diffraction optical element which forms a pattern of a diffraction image by dividing the laser beam deflected by the laser beam deflecting unit into a plurality of laser beams; and a light detector which detects the pattern of the diffraction image, wherein, the pattern of the diffraction image at the light detector includes a plurality of images where intervals between the plural images are different in a first direction corresponding to the main scanning direction at a position in a second direction corresponding to the sub scanning direction at least at a part of the plural images.

2. The laser beam scanning device as claimed in claim 1, wherein:
the pattern of the diffraction image includes at least a part of an image extending in the second direction and a part of an image extending in a direction different from the first direction and the second direction, and has rotational symmetry of 180° about an optical axis.

3. The laser beam scanning device as claimed in claim 2, wherein:
the pattern of the diffraction image further includes at least a part of another image extending in the second direction.

4. The laser beam scanning device as claimed in claim 1, wherein:
the image in the pattern of the diffraction image is a dot string image or a line image.

5. The laser beam scanning device as claimed in claim 4, wherein:
the light detector is formed of one or more light receiving elements, and the width of the light detector is greater than the width of the dot string image or the line image in the first direction.

6. The laser beam scanning device as claimed in claim 4, wherein:
the length of the light detector in the second direction is different from a value which value equals a distance between dots of the dot string image in the second direction multiplied by an integer.

7. The laser beam scanning device as claimed in claim 1, wherein:
when the width in a diffraction angle distribution in the first direction is θ max, an interval between pixels of the diffraction optical element is "p", a using wavelength is λ, and λ>"p", the interval "p" is determined to satisfy the following inequality:

arcsin(λ/p)>θmax.

8. The laser beam scanning device as claimed in claim 1, wherein:
the diffraction optical element has a structure in which unit components are periodically arrayed, each unit component is formed of pixels, boundaries among the unit components are smoothly connected, and the maximum diagonal length of the unit component is less than the spot diameter of the laser beam input to the diffraction optical element.

9. The laser beam scanning device as claimed in claim 1, wherein:
a turning on timing of the light source is determined so that a high-order diffraction image is not input to the light detector.

10. The laser beam scanning device as claimed in claim 1, wherein:
the diffraction optical element has a concave-convex structure formed three dimensionally and forms the pattern of the diffraction image by spatially modulating the phase of the laser beam input to the diffraction optical element.

11. The laser beam scanning device as claimed in claim 1, wherein:
when an interval between pixels of the diffraction optical element is "p", a using wavelength is λ, and the refractive index of a substrate of the diffraction optical element is "n", the following inequality is satisfied:

λ/n>p.

12. The laser beam scanning device as claimed in claim 1, wherein:
the laser beam is input to the diffraction optical element at a position outside an image forming region on the surface to be scanned where an image is formed, and the light intensity of the laser beam which is led to outside the image forming region is greater than the light intensity of the laser beam which is led to the image forming region.

13. The laser beam scanning device as claimed in claim 1, wherein:
the light detector outputs signals which are changed by a time interval between positions where the laser beam passes through the pattern of the diffraction image in the second direction.

14. The laser beam scanning device as claimed in claim 1, wherein:
the light detector is located at a position further along an optical path than a position where the laser beam is condensed by a scanning optical system; and
a lens is positioned to condense the laser beam from the diffraction optical element so that the position of the light detector is conjugated with the position where the laser beam is condensed.

15. The laser beam scanning device as claimed in claim 1, further comprising:
an aperture which controls the width of the laser beam to be input to the light detector in the second direction.

16. The laser beam scanning device as claimed in claim 1, further comprising:
a shifting unit which shifts a laser beam condensing position on the surface to be scanned based on a signal output from the light detector.

17. The laser beam scanning device as claimed in claim 16, wherein:
the shifting unit obtains a shifting amount and a shifting direction of the laser beam condensing position by using a rise timing and a fall timing of the signal output from the light detector.

18. The laser beam scanning device as claimed in claim 16, wherein:
the shifting unit includes a liquid crystal deflection element which deflects the laser beam output from the light source in the second direction corresponding to a driving signal;
a driving signal generating circuit which generates a driving signal based on the signal output from the light detector;
a posture adjusting unit which adjusts the posture of an optical element disposed between the light source and the laser beam deflecting unit based on the signal output from the light detector; and
an image forming start position adjusting unit which adjusts an image forming start position on the surface to be scanned in the sub scanning direction.

19. An image forming apparatus, comprising:
at least one laser beam scanning device which scans a surface to be scanned by using a laser beam; and
a transferring device which transfers an image formed on the surface to be scanned by the laser beam scanning device to a recording medium,
wherein the laser beam scanning device includes:
a light source which emits the laser beam;
a laser beam deflecting unit which deflects the laser beam emitted from the light source;
a scanning optical system which condenses the laser beam deflected by the laser beam deflecting unit onto the surface to be scanned;

a diffraction optical element which forms a pattern of a diffraction image by dividing the laser beam deflected by the laser beam deflecting unit into a plurality of laser beams; and a light detector which detects the pattern of the diffraction image, wherein:

the pattern of the diffraction image at the light detector includes a plurality of images where intervals between the plural images are different in a first direction corresponding to the main scanning direction at a position in a second direction corresponding to the sub scanning direction at least at a part of the plural images; and the laser beam deflecting unit is formed of polygon mirrors stacked in the second direction in which each polygon mirror has four surfaces or six surfaces.

20. A laser beam detecting method in a laser beam scanning device which scans a surface to be scanned by using a laser beam, the method comprising:

emitting the laser beam from a light source;

deflecting the laser beam emitted from the light source;

condensing the deflected laser beam onto the surface to be scanned;

forming a pattern of a diffraction image by dividing the deflected laser beam into a plurality of laser beams; and detecting the pattern of the diffraction image, wherein, the pattern of the diffraction image at the light detector includes a plurality of images where intervals between the plural images are different in a first direction corresponding to the main scanning direction at a position in a second direction corresponding to the sub scanning direction at least at a part of the plural images.

* * * * *